(12) United States Patent
Sato et al.

(10) Patent No.: US 12,271,096 B2
(45) Date of Patent: Apr. 8, 2025

(54) TRANSMISSION TYPE LIQUID CRYSTAL DIFFRACTION ELEMENT, OPTICAL ELEMENT, IMAGE DISPLAY UNIT, HEAD-MOUNTED DISPLAY, BEAM STEERING, AND SENSOR

(71) Applicant: FUJIFILM Corporation, Tokyo (JP)

(72) Inventors: Hiroshi Sato, Minamiashigara (JP); Yukito Saitoh, Minamiashigara (JP); Takashi Yonemoto, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 18/176,738

(22) Filed: Mar. 1, 2023

(65) Prior Publication Data

US 2023/0205044 A1 Jun. 29, 2023

Related U.S. Application Data

(63) Continuation of application No. PCT/JP2021/032179, filed on Sep. 1, 2021.

(30) Foreign Application Priority Data

Sep. 2, 2020 (JP) ................................. 2020-147543
Oct. 22, 2020 (JP) ................................. 2020-177548

(51) Int. Cl.
  *G02F 1/29* (2006.01)
  *G02F 1/295* (2006.01)
  *G06F 1/16* (2006.01)

(52) U.S. Cl.
  CPC ............ *G02F 1/292* (2013.01); *G02F 1/2955* (2013.01); *G06F 1/163* (2013.01); *G02F 2201/305* (2013.01); *G02F 2203/22* (2013.01)

(58) Field of Classification Search
  CPC ........... G02F 2201/305; G02F 2203/22; G02F 1/292; G02F 1/2955
  See application file for complete search history.

(56) References Cited

U.S. PATENT DOCUMENTS

| | | | |
|---|---|---|---|
| 2008/0278675 | A1 | 11/2008 | Escuti et al. |
| 2010/0225876 | A1 | 9/2010 | Escuti et al. |

(Continued)

FOREIGN PATENT DOCUMENTS

| | | | |
|---|---|---|---|
| JP | 2008-532085 A | 8/2008 | |
| JP | 2010-525394 A | 7/2010 | |

(Continued)

OTHER PUBLICATIONS

Japanese Notice of Reasons for Refusal for Japanese Application No. 2022-546952, dated Jan. 9, 2024, with an English translation.

(Continued)

*Primary Examiner* — Lauren Nguyen
(74) *Attorney, Agent, or Firm* — Birch, Stewart, Kolasch & Birch, LLP

(57) ABSTRACT

An object is to provide a liquid crystal diffraction element that has small wavelength dependence of diffraction efficiency and diffracts light having the same wavelength at the same angle, an optical element including the liquid crystal diffraction element, and an image display unit, a head-mounted display, a beam steering, and a sensor including the liquid crystal diffraction element or the optical element. The liquid crystal diffraction element includes an optically-anisotropic layer that includes a liquid crystal compound, in which the optically-anisotropic layer has a liquid crystal alignment pattern in which a direction of an optical axis of the liquid crystal compound continuously rotates in one in-plane direction, and in an image obtained by observing a cross-section of the optically-anisotropic layer with a scanning electron microscope, the optically-anisotropic layer has (Continued)

bright portions and dark portions extending from one surface to another surface, each of the dark portions has two or more inflection points of angle, and the optically-anisotropic layer has regions where tilt directions of the dark portions are different from each other in the thickness direction.

20 Claims, 10 Drawing Sheets

(56) References Cited

U.S. PATENT DOCUMENTS

| | | |
|---|---|---|
| 2019/0317450 A1 | 10/2019 | Yaroshchuk et al. |
| 2020/0111259 A1* | 4/2020 | Sears ................ G02B 27/0172 |
| 2020/0409202 A1 | 12/2020 | Kodama et al. |
| 2021/0033770 A1 | 2/2021 | Lu et al. |
| 2021/0149248 A1 | 5/2021 | Saitoh et al. |
| 2021/0208316 A1 | 7/2021 | Sato et al. |

FOREIGN PATENT DOCUMENTS

| | | | | |
|---|---|---|---|---|
| WO | WO-2019-189852 | * | 3/2019 | ......... G02B 27/0172 |
| WO | WO 2019/182052 A1 | | 9/2019 | |
| WO | WO 2020/022434 A1 | | 1/2020 | |
| WO | WO 2020/066429 A1 | | 4/2020 | |

OTHER PUBLICATIONS

International Preliminary Report on Patentability and Written Opinion of the International Searching Authority for International Application No. PCT/JP2021/032179, dated Mar. 16, 2023, with an English translation.

International Search Report for International Application No. PCT/JP2021/032179, dated Nov. 30, 2021, with an English translation.

Japanese Office Action for Japanese Application No. 2022-546952, dated Jun. 11, 2024, with an English translation.

Japanese Office Action for corresponding Japanese Application No. 2022-546952, dated Nov. 5, 2024, with English translation.

* cited by examiner

TRANSMISSION TYPE LIQUID CRYSTAL DIFFRACTION ELEMENT, OPTICAL ELEMENT, IMAGE DISPLAY UNIT, HEAD-MOUNTED DISPLAY, BEAM STEERING, AND SENSOR

CROSS-REFERENCE TO RELATED APPLICATIONS

This application is a Continuation of PCT International Application No. PCT/JP2021/032179 filed on Sep. 1, 2021, which claims priority under 35 U.S.C. § 119(a) to Japanese Patent Application No. 2020-147543 filed on Sep. 2, 2020 and Japanese Patent Application No. 2020-177548 filed on Oct. 22, 2020. The above applications are hereby expressly incorporated by reference, in its entirety, into the present application.

BACKGROUND OF THE INVENTION

1. Field of the Invention

The present invention relates to a liquid crystal diffraction element that diffracts incidence light and allows transmission of the diffracted light, an optical element including the liquid crystal diffraction element, and an image display unit, a head-mounted display, a beam steering, and a sensor including the liquid crystal diffraction element or the optical element.

2. Description of the Related Art

A liquid crystal diffraction element that diffracts incidence light and allows transmission of the diffracted light is known.

As the liquid crystal diffraction element, a liquid crystal diffraction element including an optically-anisotropic layer that is formed of a liquid crystal composition including a liquid crystal compound is known.

For example, JP2010-525394A discloses a liquid crystal diffraction element (polarization diffraction grating) including a substrate, a first polarization diffraction grating layer disposed on the substrate, and a second polarization diffraction grating layer disposed on the first polarization diffraction grating layer. The first polarization diffraction grating layer includes a molecular structure that is twisted according to a first twist sense over a first thickness defined between opposing faces of the first polarization diffraction grating layer. The second polarization diffraction grating layer includes a molecular structure that is twisted according to a second twist sense opposite to the first twist sense over a second thickness defined between opposing faces of the second polarization diffraction grating layer.

JP2010-525394A describes that the polarization diffraction grating layer can align a liquid crystal compound in a predetermined alignment pattern to diffract light.

The liquid crystal diffraction element having the alignment pattern of the liquid crystal compound as described in JP2010-525394A can diffract incident light at an angle corresponding to the wavelength. In addition, in a case where the alignment pattern of the liquid crystal compound is uniform, light having the same wavelength can be diffracted at a uniform angle irrespective of incidence positions.

The liquid crystal diffraction element having the alignment pattern of the liquid crystal compound can be used for various applications by utilizing this characteristic.

For example, in augmented reality (AR) glasses that display a virtual image and various information or the like to be superimposed on a scene that is actually being seen, an image displayed by an image display apparatus needs to be incident into a light guide plate at an angle where the total reflection can occur.

By using the liquid crystal diffraction element having the alignment pattern of the liquid crystal compound described in JP2010-525394A as an incidence element for allowing light to be incident into the light guide plate, incidence light (video) can be diffracted to be incident into the light guide plate at an angle where total reflection can occur. In addition, by using the liquid crystal diffraction element at another end of the light guide plate, light that is guided in the light guide plate can be diffracted and emitted such that the video can be visually recognized by a user.

In addition, as described above, in the liquid crystal diffraction element having the alignment pattern of the liquid crystal compound described in JP2010-525394A, incidence light can be diffracted at a diffraction angle corresponding to the wavelength, and in a case where the alignment pattern of the liquid crystal compound is uniform, the diffraction angle of light having the same wavelength in a plane is uniform.

Therefore, the liquid crystal diffraction element can also be suitably used as a spectral element in a hyperspectral camera that disperses incidence light into components in a plurality of wavelength ranges and images the components.

In addition, by changing the alignment pattern of the liquid crystal compound in a plane, the diffraction angle can change depending on incidence positions of light. For example, the liquid crystal diffraction element can be used as an element that exhibits a lens function.

For example, in order for a user to experience so-called immersive virtual reality (VR) that does not allow transmission of external light in the real world, a head-mounted display including an image display unit that is worn by the user and guides an image to the eyes of the user is used. In the image display unit used for the head-mounted display, a lens that focuses light emitted from an image display apparatus on positions of the eyes of the user is necessary.

By using the liquid crystal diffraction element that changes the alignment pattern of the liquid crystal compound in a plane to exhibit a lens function as the lens element of the head-mounted display for VR, incidence light (video) is diffracted such that light emitted from the image display apparatus can be focused on positions of the eyes of the user and can be visually recognized by the user.

In addition, in a refractive lens formed of glass or plastic, due to wavelength dispersibility of a refractive index of the material used as the lens, a traveling direction of light diffracted by the lens changes depending on wavelengths. Therefore, color break (chromatic aberration) occurs. Specifically, an angle where light having a shorter wavelength is refracted by the lens is large, and an angle where light having a longer wavelength is refracted by the lens is small. On the other hand, the liquid crystal diffraction element that changes the alignment pattern of the liquid crystal compound in a plane to exhibit a lens function has characteristics in which an angle where light having a shorter wavelength is diffracted is small and an angle where light having a longer wavelength is diffracted is large. Therefore, by using the refractive lens and the liquid crystal diffraction element that changes the alignment pattern of the liquid crystal compound in a plane to exhibit a lens function in combination, the color break of the refractive lens can be improved.

SUMMARY OF THE INVENTION

Both of the incidence element for the light guide plate in the AR glasses and the spectral element in the hyperspectral camera diffract light at each of wavelengths in a wide wavelength range such as the entire wavelength range of visible light.

Accordingly, for these optical elements, it is required that the wavelength dependence of the diffraction efficiency is small, that is, light can be diffracted with the same diffraction efficiency irrespective of wavelengths.

However, in the liquid crystal diffraction elements in the related art having the alignment pattern of the liquid crystal compound including the liquid crystal diffraction element described in JP2010-525394A, the wavelength dependence of the diffraction efficiency is not sufficiently low.

In addition, the lens element in the head-mounted display for VR and the lens element that is used in combination with the refractive lens to improve color break diffract light at each of wavelengths in a wide wavelength range such as the entire wavelength range of visible light.

Accordingly, for these optical elements, it is required that the wavelength dependence of the diffraction efficiency is small, that is, light can be diffracted with the same diffraction efficiency irrespective of wavelengths.

However, in the liquid crystal diffraction elements in the related art having the alignment pattern of the liquid crystal compound including the liquid crystal diffraction element described in JP2010-525394A, the wavelength dependence of the diffraction efficiency is not sufficiently low.

An object of the present invention is to solve the above-described problem of the related art and to provide a liquid crystal diffraction element having small wavelength dependence of diffraction efficiency, an optical element including the liquid crystal diffraction element, and an image display unit, a head-mounted display, a beam steering, and a sensor including the liquid crystal diffraction element or the optical element.

In order to achieve the object, the present invention has the following configurations.

[1] A liquid crystal diffraction element comprising:
an optically-anisotropic layer that is formed of a liquid crystal composition including a liquid crystal compound,
in which the optically-anisotropic layer has a liquid crystal alignment pattern in which a direction of an optical axis derived from the liquid crystal compound changes while continuously rotating in at least one in-plane direction, and
in a cross-sectional image obtained by observing a cross-section of the optically-anisotropic layer taken in a thickness direction parallel to the one in-plane direction with a scanning electron microscope, the optically-anisotropic layer has bright portions and dark portions extending from one surface to another surface, each of the dark portions has two or more inflection points of angle, and the optically-anisotropic layer has regions where tilt directions of the dark portions are different from each other in the thickness direction.

[2] The liquid crystal diffraction element according to [1], in which in a case where a length over which the direction of the optical axis derived from the liquid crystal compound in the liquid crystal alignment pattern rotates by 180° in a plane is set as a single period, a length of the single period is uniform.

[3] The liquid crystal diffraction element according to [1], in which in a case where a length over which the direction of the optical axis derived from the liquid crystal compound in the liquid crystal alignment pattern rotates by 180° in a plane is set as a single period, a length of the single period gradually changes in the one in-plane direction.

[4] The liquid crystal diffraction element according to [1] or [3],
in which the liquid crystal alignment pattern is a concentric circular pattern having a concentric circular shape where the one in-plane direction in which the direction of the optical axis derived from the liquid crystal compound changes while continuously rotating moves from an inner side toward an outer side.

[5] The liquid crystal diffraction element according to any one of [1] to [4],
in which the inflection point at which the tilt direction of the dark portion is folded is provided at an odd number of positions.

[6] The liquid crystal diffraction element according to [5],
in which the inflection point at which the tilt direction of the dark portion is folded is provided at one position.

[7] The liquid crystal diffraction element according to [5],
in which the inflection point at which the tilt direction of the dark portion is folded is provided at three positions.

[8] The liquid crystal diffraction element according to any one of [1] to [7],
in which in a cross-sectional image obtained by observing a cross-section of the optically-anisotropic layer taken in a thickness direction parallel to the one in-plane direction with a scanning electron microscope, a shape of the dark portion is symmetrical with respect to a center line of the optically-anisotropic layer in the thickness direction.

[9] The liquid crystal diffraction element according to any one of [1] to [7],
in which in a cross-sectional image obtained by observing a cross-section of the optically-anisotropic layer taken in a thickness direction parallel to the one in-plane direction with a scanning electron microscope, a shape of the dark portion is asymmetrical with respect to a center line of the optically-anisotropic layer in the thickness direction.

[10] The liquid crystal diffraction element according to any one of [1] to [9],
in which a difference $\Delta n_{550}$ in refractive index generated by refractive index anisotropy of the optically-anisotropic layer is 0.2 or more.

[11] The liquid crystal diffraction element according to any one of [1] to [9],
in which in a case where a length over which the direction of the optical axis derived from the liquid crystal compound in the liquid crystal alignment pattern rotates by 180° in a plane is set as a single period, a region where a length of the single period is 1.0 μm or less is provided in a plane.

[12] An optical element comprising:
the liquid crystal diffraction element according to any one of [1] to [11]; and
a circularly polarizing plate.

[13] The optical element according to [12],
in which the circularly polarizing plate consists of a retardation plate and a polarizer, and
the liquid crystal diffraction element, the retardation plate, and the polarizer are disposed in this order.

[14] An optical element comprising, in the following order:
the liquid crystal diffraction element according to any one of [1] to [11];
a silicon oxide layer; and
a support.

[15] An optical element comprising:
at least one liquid crystal diffraction element according to any one of [1] to [11] or at least one optical element according to any one of [12] to [14]; and
at least one phase modulation element.

[16] An image display unit comprising:
the liquid crystal diffraction element according to any one of [1] to [11] or the optical element according to any one of [12] to [15].

[17] A head-mounted display comprising:
the image display unit according to [16].

[18] A beam steering comprising:
the liquid crystal diffraction element according to any one of [1] to [11] or the optical element according to any one of [12] to [15].

[19] A sensor comprising:
the liquid crystal diffraction element according to any one of [1] to [11] or the optical element according to any one of [12] to [15].

According to the present invention, it is possible to provide a liquid crystal diffraction element having small wavelength dependence of diffraction efficiency, an optical element including the liquid crystal diffraction element, and an image display unit, a head-mounted display, a beam steering, and a sensor including the liquid crystal diffraction element or the optical element.

DESCRIPTION OF THE PREFERRED EMBODIMENTS

Hereinafter, a liquid crystal diffraction element, an optical element, an image display unit, a head-mounted display, a beam steering, and a sensor according to the present invention will be described in detail based on a preferable embodiment shown in the accompanying drawings.

In the present specification, numerical ranges represented by "to" include numerical values before and after "to" as lower limit values and upper limit values.

In the present specification, "(meth)acrylate" represents "either or both of acrylate and methacrylate".

In the present specification, visible light refers to light having a wavelength which can be observed by human eyes among electromagnetic waves and refers to light in a wavelength range of 380 to 780 nm. Invisible light refers to light in a wavelength range of shorter than 380 nm or longer than 780 nm.

[Liquid Crystal Diffraction Element]

Figure 1:
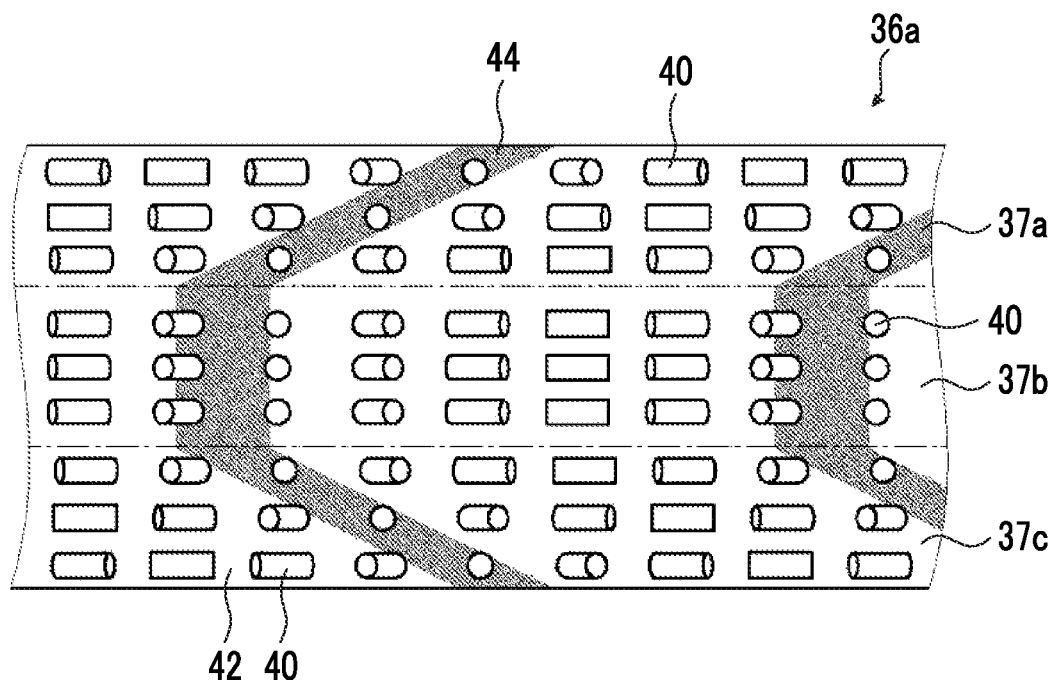
FIG. 1 is a diagram conceptually showing one example of an optically-anisotropic layer of a liquid crystal diffraction element according to the present invention.

FIG. 1 is a diagram conceptually showing one example of an optically-anisotropic layer of the liquid crystal diffraction element according to the embodiment of the present invention.

In the liquid crystal diffraction element according to the embodiment of the present invention the optically-anisotropic layer is formed of a liquid crystal composition including a liquid crystal compound and has a liquid crystal alignment pattern in which a direction of an optical axis derived from the liquid crystal compound continuously changes in at least one in-plane direction.

In addition, in a cross-sectional image obtained by observing a cross-section of the optically-anisotropic layer taken in a thickness direction parallel to the one in-plane direction where the direction of the optical axis continuously changes with a scanning electron microscope (SEM), the optically-anisotropic layer has bright portions and dark portions extending from one surface to another surface, and each of the dark portions (bright portions) has two or more inflection points where the angle changes (inflection points of angle). Further, the optically-anisotropic layer has regions where tilt directions of the dark portions (bright portions) are different from each other in the thickness direction.

The bright portions and the dark portions (the bright lines and the dark lines) in the cross-sectional image observed with the SEM are derived from a liquid crystal phase in the liquid crystal alignment pattern.

In an optically-anisotropic layer 36a shown in FIG. 1, a rod-like liquid crystal compound is used as a liquid crystal compound 40. Accordingly, the direction of the optical axis matches a longitudinal direction of the liquid crystal compound 40.

The optically-anisotropic layer 36a has a predetermined liquid crystal alignment pattern in which a direction of an optical axis derived from the liquid crystal compound 40 changes while continuously rotating in one direction.

In addition, in the optically-anisotropic layer 36a, in a case where a length over which the direction of the optical axis derived from the liquid crystal compound 40 rotates by 180° in the one in-plane direction is set as a single period, a length of the single period in the liquid crystal alignment pattern is uniform.

The optically-anisotropic layer 36a having the liquid crystal alignment pattern acts as a liquid crystal diffraction element that diffracts (refracts) incident light according to the single period where the optical axis rotates by 180° and the wavelength of the incidence light and allows transmission of the diffracted light. The action of the optically-anisotropic layer 36a as the diffraction element will be described below in detail.

In a cross-sectional image obtained by observing a cross-section of the optically-anisotropic layer 36a taken in a thickness direction parallel to the one in-plane direction in which the optical axis rotates with an SEM, a stripe pattern where bright portions 42 and dark portions 44 derived from a liquid crystal phase and extending from one surface to another surface are alternately provided is observed. In FIG. 1, the bright portions 42 and the dark portions 44 are shown to overlap the cross-section of the optically-anisotropic layer 36a. In the following description, the cross-sectional image obtained by observing the cross-section taken in the thickness direction parallel to the one in-plane direction in which the optical axis rotates with an SEM will also be simply referred to as "cross-sectional SEM image".

In the cross-sectional SEM image of the optically-anisotropic layer 36a in the example shown in the drawing, the dark portion 44 has two inflection points where the angle changes. That is, the optically-anisotropic layer 36a can also include three regions including a region 37a, a region 37b, and a region 37c corresponding to the inflection points of the dark portion 44 in the thickness direction.

As shown in FIG. 1, the optically-anisotropic layer 36a has, at any position in the thickness direction, the liquid crystal alignment pattern where the optical axis derived from the liquid crystal compound 40 rotates clockwise to the left direction in the drawing in the in-plane direction.

In addition, in the liquid crystal alignment pattern, the single period as the length over which the optical axis rotates by 180° in the one in-plane direction is uniform in any region in the in-plane direction.

In addition, as shown in FIG. 1, in the lower region 37c in the thickness direction, the liquid crystal compound 40 is twisted and aligned to be helically twisted clockwise (to the right) from the upper side to the lower side in the drawing in the thickness direction.

In the middle region 37b in the thickness direction, the liquid crystal compound 40 is not twisted in the thickness direction, and the optical axes of the liquid crystal compounds 40 laminated in the thickness direction face the same direction. That is, it is preferable that the optical axes of the liquid crystal compounds 40 present at the same position in the in-plane direction face the same direction.

In the upper region 37a in the thickness direction, the liquid crystal compound 40 is twisted and aligned to be helically twisted counterclockwise (to the left) from the upper side to the lower side in the drawing in the thickness direction.

That is, in the region 37a, the region 37b, and the region 37c of the optically-anisotropic layer 36a shown in FIG. 1, the twisted states of the liquid crystal compounds 40 in the thickness direction are different from each other.

In the optically-anisotropic layer having the liquid crystal alignment pattern in which the optical axis derived from the liquid crystal compound continuously rotates in the one in-plane direction, the bright portions 42 and the dark portions 44 in the cross-sectional SEM image of the optically-anisotropic layer 36a are observed to connect the liquid crystal compounds 40 facing the same direction.

For example, in FIG. 1, the dark portions 44 are observed to connect the liquid crystal compounds 40 of which the optical axes face a direction perpendicular to the paper plane.

In the lowermost region 37c in the thickness direction, the dark portion 44 is tilted to the upper left side in the drawing. In the middle region 37b, the dark portion 44 extends in the thickness direction. In the uppermost region 37a in the thickness direction, the dark portion 44 is tilted to the upper right side in the drawing.

That is, the optically-anisotropic layer 36a shown in FIG. 1 has two inflection points of angle where the angle of the dark portion 44 changes. In addition, in the uppermost region 37a, the dark portion 44 is tilted to the upper right side. In the lowermost region 37b, the dark portion 44 is tilted to the upper left side. That is, in the region 37a and the region 37c, the tilt directions of the dark portions 44 are different from each other.

Further, the optically-anisotropic layer 36a shown in FIG. 1 has one inflection point where the dark portion 44 is folded in a direction opposite to the tilt direction.

Specifically, regarding the dark portion 44 of the optically-anisotropic layer 36a, the tilt direction in the region 37a and the tilt direction in the region 37b are opposite to each other. Therefore, at the inflection point positioned at the interface between the region 37a and the region 37b, the tilt direction is folded in the opposite direction. That is, the optically-anisotropic layer 36a has one inflection point where the tilt direction is folded in the opposite direction.

In addition, in the region 37a and the region 37c of the optically-anisotropic layer 36a, for example, the thicknesses are the same, and the twisted states of the liquid crystal compounds 40 in the thickness direction are different from each other. Therefore, as shown in FIG. 1, the bright portions 42 and the dark portions 44 in the cross-sectional SEM image are formed in a substantially C-shape.

Accordingly, in the optically-anisotropic layer 36a, the shape of the dark portion 44 (bright portion 42) is symmetrical with respect to the center line in the thickness direction.

In the liquid crystal diffraction element according to the embodiment of the present invention, in the optically-anisotropic layer 36a, that is, the cross-sectional SEM image, the optically-anisotropic layer 36a has the bright portions 42 and the dark portions 44 extending from one surface to another surface, each of the dark portions 44 has two or more inflection points of angle, and the optically-anisotropic layer 36a has the regions where the tilt directions are different from each other in the thickness direction. As a result, the wavelength dependence of the diffraction efficiency can be reduced, and light can be diffracted with the same diffraction efficiency irrespective of wavelengths.

As described above, in the liquid crystal diffraction element including the optically-anisotropic layer having liquid crystal alignment pattern in which the direction of the optical axis derived from the liquid crystal compound continuously changes in at least one in-plane direction, for example, incidence light in a wide wavelength range, for example, the entire wavelength range of visible light can be diffracted at different diffraction angles depending on the wavelengths.

However, according to the investigation by the present inventors, the cross-sectional SEM image of the liquid crystal diffraction element having the liquid crystal alignment pattern in the related art has dark portions that are tilted with respect to the surface (main surface) but does not have the inflection point where the angle changes or has only one inflection point as described in JP2010-525394A. Therefore, in the liquid crystal diffraction element in the related art, the wavelength dependence of the diffraction efficiency is large, for example, the diffraction efficiencies of red light and green light are high but the diffraction efficiency of blue light is lower than those of the other two colors.

On the other hand, in the liquid crystal diffraction element according to the embodiment of the present invention, the dark portion 44 observed in the cross-sectional SEM image has two or more inflection points of angle and has the regions where the tilt directions are different in the thickness direction. Therefore, in the liquid crystal diffraction element according to the embodiment of the present invention, the wavelength dependence of the diffraction efficiency can be reduced, and light can be diffracted with the same diffraction efficiency irrespective of wavelengths. Further, in the liquid crystal diffraction element according to the embodiment of the present invention, light can be diffracted with high diffraction efficiency irrespective of wavelengths.

In addition, although described below, in the liquid crystal alignment pattern of the liquid crystal diffraction element according to the embodiment of the present invention, the length of the single period where the optical axis rotates by 180° may be uniform. In a case where the length of the single period is uniform, the liquid crystal diffraction element according to the embodiment of the present invention diffracts (refracts) light having the same wavelength at the same angle irrespective of light incidence positions in a plane. Accordingly, the liquid crystal diffraction element according to the embodiment of the present invention can be suitably used for various optical devices where light having the same wavelength is required to be diffracted at the same angle irrespective of incidence positions, for example, an incidence element for a light guide plate in AR glasses or a spectral element in a hyperspectral camera.

Regarding the action and effects, the same can be applied to the liquid crystal diffraction elements according to the embodiment of the present invention including the optically-anisotropic layer described below.

The optically-anisotropic layer 36a shown in FIG. 1 includes the three regions in the thickness direction, the dark portion 44 has two inflection points, and the inflection point where the tilt direction is folded is provided at one position.

However, in the liquid crystal diffraction element according to the embodiment of the present invention, the optically-anisotropic layer is not limited to this configuration.

That is, in the liquid crystal diffraction element according to the embodiment of the present invention, the optically-anisotropic layer can adopt various configurations as long as the optically-anisotropic layer has the above-described liquid crystal alignment pattern, the single period of the liquid crystal alignment pattern is uniform, and in the cross-sectional SEM image, the optically-anisotropic layer has the bright portions 42 and the dark portions 44 derived from the liquid crystal phase and extending from one surface to another surface, each of the dark portions 44 has two or more inflection points of angle, and the optically-anisotropic layer has the regions where the tilt directions are different in the thickness direction.

Figure 2:
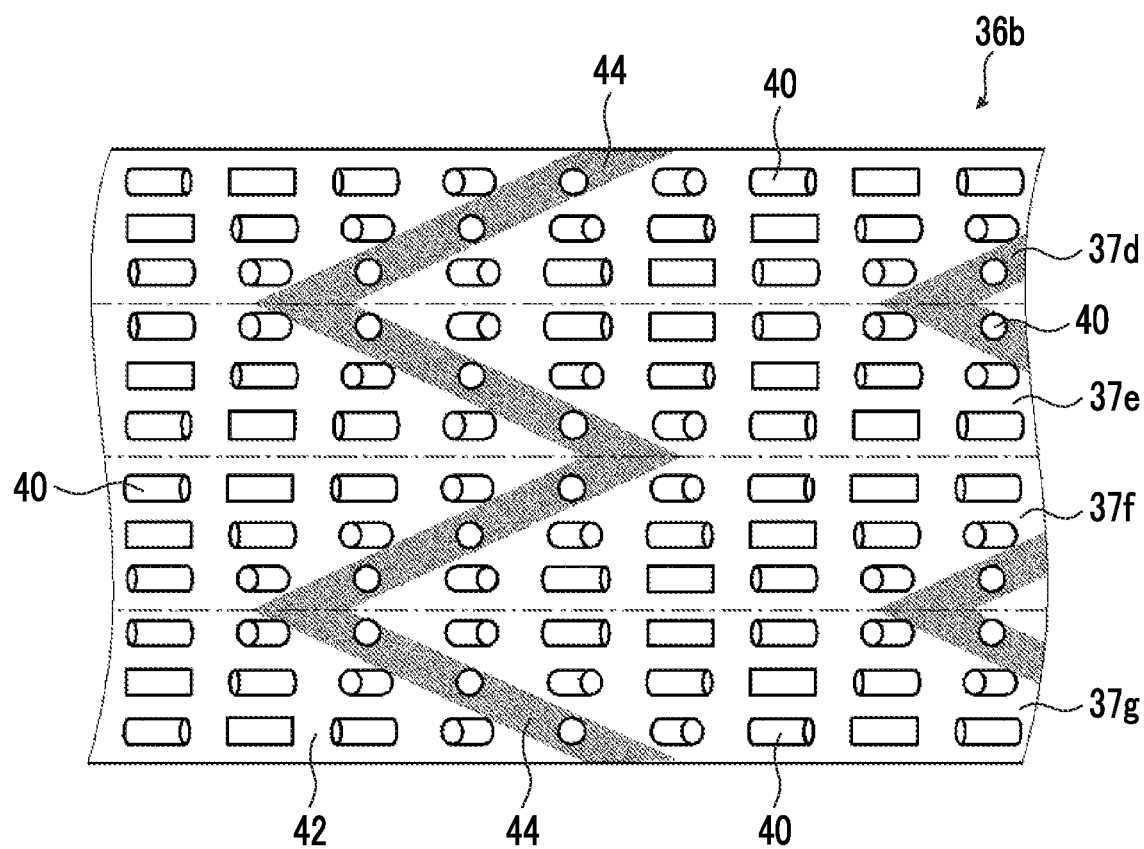
FIG. 2 is a diagram conceptually showing another example of the optically-anisotropic layer of the liquid crystal diffraction element according to the present invention.

FIG. 2 shows another example of the optically-anisotropic layer of the liquid crystal diffraction element according to the embodiment of the present invention.

An optically-anisotropic layer 36b shown in FIG. 2 has the predetermined liquid crystal alignment pattern in which the optical axis derived from the liquid crystal compound changes while continuously rotating in the one in-plane direction. Accordingly, in the cross-sectional SEM image of the optically-anisotropic layer 36b, the stripe pattern where the bright portions 42 and the dark portions 44 derived from the liquid crystal phase and extending from one surface to another surface are alternately provided is also observed.

In FIG. 2, the bright portions 42 and the dark portions 44 are also shown to overlap the cross-section of the optically-anisotropic layer 36b as in FIG. 1.

In the optically-anisotropic layer 36b shown in FIG. 2, the dark portion 44 observed in the cross-sectional SEM image has three inflection points where the angle changes.

That is, the optically-anisotropic layer 36b can include four regions including a region 37d, a region 37e, a region 37f, and a region 37g corresponding to the inflection points of the dark portion 44 in this order from above in the thickness direction.

The optically-anisotropic layer 36b of FIG. 2 also has, at any position in the thickness direction, the liquid crystal alignment pattern where the optical axis derived from the liquid crystal compound 40 rotates clockwise to the left direction in the drawing in the in-plane direction.

In addition, in the liquid crystal alignment pattern, the single period as the length over which the optical axis rotates by 180° in the one in-plane direction is uniform in any region in the in-plane direction.

In the optically-anisotropic layer 36b shown in FIG. 2, in the lowermost region 37g in the thickness direction, the liquid crystal compound 40 is twisted and aligned to be helically twisted clockwise from the upper side to the lower side in the drawing in the thickness direction.

In the second region 37f from below in the thickness direction, the liquid crystal compound 40 is twisted and aligned to be helically twisted counterclockwise from the upper side to the lower side in the drawing in the thickness direction.

In the third region 37e from below in the thickness direction, the liquid crystal compound 40 is twisted and aligned to be helically twisted clockwise from the upper side to the lower side in the drawing in the thickness direction.

Further, in the uppermost region 37d in the thickness direction, the liquid crystal compound 40 is twisted and aligned to be helically twisted counterclockwise from the upper side to the lower side in the drawing in the thickness direction.

That is, in the optically-anisotropic layer 36b shown in FIG. 2, the liquid crystal alignment pattern is uniform in the entire region in the thickness direction. However, the helically twisted states of the liquid crystal compounds 40 in the thickness direction are the same in the region 37d and the region 37f and are the same in the region 37e and the region 37g. In addition, in the optically-anisotropic layer 36b shown in FIG. 2, the helically twisted states of the liquid crystal compounds 40 in the thickness direction are different in the region 37d and the region 37e.

As described above, in the optically-anisotropic layer having the liquid crystal alignment pattern in which the optical axis derived from the liquid crystal compound continuously rotates in the one in-plane direction, the bright portions 42 and the dark portions 44 in the cross-sectional SEM image of the optically-anisotropic layer 36a are observed to connect the liquid crystal compounds 40 facing the same direction.

Accordingly, in the optically-anisotropic layer 36b shown in FIG. 2, the tilt directions of the dark portions 44 in the region 37d and the region 37f match with each other, and the tilt directions of the dark portions 44 in the region 37e and the region 37g match with each other.

Specifically, in the lowermost region 37g in the thickness direction, the dark portion 44 is tilted to the upper left side in the drawing. In the second region 37f from below in the thickness direction, the dark portion 44 is tilted to the upper right side in the drawing. In the third region 37e from below in the thickness direction, the dark portion 44 is tilted to the upper left side in the drawing as in the lowermost region 37g. Further, in the uppermost region 37d in the thickness direction, the dark portion 44 is tilted to the upper right side in the drawing as in the second region 37f from below.

That is, the optically-anisotropic layer 36b shown in FIG. 2 has three inflection points of angle of the dark portion where the angle of the dark portion 44 changes.

Here, in the optically-anisotropic layer 36b, the tilt directions of the dark portions are different in the region 37g and the region 37f adjacent to each other in the thickness direction. In addition, the tilt directions of the dark portions are also different in the region 37f and the region 37e adjacent to each other in the thickness direction. Further, the tilt directions of the dark portions are also different in the region 37e and the region 37d adjacent to each other in the thickness direction. That is, in the optically-anisotropic layer 36b shown in FIG. 2, at all of the three inflection points where the angle of the dark portion 44 changes, the tilt direction is folded.

In addition, for example, the thicknesses in the region 37d and the region 37g are the same, and the thicknesses in the region 37e and the region 37f are the same.

Therefore, in the optically-anisotropic layer 36b shown in FIG. 2, the bright portions 42 and the dark portions 44 in the cross-sectional SEM image are formed in a substantially W-shape. Accordingly, in the optically-anisotropic layer 36b, the shape of the dark portion 44 is symmetrical with respect to the center line in the thickness direction.

In addition, in the liquid crystal diffraction element according to the embodiment of the present invention, in addition to the above-described example, the optically-anisotropic layer can adopt various configurations as long as the optically-anisotropic layer has the above-described liquid crystal alignment pattern, the single period of the liquid crystal alignment pattern is uniform, and in the cross-sectional SEM image, the optically-anisotropic layer has the bright portions 42 and the dark portions 44 derived from the liquid crystal phase and extending from one surface (main surface) to another surface, each of the dark portions 44 has two or more inflection points of angle, and the optically-anisotropic layer has the regions where the tilt directions are different in the thickness direction.

In the following examples, only the bright portions 42 and the dark portions 44 in the cross-sectional SEM image of the optically-anisotropic layer are shown. However, in all of the examples, as an enlarged portion surrounded by a broken line in each of the drawings, each of the regions of the optically-anisotropic layer has the above-described liquid crystal alignment pattern where the optical axis continuously rotates in the one in-plane direction. In addition, in the liquid crystal alignment pattern, the single period over which the optical axis derived from the liquid crystal compound rotates by 180° is uniform.

IN addition, in the optically-anisotropic layer described below, in the regions where the dark portions 44 are titled with respect to the surface (main surface) of the optically-anisotropic layer, the liquid crystal compounds 40 are twisted and aligned in the thickness direction. The main surface is the maximum surface of a sheet-shaped material (a plate-shaped material, a film, or a layer).

Figure 3:
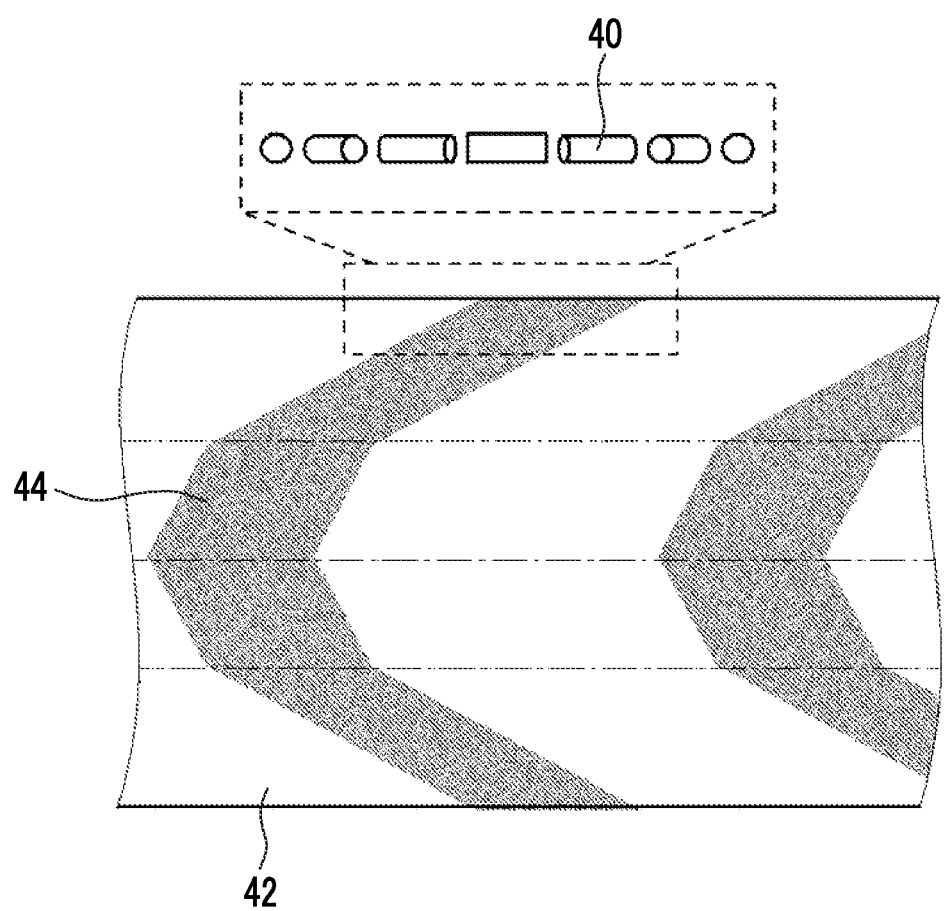
FIG. 3 is a diagram conceptually showing still another example of the optically-anisotropic layer of the liquid crystal diffraction element according to the present invention.

For example, as conceptually shown in FIG. 3, the optically-anisotropic layer has four regions corresponding to the inflection points of the dark portion 44 in the thickness direction.

In the example, in the lowermost region, the dark portion 44 is tilted to the upper left side in the drawing. In the second region from below, the dark portion 44 is tilted to the upper left in the drawing at a larger angle than the lowermost region with respect to the surface. In the third region from below, the dark portion 44 is tilted to the upper right side in the drawing. Further, in the uppermost region, the dark portion 44 is tilted to the upper right in the drawing at a smaller angle than the third region from below with respect to the surface.

That is, the optically-anisotropic layer shown in FIG. 3 has three inflection points of angle where the angle of the dark portion 44 changes, and the inflection point where the tilt direction of the dark portion is folded is provided at one position at the interface between the second region from below and the third region from below.

In the optically-anisotropic layer shown in FIG. 3, the thicknesses in the lowermost region and the uppermost region are the same, and the thicknesses in the second region from below and the third region from below are the same. Further, in the lowermost region and the uppermost region, the tilt directions are different, but the angles (the absolute values of the angles) between the surface of the optically-anisotropic layer and the dark portions 44 are the same. Likewise, in the second region from below and the third region from below, the tilt directions are different, but the angles between the surface of the optically-anisotropic layer and the dark portions 44 are the same.

That is, in the optically-anisotropic layer shown in FIG. 3, the bright portions 42 and the dark portions 44 in the cross-sectional SEM image are formed in a substantially C-shape. Accordingly, in the optically-anisotropic layer shown in FIG. 3, the shape of the dark portion 44 is symmetrical with respect to the center line in the thickness direction.

The angle of the dark portion 44 with respect to the surface of the optically-anisotropic layer can be adjusted depending on the length of the single period over which the optical axis rotates by 180° in the one in-plane direction and the size of the twist of the liquid crystal compound 40 that is twisted and aligned in the thickness direction described below.

Figure 4:
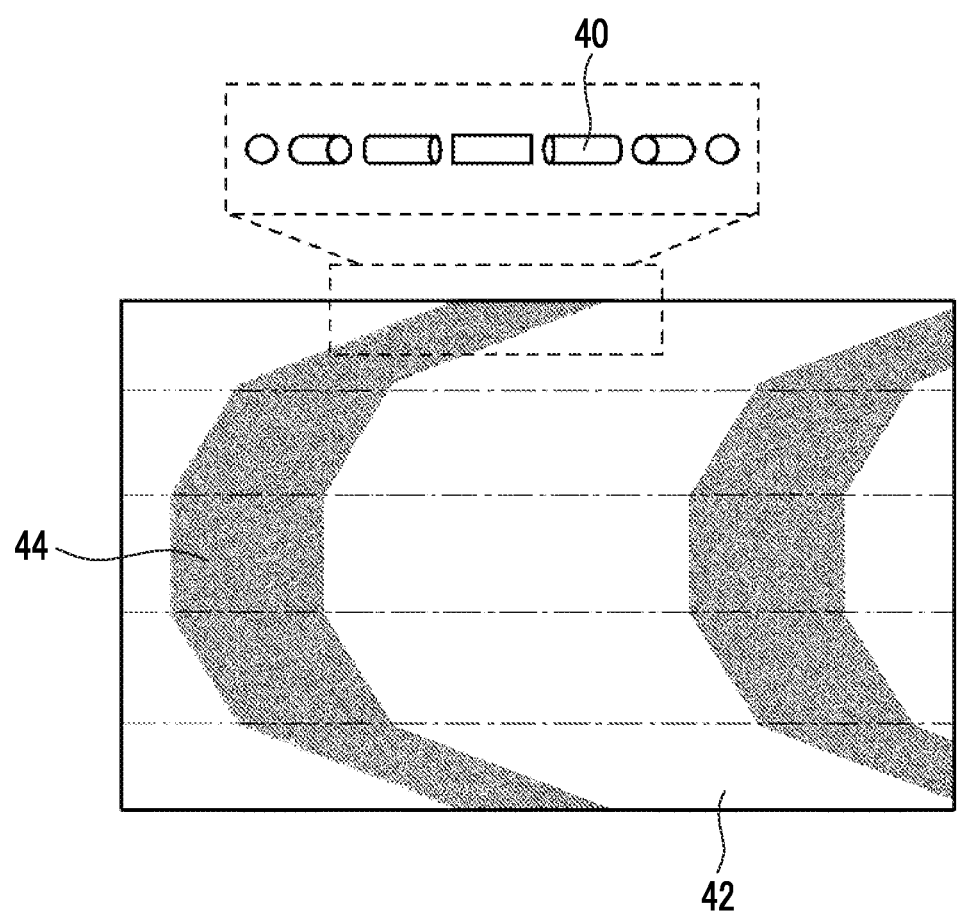
FIG. 4 is a diagram conceptually showing still another example of the optically-anisotropic layer of the liquid crystal diffraction element according to the present invention.

In another example, as conceptually shown in FIG. 4, the optically-anisotropic layer has five regions corresponding to the inflection points of the dark portion 44 in the thickness direction.

In the example, in the lowermost region, the dark portion 44 is tilted to the upper left side in the drawing. In the second region from below, the dark portion 44 is tilted to the upper left in the drawing at a larger angle than the lowermost region with respect to the surface. In the third region from below, that is, the middle region in the thickness direction, the dark portion 44 extends in the thickness direction of the optically-anisotropic layer. In the fourth region from below, the dark portion 44 is tilted to the upper right side in the drawing. Further, in the uppermost region, the dark portion 44 is tilted to the upper right in the drawing at a smaller angle than the fourth region from below with respect to the surface.

That is, the optically-anisotropic layer shown in FIG. 4 has four inflection points of angle where the angle of the dark portion 44 changes.

In addition, the tilt directions of the dark portions 44 are opposite to each other in the lowermost region and the second region from below, and are opposite to each other in the fourth region from below and the uppermost region. Therefore, at the inflection point positioned at the interface between the second region from below and the fourth region from below, the tilt direction is folded in the opposite direction. That is, the optically-anisotropic layer shown in FIG. 4 has one inflection point where the tilt direction is folded in the opposite direction.

In the optically-anisotropic layer shown in FIG. 4, the thicknesses in the lowermost region and the uppermost region are the same, and the thicknesses in the second region from below and the second region from above are the same.

Further, in the lowermost region and the uppermost region of the optically-anisotropic layer, the tilt directions are different, but the angles between the surface of the optically-anisotropic layer and the dark portions 44 are the same. Likewise, in the second region from below and the fourth region from below, the tilt directions are different, but the angles between the surface of the optically-anisotropic layer and the dark portions 44 are the same. Further, in the third region from below that is positioned in the middle, the dark portion 44 extends in the thickness direction of the optically-anisotropic layer.

That is, in the optically-anisotropic layer shown in FIG. 4, the bright portions 42 and the dark portions 44 in the cross-sectional SEM image are formed in a substantially C-shape. Accordingly, in the optically-anisotropic layer shown in FIG. 4, the shape of the dark portion 44 is symmetrical with respect to the center line in the thickness direction.

Figure 5:
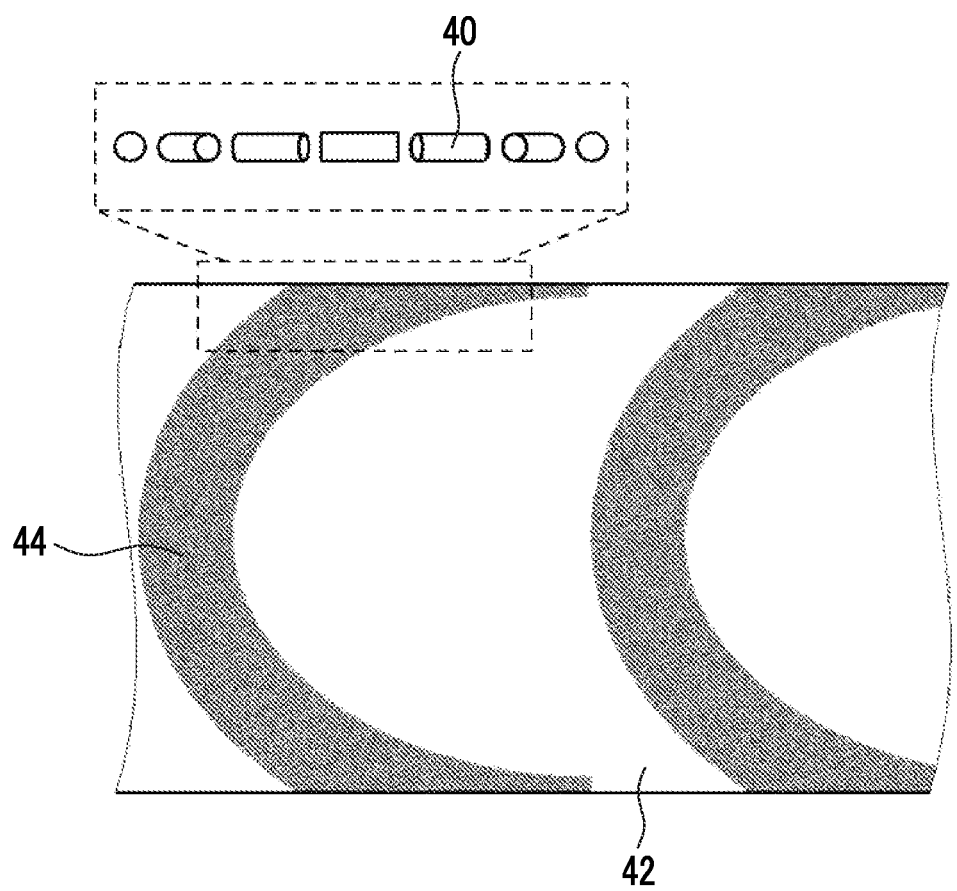
FIG. 5 is a diagram conceptually showing still another example of the optically-anisotropic layer of the liquid crystal diffraction element according to the present invention.

Further, in the optically-anisotropic layer of the liquid crystal diffraction element according to the embodiment of the present invention, as in FIG. 5 conceptually showing the configuration including the substantially C-shaped dark portion 44 shown in FIGS. 3 and 4, a configuration in which the dark portion 44 continuously changes can also be adopted by reducing the interval between the regions in the thickness direction, that is, the interval between the inflection points in the thickness direction.

In the liquid crystal diffraction element according to the embodiment of the present invention, the number of the inflection points in the dark portion 44 of the optically-anisotropic layer is not particularly limited and may be two or more.

In addition, the number of the inflection points where the tilt direction of the dark portion 44 is folded is not particularly limited. However, as shown in FIGS. 1 to 5, from the viewpoint that, for example, the shape of the dark portion 44 is symmetrical with respect to the center line in the thickness direction, the number of the inflection points where the tilt direction is folded is preferably an odd number and more preferably 1 or 3. Further, the number of the inflection points where the tilt direction is folded is preferably 5 or more.

In the optically-anisotropic layer described above, the shape of the dark portion 44 is symmetrical with respect to the center line in the thickness direction. However, in the liquid crystal diffraction element according to the embodiment of the present invention, the shape of the dark portion 44 in the optically-anisotropic layer does not need to be symmetrical with respect to the center line in the thickness direction.

Figure 6:
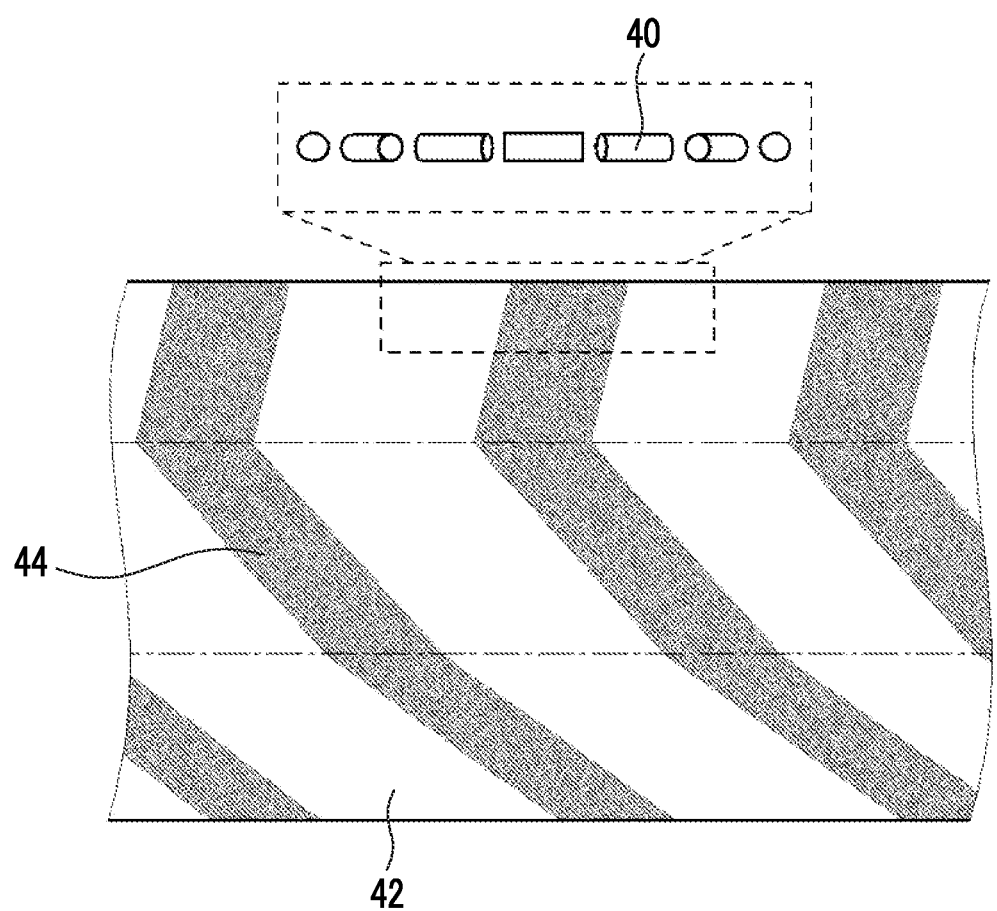
FIG. 6 is a diagram conceptually showing still another example of the optically-anisotropic layer of the liquid crystal diffraction element according to the present invention.

For example, the optically-anisotropic layer conceptually shown in FIG. 6 can be adopted.

The optically-anisotropic layer shown in FIG. 6 has three regions corresponding to the inflection points of the dark portion 44.

In the example, in the lowermost region, the dark portion 44 is tilted to the upper left side in the drawing. In the second region from below, the dark portion 44 is tilted to the upper left in the drawing at a larger angle than the lowermost region with respect to the surface. Further, in the uppermost region, the dark portion 44 is tilted to the upper right side in the drawing.

That is, in the optically-anisotropic layer shown in FIG. 6, the dark portion 44 has three inflection points. In addition, the inflection point where the tilt direction of the dark portion 44 is folded is provided at one position at the interface between the second region from below and the uppermost region.

Here, in the three regions, the tilt angles of the dark portions 44 with respect to the surface of the optically-anisotropic layer are different, and the angle (the absolute value of the angle) with respect to the surface of the optically-anisotropic layer gradually increases from above to below although depending on the tilt directions. That is, in the optically-anisotropic layer shown in FIG. 6, the shape of the dark portion 44 is asymmetrical with respect to the center line in the thickness direction.

The configurations shown in FIGS. 1 to 5 where the shape of the dark portion 44 is symmetrical with respect to the center line in the thickness direction are advantageous in that the wavelength dependence of the diffraction efficiency is smaller.

On the other hand, the configuration where the shape of the dark portion 44 is asymmetrical with respect to the center line in the thickness direction, in particular, the configuration where the tilt angle with respect to the surface of the optically-anisotropic layer gradually increases as shown in FIG. 6 is advantageous in that the diffraction efficiency is high even in a case where the diffraction angle (refraction angle) is large. In the example, the tilt angle of the dark portion 44 is the absolute value of the tilt angle.

In the liquid crystal diffraction element according to the embodiment of the present invention, the tilt angle of the dark portion 44 in the cross-sectional SEM image of the optically-anisotropic layer is not particularly limited.

In the present invention, an average tilt angle of the dark portion 44 refers to an angle between a line that connects a contact between the dark portion 44 and one surface and a contact between the dark portion 44 and another surface and a line perpendicular to the surface of the optically-anisotropic layer. Accordingly, as shown in FIGS. 1 to 5, in a case where the shape of the dark portion 44 is symmetrical with respect to the center line in the thickness direction, the average tilt angle of the dark portion 44 is substantially 0°.

In all of the above-described optically-anisotropic layers, the rod-like liquid crystal compound is used as the liquid crystal compound. However, the present invention is not limited to this configuration, and a disk-like liquid crystal compound can also be used.

In the disk-like liquid crystal compound, the optical axis derived from the liquid crystal compound is defined as an axis perpendicular to a disk surface, that is so-called, a fast axis.

Figure 7:
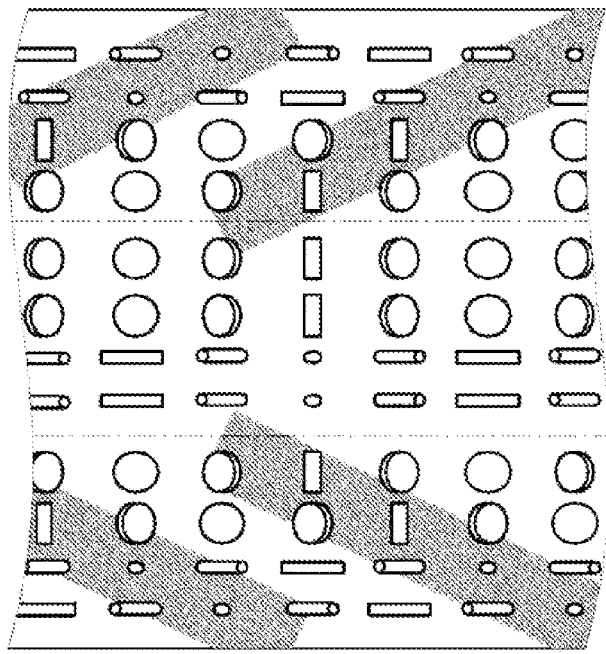
FIG. 7 is a diagram conceptually showing still another example of the optically-anisotropic layer of the liquid crystal diffraction element according to the present invention.

In addition, in the optically-anisotropic layer of the liquid crystal diffraction element according to the embodiment of the present invention, as conceptually shown in FIG. 7, the rod-like liquid crystal compound and the disk-like liquid crystal compound may be used in combination. By using the rod-like liquid crystal compound and the disk-like liquid crystal compound in combination, light components incident at different angles can be diffracted with high diffraction efficiency. The combination of the rod-like liquid crystal compound and the disk-like liquid crystal compound is not limited to the configuration conceptually shown in FIG. 7, and various configurations can be used. For example, in FIGS. 2, 3, 4, 5, and 6, the rod-like liquid crystal compound and the disk-like liquid crystal compound may be used in combination instead of using the rod-like liquid crystal compound. In addition, for example, in FIG. 7, and the above-described combination, the rod-like liquid crystal compound and the disk-like liquid crystal compound may be laminated in a more segmented way in the thickness direction.

The liquid crystal diffraction element according to the embodiment of the present invention that includes the optically-anisotropic layer having the liquid crystal alignment pattern and the dark portions 44 (the bright portions 42) includes, for example, a support, an alignment film that is formed on a surface of the support, and an optically-anisotropic layer that is formed on a surface of the alignment film.

Figure 8:
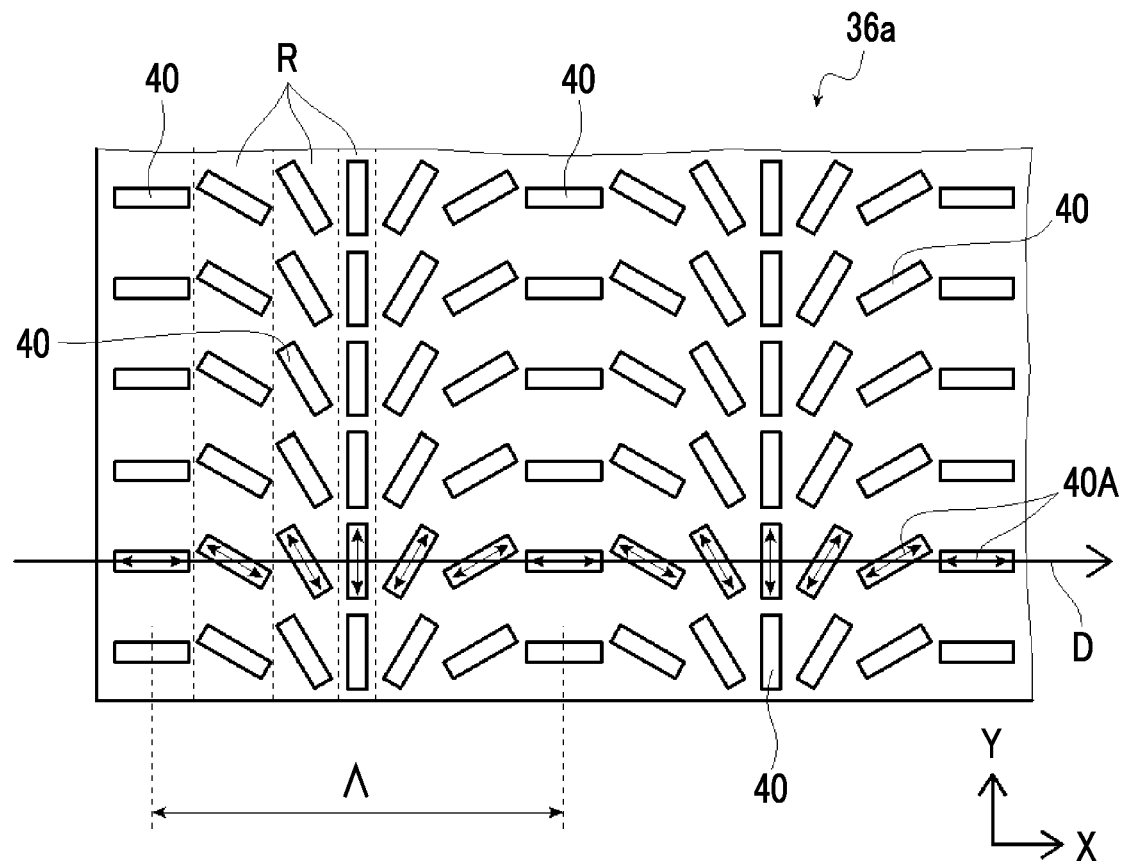
FIG. 8 is a partially enlarged view of a plan view of the optically-anisotropic layer.
Figure 9:
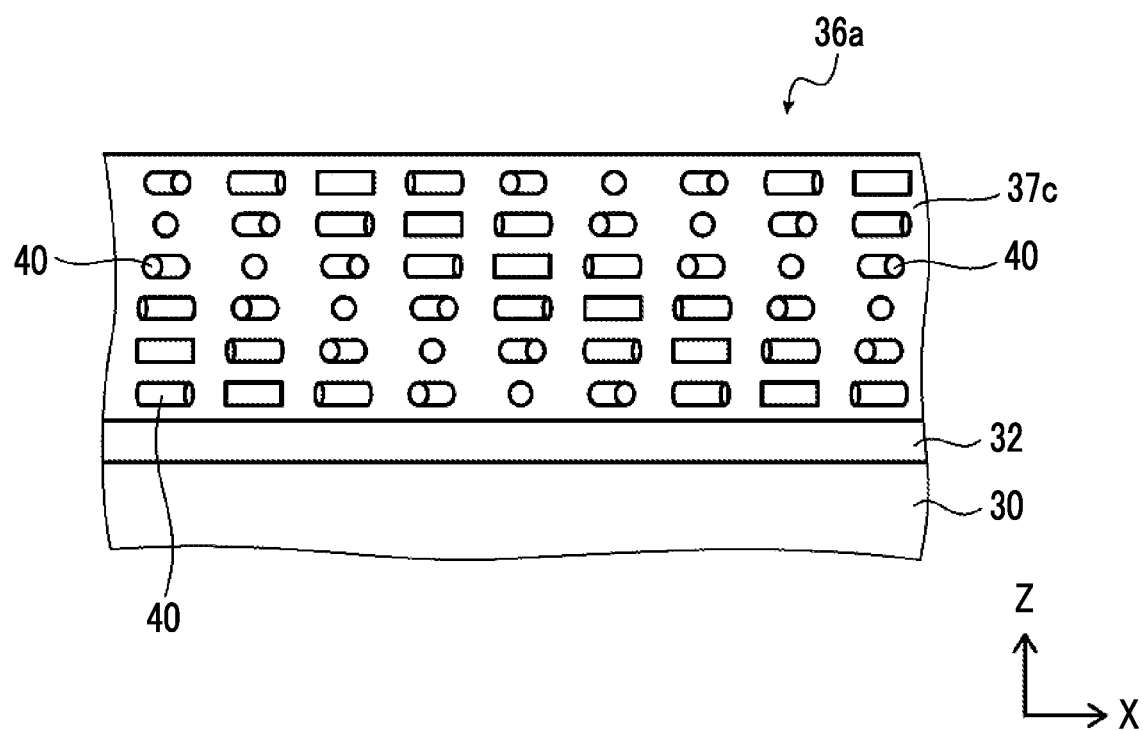
FIG. 9 is an enlarged cross-sectional view showing a partial region of the optically-anisotropic layer.

FIG. 9 is an enlarged conceptual diagram showing the fine region of the liquid crystal diffraction element including the optically-anisotropic layer 36a (region 37c). FIG. 8 is a plan view showing the optically-anisotropic layer 36a shown in FIG. 9.

The liquid crystal diffraction element in the example shown in FIG. 9 includes a support 30, an alignment film 32, and the optically-anisotropic layer 36a. However, the liquid crystal diffraction element according to the embodiment of the present invention is not limited to this configuration, and various layer configurations can be adopted. For example, the liquid crystal diffraction element according to the embodiment of the present invention may consist of the alignment film 32 and the optically-anisotropic layer 36a by peeling off the support 30 from the liquid crystal diffraction element shown in FIG. 9. In addition, the liquid crystal diffraction element according to the embodiment of the present invention may consist of only the optically-anisotropic layer 36a by peeling off the support 30 and the alignment film 32 from the liquid crystal diffraction element shown in FIG. 9. In addition, the liquid crystal diffraction element according to the embodiment of the present invention may consist of the support 30 and the optically-anisotropic layer 36a. Further, in addition to the above-described configurations, the liquid crystal diffraction element according to the embodiment of the present invention may include other layers such as a protective layer (hard coat layer) or an antireflection layer.

In addition, the liquid crystal diffraction element according to the embodiment of the present invention may be a liquid crystal diffraction element comprising:

an optically-anisotropic layer that is formed of a liquid crystal composition including a liquid crystal compound, in which the optically-anisotropic layer has a liquid crystal alignment pattern in which a direction of an optical axis derived from the liquid crystal compound changes while continuously rotating in at least one in-plane direction, in a case where a length over which the direction of the optical axis derived from the liquid crystal compound rotates by 180° in a plane is set as a single period, a length of the single period in the liquid crystal alignment pattern gradually changes in the one in-plane direction, and in a cross-sectional image obtained by observing a cross section of the optically-anisotropic layer taken in a thickness direction parallel to the one in-plane direction with a scanning electron microscope, the optically-anisotropic layer has bright portions and dark portions extending from one surface to another surface, each of the dark portions has two or more inflection points of angle, and the optically-anisotropic layer has regions where tilt directions of the dark portions are different from each other in the thickness direction.

Figure 13:
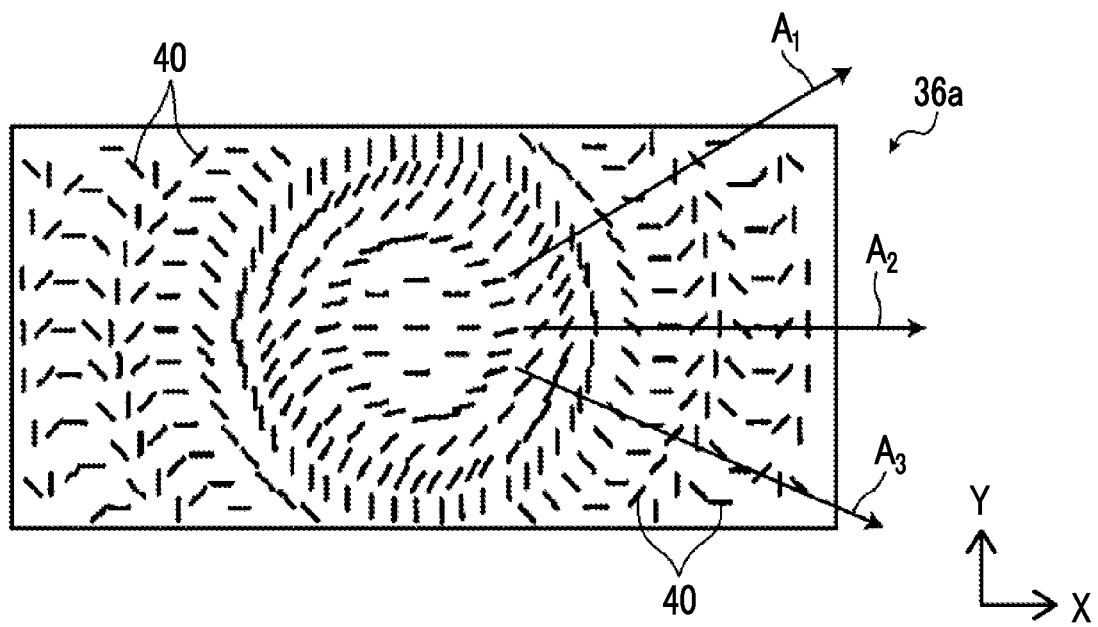
FIG. 13 is a diagram conceptually showing still another example of the optically-anisotropic layer of the liquid crystal diffraction element according to the present invention.

In the example shown in FIG. 13, a liquid crystal alignment pattern in a liquid crystal layer 36 is a concentric circular pattern having a concentric circular shape where the one in-plane direction (arrows $A_1$ to $A_3$) in which a direction of an optical axis of a liquid crystal compound 40 changes while continuously rotating moves from an inner side toward an outer side. The concentric circular pattern is a pattern in which a line that connects liquid crystal compounds of which optical axes face the same direction has a circular shape and circular line segments have a concentric circular shape. In other words, the liquid crystal alignment pattern of the optically-anisotropic layer 36a shown in FIG. 13 is a liquid crystal alignment pattern where the one in-plane direction in which the direction of the optical axis of the liquid crystal compound 40 changes while continuously rotating is provided in a radial shape from the center of the liquid crystal layer 36.

In the optically-anisotropic layer 36a shown in FIG. 13, the optical axis (not shown) of the liquid crystal compound 40 is a longitudinal direction of the liquid crystal compound 40.

In the optically-anisotropic layer 36a, the direction of the optical axis of the liquid crystal compound 40 changes while continuously rotating in a direction in which a large number of optical axes move to the outer side from the center of the optically-anisotropic layer 36a, for example, a direction indicated by an arrow $A_1$, a direction indicated by an arrow $A_2$, a direction indicated by an arrow $A_3$, or . . . . The arrow $A_1$, the arrow $A_2$, and the arrow $A_3$ are arrangement axes described below.

In addition, the optically-anisotropic layer 36a in the liquid crystal diffraction element has regions where single periods $\Lambda$ of the liquid crystal alignment pattern described below are different in a plane. Here, the single period $\Lambda$ of the liquid crystal alignment pattern refers to a length (distance) over which the optical axis of the liquid crystal compound 40 in the liquid crystal alignment pattern rotates by 180° in the one in-plane direction in which the direction of the optical axis changes while continuously rotating.

Specifically, for example, in the direction along the arrow $A_1$ in FIG. 13, in the direction in which the direction of the optical axis derived from the liquid crystal compound 40 changes while continuously rotating, the single period $\Lambda$ gradually decreases from the center toward the outer side.

That is, in FIG. 13, the single period in the vicinity of the outer side is shorter than the single period in the vicinity of the center portion.

In the present invention, the single period Λ gradually changing represents both of a case where the single period Λ continuously changes and a case where the single period Λ changes stepwise.

Although described below in detail, the diffraction angle of the liquid crystal diffraction element depends on the single period Λ of the liquid crystal alignment pattern, and as the single period Λ decreases, the diffraction angle increases.

In a case where the optically-anisotropic layer 36a has the configuration in which the one in-plane direction in which the direction of the optical axis of the liquid crystal compound 40 in the liquid crystal alignment pattern changes while continuously rotating is provided in a radial shape from the center of the optically-anisotropic layer 36a and in which the single period Λ of the liquid crystal alignment pattern gradually decreases from the center toward the outer side in each of the one in-plane directions, circularly polarized light incident into the optically-anisotropic layer 36a having the above-described liquid crystal alignment pattern is bent (diffracted) depending on individual local regions having different directions of optical axes of the liquid crystal compound 40. In this case, the diffraction angles vary depending on the single periods in the regions where circularly polarized light is incident. In the optically-anisotropic layer 36a having the concentric circular liquid crystal alignment pattern, that is, the liquid crystal alignment pattern in which the optical axis changes while continuously rotating in a radial shape, transmission of incidence light can be allowed as converging light depending on the rotation direction of the optical axis of the liquid crystal compound 40 and the direction of circularly polarized light to be incident.

That is, by setting the liquid crystal alignment pattern of the optically-anisotropic layer 36a in a concentric circular shape, the liquid crystal diffraction element 10a exhibits, for example, a function as a convex lens.

Here, in the present invention, as shown in FIG. 1, in the SEM image of the optically-anisotropic layer 36a, the optically-anisotropic layer 36a has the bright portions 42 and the dark portions 44 extending from one surface to another surface, each of the dark portions 44 has two or more inflection points of angle, and the optically-anisotropic layer 36a has the regions where the tilt directions of the dark portions 44 in the thickness direction are different from each other in the thickness direction.

In the example shown in FIG. 1, the optically-anisotropic layer 36a has the stripe pattern of the bright portions 42 and the dark portions 44, and the tilt angle of one dark portion 44 with respect to the surface changes at two positions in the thickness direction. That is, each of the dark portions 44 has two inflection points. In addition, in all of the dark portions 44, a tilt direction in the upper region in the drawing and a tilt direction in the lower region in the drawing are opposite to each other. That is, each of the dark portions 44 has regions where the tilt directions are different.

In addition, the liquid crystal diffraction element in the example shown in FIG. 9 includes the support 30. However, the support 30 does not need to be provided.

For example, the optical element according to the embodiment of the present invention may include only the alignment film and the liquid crystal layer by peeling off the support 30 from the above-described configuration or may include only the liquid crystal layer by peeling off the support 30 and the alignment film from the above-described configuration.

That is, in the liquid crystal diffraction element, the liquid crystal layer can adopt various layer configurations as long as it has the liquid crystal alignment pattern in which the direction of the optical axis derived from the liquid crystal compound rotates in one direction.

As described above, in the liquid crystal diffraction element according to the embodiment of the present invention, the dark portion 44 observed in the cross-sectional SEM image has two or more inflection points of angle and has the regions where the tilt directions are different in the thickness direction. Therefore, in the liquid crystal diffraction element according to the embodiment of the present invention, the wavelength dependence of the diffraction efficiency can be reduced, and light can be diffracted with the same diffraction efficiency irrespective of wavelengths. Further, in the liquid crystal diffraction element according to the embodiment of the present invention, light can be diffracted with high diffraction efficiency irrespective of wavelengths.

In addition, in the liquid crystal alignment pattern of the liquid crystal diffraction element according to the embodiment of the present invention, the length of the single period where the optical axis rotates by 180° may change in a plane. In a case where the length of the single period changes in a plane, the liquid crystal diffraction element according to the embodiment of the present invention diffracts (refracts) light having the same wavelength at different angles depending on light incidence positions in a plane. Accordingly the liquid crystal diffraction element according to the embodiment of the present invention is suitably applicable to various optical devices where light having the same wavelength is required to be diffracted at different angles irrespective of incidence positions, for example, a lens element in a head-mounted display for VR or a lens element that is used in combination with a refractive lens to improve color break.

<<Support>>

The support 30 supports the alignment film 32 and the optically-anisotropic layer 36a.

As the support 30, various sheet-shaped materials (films or plate-shaped materials) can be used as long as they can support the alignment film and the optically-anisotropic layer.

As the support 30, a transparent support is preferable, and examples thereof include a polyacrylic resin film such as polymethyl methacrylate, a cellulose resin film such as cellulose triacetate, a cycloolefin polymer film (for example, trade name "ARTON", manufactured by JSR Corporation; or trade name "ZEONOR", manufactured by Zeon Corporation), polyethylene terephthalate (PET), polycarbonate, and polyvinyl chloride. The support is not limited to a flexible film and may be a non-flexible substrate such as a glass substrate.

In addition, the support 30 may have a multi-layer structure. Examples of the multi-layer support include a support including: one of the above-described supports having a single-layer structure that is provided as a substrate; and another layer that is provided on a surface of the substrate.

The thickness of the support 30 is not particularly limited and may be appropriately set depending on the use of the liquid crystal diffraction element, a material for forming the support 30, and the like in a range where the alignment film and the optically-anisotropic layer can be supported.

The thickness of the support 30 is preferably 1 to 1000 μm, more preferably 3 to 250 and still more preferably 5 to 150 μm.

<<Alignment Film>>

The alignment film 32 is formed on the surface of the support 30.

The alignment film 32 is an alignment film for aligning the liquid crystal compound 40 to the above-described predetermined liquid crystal alignment pattern during the formation of the optically-anisotropic layer 36a.

As described above, in the liquid crystal diffraction element according to the embodiment of the present invention, the optically-anisotropic layer has a liquid crystal alignment pattern in which a direction of an optical axis 40A (refer to FIG. 8) derived from the liquid crystal compound 40 changes while continuously rotating in one in-plane direction (arrow X direction described below). Accordingly, the alignment film is formed such that the optically-anisotropic layer can form the liquid crystal alignment pattern.

In addition, in the liquid crystal alignment pattern, a length over which the direction of the optical axis 40A rotates by 180° in the one in-plane direction in which the direction of the optical axis 40A changes while continuously rotating is set as a single period Λ (a rotation period of the optical axis).

In the following description, "the direction of the optical axis 40A rotates" will also be simply referred to as "the optical axis 40A rotates".

As the alignment film, various well-known films can be used.

Examples of the alignment film include a rubbed film formed of an organic compound such as a polymer, an obliquely deposited film formed of an inorganic compound, a film having a microgroove, and a film formed by lamination of Langmuir-Blodgett (LB) films formed with a Langmuir-Blodgett's method using an organic compound such as ω-tricosanoic acid, dioctadecylmethylammonium chloride, or methyl stearate.

The alignment film formed by a rubbing treatment can be formed by rubbing a surface of a polymer layer with paper or fabric in a given direction multiple times. As the material used for the alignment film, for example, a material for forming polyimide, polyvinyl alcohol, a polymer having a polymerizable group described in JP1997-152509A (JP-H9-152509A), or an alignment film such as JP2005-97377A, JP2005-99228A, and JP2005-128503A is preferable.

In the liquid crystal diffraction element according to the embodiment of the present invention, for example, the alignment film can be suitably used as a so-called photo-alignment film obtained by irradiating a photo-alignment material with polarized light or non-polarized light. That is, in the liquid crystal diffraction element according to the embodiment of the present invention, a photo-alignment film that is formed by applying a photo-alignment material to the support 30 is suitably used as the alignment film.

The irradiation of polarized light can be performed in a direction perpendicular or oblique to the photo-alignment film, and the irradiation of non-polarized light can be performed in a direction oblique to the photo-alignment film.

Preferable examples of the photo-alignment material used in the photo-alignment film that can be used in the present invention include: an azo compound described in JP2006-285197A, JP2007-76839A, JP2007-138138A, JP2007-94071A, JP2007-121721A, JP2007-140465A, JP2007-156439A, JP2007-133184A, JP2009-109831A, JP3883848B, and JP4151746B; an aromatic ester compound described in JP2002-229039A; a maleimide- and/or alkenyl-substituted nadiimide compound having a photo-alignable unit described in JP2002-265541A and JP2002-317013A; a photocrosslinking silane derivative described in JP4205195B and JP4205198B, a photocrosslinking polyimide, a photocrosslinking polyamide, or a photocrosslinking ester described in JP2003-520878A, JP2004-529220A, and JP4162850B; and a photodimerizable compound, in particular, a cinnamate (cinnamic acid) compound, a chalcone compound, or a coumarin compound described in JP1997-118717A (JP-H9-118717A), JP1998-506420A (JP-H10-506420A), JP2003-505561A, WO2010/150748A, JP2013-177561A, and Among these, an azo compound, a photocrosslinking polyimide, a photocrosslinking polyamide, a photo-crosslinking ester, a cinnamate compound, or a chalcone compound is suitably used.

The thickness of the alignment film is not particularly limited. The thickness with which a required alignment function can be obtained may be appropriately set depending on the material for forming the alignment film.

The thickness of the alignment film is preferably 0.01 to 5 μm and more preferably 0.05 to 2 μm.

A method of forming the alignment film is not limited. Any one of various well-known methods corresponding to a material for forming the alignment film can be used. For example, a method including: applying the alignment film to a surface of the support 30; drying the applied alignment film; and exposing the alignment film to laser light to form an alignment pattern can be used.

Figure 10:
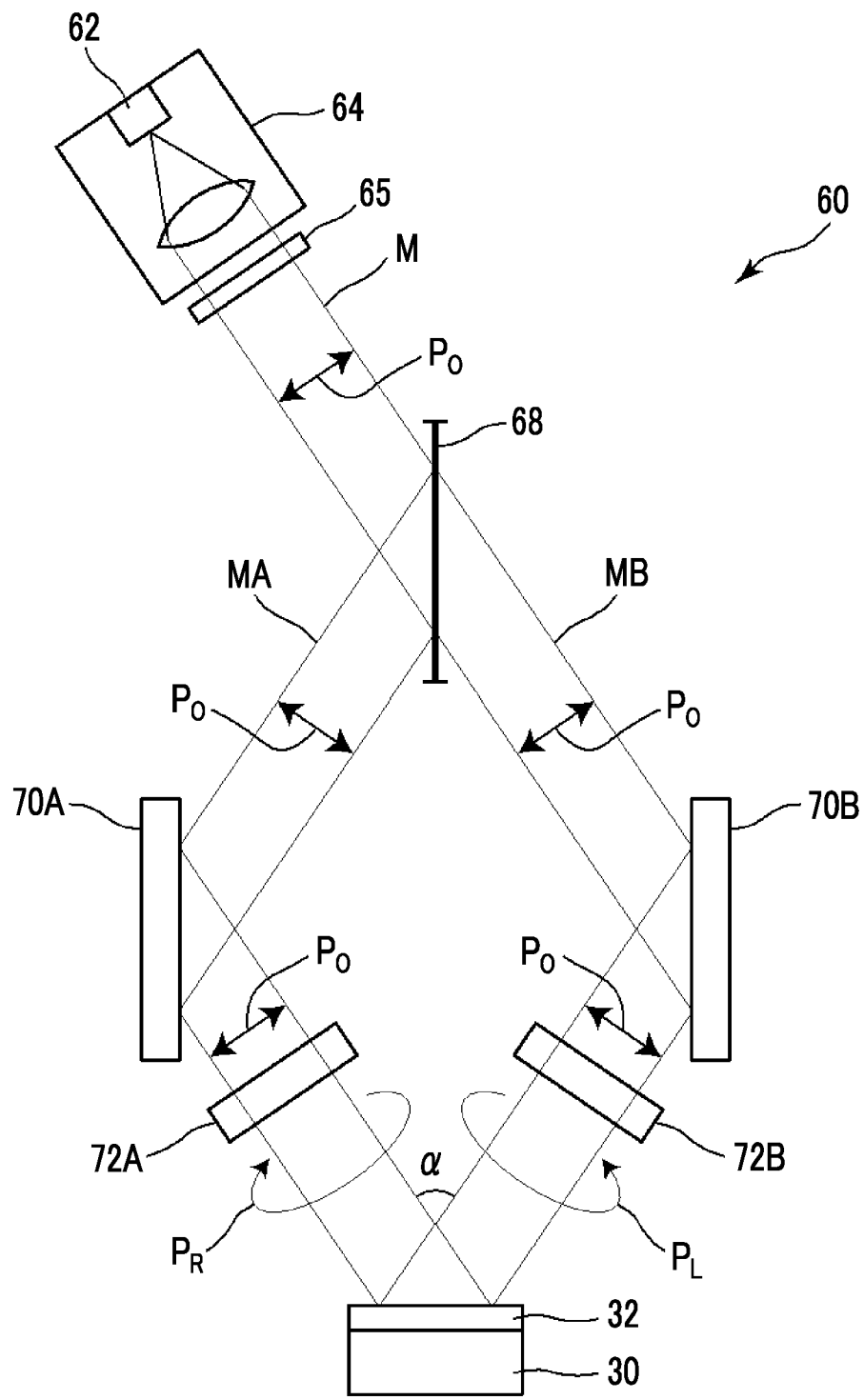
FIG. 10 is a diagram conceptually showing an example of an exposure device that exposes an alignment film.

FIG. 10 conceptually shows an example of an exposure device that exposes the alignment film to form the above-described alignment pattern.

An exposure device 60 shown in FIG. 10 includes: a light source 64 including a laser 62; a λ/2 plate 65 that changes a polarization direction of laser light M emitted from the laser 62; a beam splitter 68 that splits the laser light M emitted from the laser 62 into two beams MA and MB; mirrors 70A and 70B that are disposed on optical paths of the split two beams MA and MB; and λ/4 plates 72A and 72B.

Although not shown in the drawing, the light source 64 emits linearly polarized light $P_0$. The λ/4 plate 72A converts the linearly polarized light $P_0$ (beam MA) into right circularly polarized light $P_R$, and the λ/4 plate 72B converts the linearly polarized light $P_0$ (beam MB) into left circularly polarized light $P_L$.

The support 30 including the alignment film 32 on which the alignment pattern is not yet formed is disposed at an exposed portion, the two beams MA and MB intersect and interfere with each other on the alignment film 32, and the alignment film 32 is irradiated with and exposed to the interference light.

Due to the interference in this case, the polarization state of light with which the alignment film 32 is irradiated periodically changes according to interference fringes. As a result, in the alignment film 32, an alignment pattern in which the alignment state periodically changes can be obtained. That is, an alignment film (hereinafter, also referred to as "patterned alignment film") having an alignment pattern in which the alignment state changes periodically is obtained.

In the exposure device 60, by changing an intersecting angle α between the two beams MA and MB, the period of the alignment pattern can be adjusted. That is, by adjusting the intersecting angle α in the exposure device 60, in the alignment pattern in which the optical axis 40A derived from the liquid crystal compound 40 continuously rotates in the one in-plane direction, the length (single period Λ) of the single period over which the optical axis 40A rotates by 180° in the one in-plane direction in which the optical axis 40A rotates can be adjusted.

By forming the optically-anisotropic layer on the patterned alignment film having the alignment pattern in which the alignment state periodically changes, as described below, the optically-anisotropic layer 36a having the liquid crystal alignment pattern in which the optical axis 40A derived from the liquid crystal compound 40 continuously rotates in the one in-plane direction can be formed.

In addition, by rotating the optical axes of the λ/4 plates 72A and 72B by 90°, respectively, the rotation direction of the optical axis 40A can be reversed.

As described above, the patterned alignment film has the alignment pattern for aligning the liquid crystal compound 40 to have the liquid crystal alignment pattern in which the direction of the optical axis derived from the liquid crystal compound in the optically-anisotropic layer formed on the patterned alignment film changes while continuously rotating in at least one in-plane direction. In a case where an axis in the direction in which the liquid crystal compound 40 is aligned is an arrangement axis, it can be said that the patterned alignment film has an alignment pattern in which the direction of the arrangement axis changes while continuously rotating in at least one in-plane direction. The arrangement axis of the patterned alignment film can be detected by measuring absorption anisotropy. For example, in a case where the amount of light transmitted through the patterned alignment film is measured by irradiating the patterned alignment film with linearly polarized light while rotating the patterned alignment film, it is observed that a direction in which the light amount is the maximum or the minimum gradually changes in the one in-plane direction.

In the liquid crystal diffraction element according to the embodiment of the present invention, the alignment film is provided as a preferable aspect and is not an essential component.

For example, the following configuration can also be adopted, in which, by forming the alignment pattern on the support 30 using a method of rubbing the support 30, a method of processing the support 30 with laser light or the like, or the like, the optically-anisotropic layer 36a has the liquid crystal alignment pattern in which the direction of the optical axis 40A derived from the liquid crystal compound 40 changes while continuously rotating in at least one in-plane direction.

Figure 14:
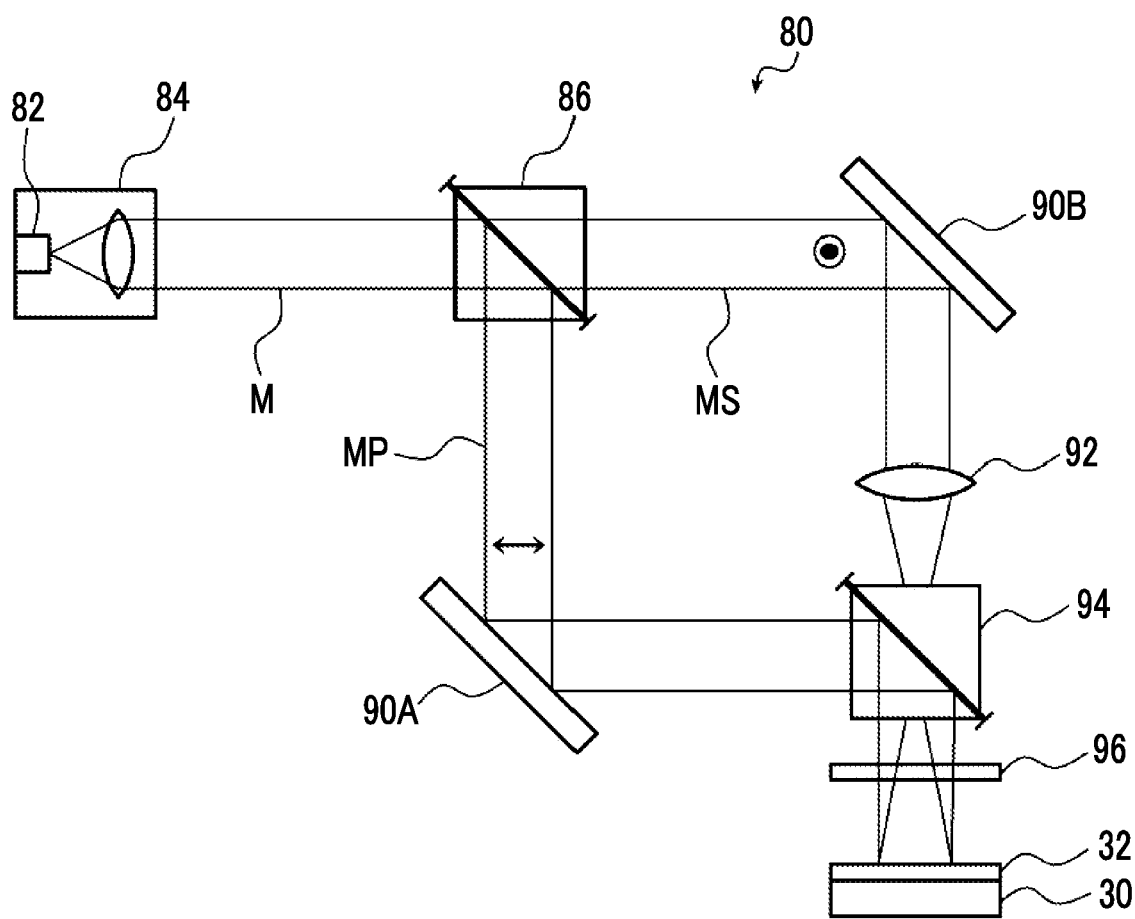
FIG. 14 is a diagram conceptually showing an example of an exposure device that exposes an alignment film.

The exposure device of the alignment film 32 is not limited to the example shown in FIG. 10. FIG. 14 shows another example of the exposure device that exposes the alignment film 32. The exposure device shown in FIG. 14 is used to form an alignment pattern having a concentric circular shape on the alignment film as shown in FIG. 13.

An exposure device 80 includes: a light source 84 that includes a laser 82; a polarization beam splitter 86 that divides the laser light M emitted from the laser 82 into S polarized light MS and P polarized light MP; a mirror 90A that is disposed on an optical path of the P polarized light MP; a mirror 90B that is disposed on an optical path of the S polarized light MS; a lens 92 that is disposed on the optical path of the S polarized light MS; a polarization beam splitter 94; and a λ/4 plate 96.

The P polarized light MP that is split by the polarization beam splitter 86 is reflected from the mirror 90A to be incident into the polarization beam splitter 94. On the other hand, the S polarized light MS that is split by the polarization beam splitter 86 is reflected from the mirror 90B and is collected by the lens 92 to be incident into the polarization beam splitter 94.

The P polarized light MP and the S polarized light MS are multiplexed by the polarization beam splitter 94, are converted into right circularly polarized light and left circularly polarized light by the λ/4 plate 96 depending on the polarization direction, and are incident into the alignment film 32 on the support 30.

Here, due to interference between the right circularly polarized light and the left circularly polarized light, the polarization state of light with which the alignment film is irradiated periodically changes according to interference fringes. The intersecting angle between the right circularly polarized light and the left circularly polarized light changes from the inside to the outside of the concentric circle. Therefore, an exposure pattern in which the pitch changes from the inner side to the outer side can be obtained. As a result, in the alignment film, a concentric circular alignment pattern in which the alignment state periodically changes can be obtained.

In the exposure device 80, the single period Λ in the liquid crystal alignment pattern in which the optical axis of the liquid crystal compound 40 continuously rotates by 180° in the one in-plane direction can be controlled by changing the refractive power of the lens 92 (the F number of the lens 92), the focal length of the lens 92, the distance between the lens 92 and the alignment film 32, and the like.

In addition, by adjusting the refractive power of the lens 92 (the F number of the lens 92), the length Λ of the single period in the liquid crystal alignment pattern in the one in-plane direction in which the optical axis continuously rotates can be changed.

Specifically, In addition, the length Λ of the single period in the liquid crystal alignment pattern in the one in-plane direction in which the optical axis continuously rotates can be changed depending on a light spread angle at which light is spread by the lens 92 due to interference with parallel light. More specifically, in a case where the refractive power of the lens 92 is weak, light is approximated to parallel light. Therefore, the length Λ of the single period in the liquid crystal alignment pattern gradually decreases from the inner side toward the outer side, and the F number increases. Conversely, in a case where the refractive power of the lens 92 becomes stronger, the length Λ of the single period in the liquid crystal alignment pattern rapidly decreases from the inner side toward the outer side, and the F number decreases.

Further, depending on the applications of the liquid crystal diffraction element such as a case where it is desired to provide a light amount distribution in transmitted light, a configuration in which regions having partially different lengths of the single periods A in the arrangement axis D direction are provided can also be used instead of the configuration in which the length of the single period Λ gradually changes in the arrangement axis D direction. For example, as a method of partially changing the single period Λ, for example, a method of scanning and exposing the photo-alignment film to be patterned while freely changing a polarization direction of laser light to be gathered can be used.

In addition, the wavelength of the laser light used for exposing the alignment film can be appropriately set depending on, for example, the kind of the alignment film to be used. For example, laser light having in a wavelength range of deep ultraviolet light to visible light to infrared light can be preferably used. For example, laser light having a wavelength of 266 nm, 325 nm, 355 nm, 370 nm, 385 nm, 405 nm, or 460 nm can be used, but the present invention is not limited to the above-described example. Laser light having various wavelengths can be used depending on the kind of the alignment film and the like.

After providing the optically-anisotropic layer on the alignment film, the optically-anisotropic layer may be peeled or transferred from the alignment film. The transfer can also be performed multiple times according to the bonding surface of the optically-anisotropic layer. The peeling or transfer method can be freely selected depending on the purposes. For example, by temporarily transferring the optically-anisotropic layer to a substrate including an adhesive layer, transferring the laminate to a thing as a transfer destination, and peeling off the substrate, the interface of the optically-anisotropic layer on the alignment film side can be caused to face the thing as the transfer destination. In addition, in order to cause a surface of the optically-anisotropic layer opposite to the alignment film to face the thing side as the transfer destination, after bonding the optically-anisotropic layer and the thing as the transfer destination through an adhesive, the optically-anisotropic layer may be peeled off from the alignment film.

In a case where the optically-anisotropic layer is peeled off from the alignment film, in order to reduce damage (for example, fracture or crack) to the optically-anisotropic layer and the alignment film, it is preferable to adjust a peeling angle, a speed, or the like.

In addition, the alignment film may be repeatedly used in a range where there is no problem in aligning properties. Before providing the optically-anisotropic layer on the alignment film, the alignment film can be cleaned with an organic solvent or the like.

<<Optically-Anisotropic Layer>>

The optically-anisotropic layer 36a is formed on the surface of the alignment film 32.

In FIG. 8, in order to simplify the drawing and to clarify the configuration of the optically-anisotropic layer 36a, only the liquid crystal compound 40 (liquid crystal compound molecules) on the surface of the alignment film in the first optically-anisotropic layer 36a is shown. However, as conceptually shown in FIG. 9 showing the optically-anisotropic layer 36a, the optically-anisotropic layer 36a has a structure in which the aligned liquid crystal compounds 40 are laminated as in an optically-anisotropic layer that is formed using a composition including a typical liquid crystal compound.

In addition, as described above, the optically-anisotropic layer 36a can also include the three regions including the region 37a, the region 37b, and the region 37c corresponding to the inflection points of the dark portion 44 from below. FIG. 9 shows only the lowermost (support 30 side) region 37c in order to simplify the drawing.

As described above, in the liquid crystal diffraction element according to the embodiment of the present invention, the optically-anisotropic layer 36a is formed of the composition including the liquid crystal compound.

In a case where an in-plane retardation value is set as $\lambda/2$, the optically-anisotropic layer has a function of a general $\lambda/2$ plate, that is, a function of imparting a phase difference of a half wavelength, that is, 180° to two linearly polarized light components in light incident into the optically-anisotropic layer and are perpendicular to each other.

Here, since the liquid crystal compound rotates to be aligned in the in-plane direction, the optically-anisotropic layer diffracts (refracts) incident circularly polarized light to be transmitted in a direction in which the direction of the optical axis continuously rotates. In this case, the diffraction direction varies depending on the turning direction of incident circularly polarized light.

That is, the optically-anisotropic layer allows transmission of circularly polarized light and diffracts this transmitted light.

In addition, the optically-anisotropic layer changes a turning direction of the transmitted circularly polarized light into an opposite direction.

The optically-anisotropic layer 36a has the liquid crystal alignment pattern in which the direction of the optical axis derived from the liquid crystal compound changes while continuously rotating in the one in-plane direction indicated by arrow D (hereinafter, also referred to as the arrangement axis D) in a plane of the optically-anisotropic layer. In the example shown in FIG. 8, it is assumed that the direction of the arrangement axis D is the X direction and a direction perpendicular to the direction of the arrangement axis D is the Y direction.

The optical axis 40A derived from the liquid crystal compound 40 is an axis having the highest refractive index in the liquid crystal compound 40, that is, a so-called slow axis. For example, in a case where the liquid crystal compound 40 is a rod-like liquid crystal compound, the optical axis 40A is parallel to a rod-like major axis direction.

In the following description, the optical axis 40A derived from the liquid crystal compound 40 will also be referred to as "the optical axis 40A of the liquid crystal compound 40" or "the optical axis 40A".

In the optically-anisotropic layer 36a, the liquid crystal compound 40 is two-dimensionally aligned in a plane parallel to the arrow X direction and a Y direction perpendicular to the arrow X direction. In FIGS. 1 to 6, the Y direction is a direction perpendicular to the paper plane.

FIG. 8 conceptually shows a plan view of the optically-anisotropic layer 36a.

The plan view is a view in a case where the liquid crystal diffraction element is seen from the top in FIG. 9, that is, a view in a case where the liquid crystal diffraction element is seen from a thickness direction (laminating direction of the respective layers (films)). In other words, the plan view is a view in a case where the optically-anisotropic layer 36a is seen from a direction perpendicular to the surface.

In addition, in FIG. 8, in order to clarify the configuration of the liquid crystal diffraction element according to the embodiment of the present invention, only the liquid crystal compound 40 on the surface of the alignment film 32 is shown. However, in the thickness direction, as shown in FIG. 9, the optically-anisotropic layer 36a has the structure in which the liquid crystal compound 40 on the surface of the alignment film 32 is laminated.

In FIG. 8, a part in a plane of the optically-anisotropic layer 36a will be described as a representative example. At each of the in-plane positions of the optically-anisotropic layer, basically, the same configurations and effects are the same.

The optically-anisotropic layer 36a has the liquid crystal alignment pattern in which the direction of the optical axis 40A changes while continuously rotating in the arrangement axis D direction in a plane of the optically-anisotropic layer 36a.

Specifically, "the direction of the optical axis 40A changes while continuously rotating in the arrangement axis D direction (the predetermined one in-plane direction)" represents that an angle between the optical axis 40A of the liquid crystal compound 40, which is arranged in the arrangement axis D direction, and the arrangement axis D direction varies depending on positions in the arrangement axis D direction, and the angle between the optical axis 40A and the arrangement axis D direction sequentially changes from θ to θ+180° or θ−180° in the arrangement axis D direction.

A difference between the angles of the optical axes 40A of the liquid crystal compounds 40 adjacent to each other in the arrangement axis D direction is preferably 45° or less, more preferably 15° or less, and still more preferably less than 15°.

On the other hand, regarding the liquid crystal compound 40 forming the optically-anisotropic layer 36a, the liquid crystal compounds 40 having the same direction of the optical axes 40A are arranged at regular intervals in the Y direction perpendicular to the arrangement axis D direction, that is, the Y direction perpendicular to the one in-plane direction in which the optical axis 40A continuously rotates.

In other words, regarding the liquid crystal compound 40 forming the optically-anisotropic layer 36a, in the liquid crystal compounds 40 arranged in the Y direction, angles between the directions of the optical axes 40A and the arrangement axis D direction are the same.

In the liquid crystal diffraction element according to the embodiment of the present invention, in the liquid crystal alignment pattern of the liquid crystal compound 40, the length (distance) over which the direction of the optical axis 40A rotates by 180° in the arrangement axis D direction in which the optical axis 40A changes while continuously rotating in a plane is the length Λ of the single period in the liquid crystal alignment pattern. In other words, the length of the single period in the liquid crystal alignment pattern is defined as the distance between θ and θ+180° that is a range of the angle between the optical axis 40A and the arrangement axis D direction. The length of the single period in the liquid crystal alignment pattern refers to the length of the single period in the periodic structure of the diffraction element.

That is, a distance between centers of two liquid crystal compounds 40 in the arrangement axis D direction is the length Λ of the single period, the two liquid crystal compounds having the same angle in the arrangement axis D direction. Specifically, as shown in FIG. 8, a distance between centers in the arrangement axis D direction of two liquid crystal compounds 40 in which the arrangement axis D direction and the direction of the optical axis 40A match each other is the length Λ of the single period. In the following description, the length Λ of the single period will also be referred to as "single period Λ".

In the liquid crystal diffraction element according to the embodiment of the present invention, in the liquid crystal alignment pattern of the optically-anisotropic layer, the single period Λ is repeated in the arrangement axis D direction, that is, in the one in-plane direction in which the direction of the optical axis 40A changes while continuously rotating.

As described above, in the liquid crystal compounds arranged in the Y direction in the optically-anisotropic layer, the angles between the optical axes 40A and the arrangement axis D direction (the one in-plane direction in which the direction of the optical axis of the liquid crystal compound 40 rotates) are the same. Regions where the liquid crystal compounds 40 in which the angles between the optical axes 40A and the arrangement axis D direction are the same are disposed in the Y direction will be referred to as "regions R".

In this case, it is preferable that an in-plane retardation (Re) value of each of the regions R is a half wavelength, that is, λ/2. The in-plane retardation is calculated from the product of a difference Δn in refractive index generated by refractive index anisotropy of the region R and the thickness of the optically-anisotropic layer. Here, the difference in refractive index generated by refractive index anisotropy of the region R in the optically-anisotropic layer is defined by a difference between a refractive index of a direction of an in-plane slow axis of the region R and a refractive index of a direction perpendicular to the direction of the slow axis. That is, the difference Δn in refractive index generated by refractive index anisotropy of the region R is the same as a difference between a refractive index of the liquid crystal compound 40 in the direction of the optical axis 40A and a refractive index of the liquid crystal compound 40 in a direction perpendicular to the optical axis 40A in a plane of the region R. That is, the difference Δn in refractive index is the same as the difference in refractive index of the liquid crystal compound.

In a case where circularly polarized light is incident into the above-described optically-anisotropic layer 36a, the light is diffracted (refracted) such that the direction of the circularly polarized light is converted.

Figure 11:
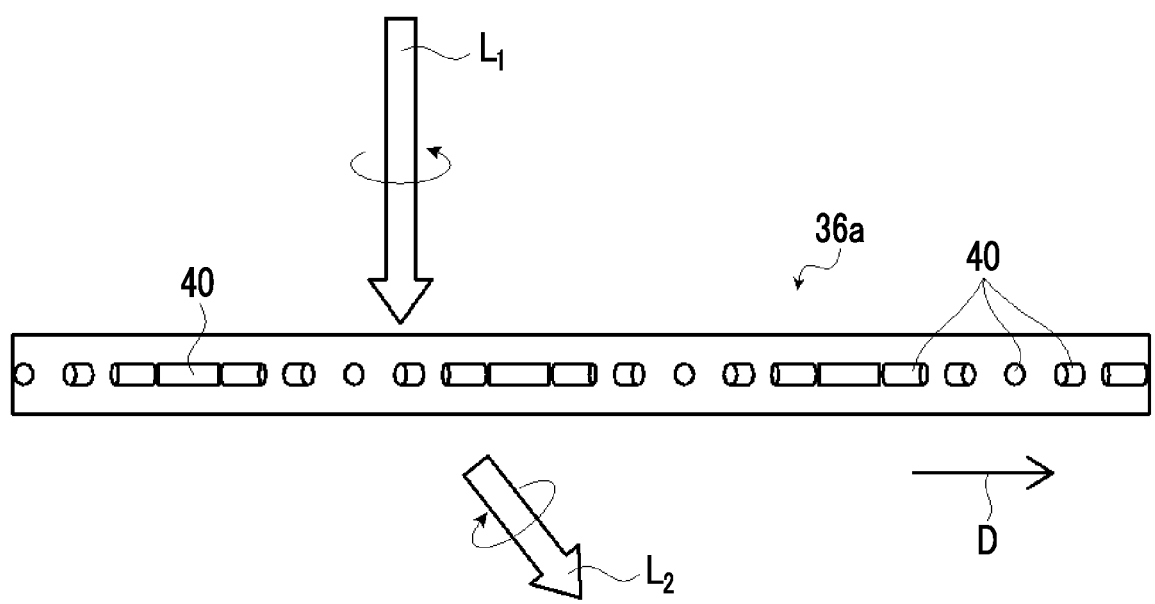
FIG. 11 is a conceptual diagram showing an action of the optically-anisotropic layer.
Figure 12:
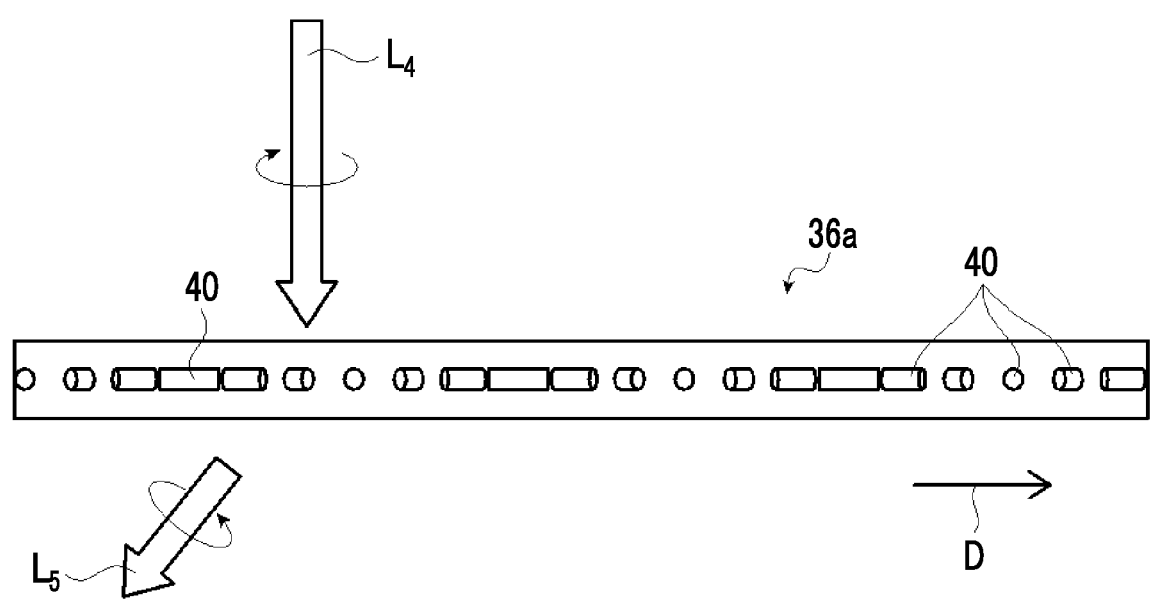
FIG. 12 is a conceptual diagram showing the action of the optically-anisotropic layer.

This action is conceptually shown in FIGS. 11 and 12 using the optically-anisotropic layer 36a. In FIG. 11 and FIG. 12, in order to simplify the drawing and to clarify the configuration of the liquid crystal diffraction element, only the liquid crystal compound 40 (liquid crystal compound molecules) on the surface of the alignment film in the optically-anisotropic layer 36a is shown.

In addition, in the optically-anisotropic layer 36a, the value of the product of the difference in refractive index of the liquid crystal compound and the thickness of the optically-anisotropic layer is λ/2.

As shown in FIG. 11, in a case where the value of the product of the difference in refractive index of the liquid crystal compound and the thickness of the optically-anisotropic layer in the optically-anisotropic layer 36a is λ/2 and incidence light $L_1$ as left circularly polarized light is incident into the optically-anisotropic layer 36a, the incidence light $L_1$ transmits through the optically-anisotropic layer 36a to be imparted with a retardation of 180°, and the transmitted light $L_2$ is converted into right circularly polarized light.

In addition, the liquid crystal alignment pattern formed in the optically-anisotropic layer 36a is a pattern that is periodic in the arrangement axis D direction. Therefore, the transmitted light $L_2$ travels in a direction different from a traveling direction of the incidence light $L_1$. This way, the incidence light $L_1$ of the left circularly polarized light is converted into the transmitted light $L_2$ of right circularly polarized light that is tilted by a predetermined angle in the arrangement axis D direction with respect to an incidence direction.

On the other hand, as shown in FIG. 12, in a case where the value of the product of the difference in refractive index of the liquid crystal compound and the thickness of the optically-anisotropic layer in the optically-anisotropic layer 36a is λ/2 and incidence light $L_4$ as right circularly polarized light is incident into the optically-anisotropic layer 36a, the incidence light $L_4$ transmits through the optically-anisotropic layer 36a to be imparted with a retardation of 180° and is converted into transmitted light $L_5$ of left circularly polarized light.

In addition, the liquid crystal alignment pattern formed in the optically-anisotropic layer 36a is a pattern that is periodic in the arrangement axis D direction. Therefore, the transmitted light $L_5$ travels in a direction different from a traveling direction of the incidence light $L_4$. In this case, the transmitted Light $L_5$ travels in a direction different from the transmitted light $L_2$, that is, in a direction opposite to the arrangement axis D direction with respect to the incidence direction. This way, the incidence light $L_4$ is converted into the transmitted light $L_5$ of left circularly polarized light that is tilted by a predetermined angle in a direction opposite to the arrangement axis D direction with respect to an incidence direction.

By changing the single period Λ of the liquid crystal alignment pattern formed in the optically-anisotropic layer 36a, diffraction (refraction) angles of the transmitted light components $L_2$ and $L_5$ can be adjusted. Specifically, even in the optically-anisotropic layer 36a, as the single period Λ of the liquid crystal alignment pattern decreases, light components transmitted through the liquid crystal compounds 40 adjacent to each other more strongly interfere with each other. Therefore, the transmitted light components $L_2$ and $L_5$ can be more largely diffracted.

In addition, by reversing the rotation direction of the optical axis 40A of the liquid crystal compound 40 that rotates in the arrangement axis D direction, the diffraction direction of transmitted light can be reversed. That is, in the example FIGS. 11 and 12, the rotation direction of the optical axis 40A toward the arrangement axis D direction is clockwise. By setting this rotation direction to be counterclockwise, the diffraction direction of transmitted light can be reversed.

Here, the diffraction angle (refraction angle) of the optically-anisotropic layer 36a varies depending on the wavelength of incident light. Specifically, as the wavelength of light increases, the light is more largely diffracted. That is, in a case where incidence light is red light, green light, and blue light, the red light is diffracted to the highest degree, the green light is diffracted to the second highest degree, and the blue light is diffracted to the lowest degree.

In the present invention, the single period Λ in the liquid crystal alignment pattern of the optically-anisotropic layer 36a is uniform. Accordingly, light having the same wavelength is diffracted at the same angle.

As described above, the angle of the dark portion 44 with respect to the surface of the optically-anisotropic layer can be adjusted depending on the length of the single period over which the optical axis of the liquid crystal compound rotates by 180° in the one in-plane direction and the size of the twist of the liquid crystal compound 40 that is twisted and aligned in the thickness direction.

As the single period Λ decreases and as the twist in the thickness direction decreases, the angle of the dark portion 44 with respect to the surface of the optically-anisotropic layer increases. That is, as the single period Λ decreases and as the twist in the thickness direction decreases, the dark portion 44 is in a rising state with respect to the surface of the optically-anisotropic layer.

As described above, as the single period Λ of the liquid crystal alignment pattern decreases, the diffraction angle of incidence light increases.

In addition, the tilt direction of the dark portion 44, for example, the tilt direction to the upper right in the drawing or the tilt direction to the upper left in the drawing can be selected depending on the rotation direction (clockwise or counterclockwise) of the optical axis 40A toward the one in-plane direction and the twisted direction (clockwise or counterclockwise) of the liquid crystal compound 40 in the thickness direction.

In the optically-anisotropic layer 36a, it is preferable that the in-plane retardation value of the plurality of regions R is a half wavelength. It is preferable that an in-plane retardation Re(550)=$\Delta n_{550} \times d$ of the plurality of regions R of the optically-anisotropic layer 36a with respect to the incidence light having a wavelength of 550 nm is in a range defined by the following Expression (1). Here, $\Delta n_{550}$ represents a difference in refractive index generated by refractive index anisotropy of the region R in a case where the wavelength of incidence light is 550 nm, and d represents the thickness of the optically-anisotropic layer 36a.

$$200 \text{ nm} \leq \Delta n_{550} \times d \leq 350 \text{ nm} \quad (1)$$

That is, in a case where the in-plane retardation Re(550)=$\Delta n_{550} \times d$ of the plurality of regions R of the optically-anisotropic layer 36a satisfies Expression (1), a sufficient amount of a circularly polarized light component in light incident into the optically-anisotropic layer 36a can be converted into circularly polarized light that travels in a direction tilted in a forward direction or reverse direction with respect to the arrangement axis D direction. It is more preferable that the in-plane retardation Re(550)=$\Delta n_{550} \times d$ satisfies 225 nm≤$\Delta n_{550} \times d$≤340 nm, and it is still more preferable that the in-plane retardation Re(550)=$\Delta n_{550} \times d$ satisfies 250 nm≤$\Delta n_{550} \times d$≤330 nm.

Expression (1) is a range with respect to incidence light having a wavelength of 550 nm. However, an in-plane retardation Re(λ)=$\Delta n_{\lambda} \times d$ of the plurality of regions R of the optically-anisotropic layer with respect to incidence light having a wavelength of λ nm is preferably in a range defined by the following Expression (1-2) and can be appropriately set.

$$0.7 \times (\lambda/2) \text{ nm} \leq \Delta n_{\lambda} \times d \leq 1.3 \times (\lambda/2) \text{ nm} \quad (1\text{-}2)$$

In addition, the value of the in-plane retardation of the plurality of regions R of the optically-anisotropic layer 36a in a range outside the range of Expression (1) can also be used. Specifically, by satisfying $\Delta n_{550} \times d < 200$ nm or 350 nm<$\Delta n_{550} \times d$, the light can be classified into light that travels in the same direction as a traveling direction of the incidence light and light that travels in a direction different from a traveling direction of the incidence light. In a case where $\Delta n_{550} \times d$ approaches 0 nm or 550 nm, the amount of the light component that travels in the same direction as a traveling direction of the incidence light increases, and the amount of the light component that travels in a direction different from a traveling direction of the incidence light decreases.

Further, it is preferable that an in-plane retardation Re(450)=$\Delta n_{450} \times d$ of each of the plurality of regions R of the optically-anisotropic layer 36a with respect to incidence light having a wavelength of 450 nm and an in-plane retardation Re(550)=$\Delta n_{550} \times d$ of each of the plurality of regions R of the optically-anisotropic layer 36a with respect to incidence light having a wavelength of 550 nm satisfy the following Expression (2). Here, $\Delta n_{450}$ represents a difference in refractive index generated by refractive index anisotropy of the region R in a case where the wavelength of incidence light is 450 nm.

$$(\Delta n_{450} \times d)/(\Delta n_{550} \times d) < 1.0 \quad (2)$$

Expression (2) represents that the liquid crystal compound 40 in the optically-anisotropic layer 36a has reverse dispersibility. That is, by satisfying Expression (2), the optically-anisotropic layer 36a can correspond to incidence light having a wide range of wavelength.

The optically-anisotropic layer is formed of a cured layer of a liquid crystal composition including a rod-like liquid crystal compound or a disk-like liquid crystal compound, and has a liquid crystal alignment pattern in which an optical axis of the rod-like liquid crystal compound or an optical axis of the disk-like liquid crystal compound is aligned as described above.

The optically-anisotropic layer is formed by forming the alignment film 32 having the above-described alignment pattern on the support 30 and applying the liquid crystal composition to the alignment film, and curing the applied liquid crystal composition.

In addition, the structure of the optically-anisotropic layer where the optical axis of the liquid crystal compound is twisted in the thickness direction of the optically-anisotropic layer and rotates can be formed by adding a chiral agent that helically twists the liquid crystal compound in the thickness direction to the liquid crystal composition.

In order to allow the optically-anisotropic layer to have the configuration where the dark portion 44 has two or more inflection points and the optically-anisotropic layer has the regions where the tilt directions of the dark portions 44 are different from each other in the thickness direction, optically-anisotropic layers having different configurations depending on the regions in the thickness direction may be formed.

For example, in a case where the optically-anisotropic layer 36a shown in FIG. 1 is formed, first, a liquid crystal composition including a chiral agent that induces right-twisting in the thickness direction is applied to the alignment film 32 having the alignment pattern that is formed on the support 30, the liquid crystal compound 40 is helically twisted in the thickness direction by heating or the like, and the liquid crystal composition is cured to form the region 37c.

In the alignment pattern formed on the alignment film 32, the optical axis 40A derived from the liquid crystal compound 40 continuously rotates in the one in-plane direction (arrangement axis D). Accordingly, the region 37c is in a state where the optical axis 40A derived from the liquid crystal compound 40 continuously rotates in the one in-plane direction and the liquid crystal compound 40 is twisted and aligned clockwise from above to below in the thickness direction.

Next, the region 37b is formed on the formed region 37c by applying the same liquid crystal composition as that of the region 37b except that the liquid crystal composition does not include the chiral agent, and curing the liquid crystal composition.

In a case where the liquid crystal layer is formed on the liquid crystal layer using the application method, the alignment of the liquid crystal compound in a plane follows the alignment pattern of the lower liquid crystal layer. Accordingly, the region 37b is in a state where the optical axis 40A derived from the liquid crystal compound 40 continuously rotates in the one in-plane direction as in the region 37c and the directions of the optical axes 40A of the liquid crystal compounds 40 are aligned without being twisted and aligned in the thickness direction.

Further, the region 37a is formed on the formed region 37b by applying the same liquid crystal composition as that of the region 37c except that it includes a chiral agent that induces left-twisting in the thickness direction, causing the liquid crystal compound 40 to be twisted and aligned in the thickness direction by heating or the like, and curing the liquid crystal composition.

As described above, the liquid crystal layer formed using the application method follows the alignment pattern of the lower layer. Accordingly, the region 37a is in a state where the optical axis 40A continuously rotates in the one in-plane direction as in the region 37b or the like and the liquid crystal compound 40 is twisted and aligned counterclockwise from above to below in the thickness direction.

As a result, an optical element shown in FIG. 1 is manufactured, the optically-anisotropic layer 36a including the region 37c where the tilt direction of the dark portion 44 faces the upper left direction, the region 37b where the dark portion 44 extends in the thickness direction, and the region 37a where the tilt direction of the dark portion 44 faces the upper right direction can be formed.

The size of the twisted alignment of the liquid crystal compound that is twisted and aligned in the thickness direction can be adjusted depending on the kind of the chiral agent to be added to the liquid crystal composition and the addition amount of the chiral agent.

In addition, the twisted direction (right-twisted/left-twisted) of the liquid crystal compound in the thickness direction can also be selected by selecting the kind of the chiral agent to be added to the liquid crystal composition.

In addition, in the example shown in FIG. 1, in the optically-anisotropic layer according to the embodiment of the present invention, the optical axis derived from the liquid crystal compound is not tilted with respect to the interface of the optically-anisotropic layer. In the optically-anisotropic layer according to the embodiment of the present invention, the optical axis derived from the liquid crystal compound may be tilted. For example, as described in WO2019/189586A, the optical axis derived from the liquid crystal compound may have a pretilt angle with respect to the interface of the optically-anisotropic layer. In addition, as described in WO2020/122127A, the tilt angle of the optical axis derived from the liquid crystal compound may change from one interface to another interface of the optically-anisotropic layer in the thickness direction. By tilting the optical axis derived from the liquid crystal compound with respect to the interface of the optically-anisotropic layer, the retardation of the optically-anisotropic layer can be appropriately adjusted to obtain a high diffraction efficiency.

In addition, in the optically-anisotropic layer according to the embodiment of the present invention, the film thickness of the optically-anisotropic layer may change in a plane. In particular, in the liquid crystal diffraction element where the length of the single period in the liquid crystal alignment pattern changes in a plane, the film thickness of the optically-anisotropic layer in a plane can be appropriately adjusted such that a high diffraction efficiency can be obtained with respect to light components incident from different incidence positions.

In addition, in the liquid crystal diffraction element where the length of the single period in the liquid crystal alignment pattern changes in a plane, in each of the region 37a, the region 37b, and the region 37c of the optically-anisotropic layer shown in the example of FIG. 1, the thicknesses of the center portion and the outer side portion may be the same as or different from each other. The present invention is not limited to the above-described example, and in the liquid crystal diffraction element according to the embodiment of the present invention, the thickness of each of the regions of the optically-anisotropic layer may be the same or change. The thickness of each of the regions of the optically-anisotropic layer may be appropriately set depending on the desired performance.

Although the optically-anisotropic layer functions as a so-called $\lambda/2$ plate, the present invention also includes an aspect where a laminate including the support and the alignment film that are integrated functions as a so-called $\lambda/2$ plate.

In addition, the liquid crystal composition for forming the optically-anisotropic layer includes a rod-like liquid crystal compound or a disk-like liquid crystal compound and may further include other components such as a leveling agent, an alignment control agent, a polymerization initiator, or an alignment assistant.

In the present invention, the thickness of the optically-anisotropic layer is not particularly limited and may be appropriately set depending on the single period Λ of the liquid crystal alignment pattern, the required diffraction angle, the diffraction efficiency, and the like such that desired optical characteristics can be obtained.

In addition, the thickness of each of the regions corresponding to the inflection points of the dark portion 44 may be uniform or non-uniform and may be appropriately set depending on the required diffraction angle and the like.

—Rod-Like Liquid Crystal Compound—

As the rod-like liquid crystal compound, an azomethine compound, an azoxy compound, a cyanobiphenyl compound, a cyanophenyl ester compound, a benzoate compound, a phenyl cyclohexanecarboxylate compound, a cyanophenylcyclohexane compound, a cyano-substituted phenylpyrimidine compound, an alkoxy-substituted phenylpyrimidine compound, a phenyldioxane compound, a tolan compound, or an alkenylcyclohexylbenzonitrile compound is preferably used. As the rod-like liquid crystal compound, not only the above-described low molecular weight liquid crystal molecules but also high molecular weight liquid crystal molecules can be used.

It is preferable that the alignment of the rod-like liquid crystal compound is immobilized by polymerization. Examples of the polymerizable rod-like liquid crystal compound include compounds described in Makromol. Chem., (1989), Vol. 190, p. 2255, Advanced Materials (1993), Vol. 5, p. 107, U.S. Pat. Nos. 4,683,327A, 5,622,648A, 5,770,107A, WO95/22586A, WO95/24455A, WO97/00600A, WO98/23580A, WO98/52905A, JP1989-272551A (JP-H1-272551A), JP1994-16616A (JP-H6-16616A), JP1995-110469A (JP-H7-110469A), JP1999-80081A (JP-H11-80081A), and JP2001-64627. Further, as the rod-like liquid crystal compound, for example, compounds described in JP1999-513019A (JP-H11-513019A) and JP2007-279688A can also be preferably used.

—Disk-Like Liquid Crystal Compound—

As the disk-like liquid crystal compound, for example, compounds described in JP2007-108732A and JP2010-244038A can be preferably used.

In a case where the disk-like liquid crystal compound is used in the optically-anisotropic layer, the liquid crystal compound 40 rises in the thickness direction in the optically-anisotropic layer, and the optical axis 40A derived from the liquid crystal compound is defined as an axis perpendicular to a disk surface, that is so-called, a fast axis.

In order to obtain a high diffraction efficiency, it is preferable that a liquid crystal compound having high refractive index anisotropy Δn is used as the liquid crystal compound. By increasing the refractive index anisotropy, a high diffraction efficiency can be maintained in a case where the incidence angle changes. The liquid crystal compound having high refractive index anisotropy Δn is not particularly limited. For example, a compound described in WO2019/182129A or a compound represented by Formula (I) can be preferably used.

(I)

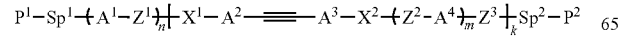

In Formula (I), $P^1$ and $P^2$ each independently represent a hydrogen atom, —CN, —NCS, or a polymerizable group.

$Sp^1$ and $Sp^2$ each independently represent a single bond or a divalent linking group. Here, $Sp^1$ and $Sp^2$ do not represent a divalent linking group including at least one group selected from the group consisting of an aromatic hydrocarbon ring group, an aromatic heterocyclic group, and an aliphatic hydrocarbon ring group.

$Z^1$, $Z^2$, and $Z^3$ each independently represents a single bond, —O—, —S—, —CHR—, —CHRCHR—, —OCHR—, —CHRO—, —SO—, —SO$_2$—, —COO—, —OCO—, —CO—S—, —S—CO—, —O—CO—O—, —CO—NR—, —NR—CO—, —SCHR—, —CHRS—, —SO—CHR—, —CHR—SO—, —SO$_2$—CHR—, —CHR—SO$_2$—, —CF$_2$O—, —OCF$_2$—, —CF$_2$S—, —SCF$_2$—, —OCHRCHRO—, —SCHRCHRS—, —SO—CHRCHR—SO—, —SO$_2$—CHRCHR—SO$_2$—, —CH=CH—COO—, —CH=CH—OCO—, —COO—CH=CH—, —OCO—CH=CH—, —COO—CHRCHR—, —OCO—CHRCHR—, —CHRCHR—COO—, —CHRCHR—OCO—, —COO—CHR—, —OCO—CHR—, —CHR—COO—, —CHR—OCO—, —CR=CR—, —CR=N—, —N=CR—, —N=N—, —CR=N—N=CR—, —CF=CF—, or R represents a hydrogen atom or an alkyl group having 1 to 10 carbon atoms. In a case where a plurality of R's are present, R's may be the same as or different from each other. In a case where a plurality of $Z^1$'s and a plurality of $Z^2$'s are present, $Z^1$'s and $Z^2$'s may be the same as or different from each other. In a case where a plurality of $Z^3$'s are present, $Z^3$'s may be the same as or different from each other. Here, $Z^3$ connected to $SP^2$ represents a single bond.

$X^1$ and $X^2$ each independently represents a single bond or —S—. In a case where a plurality of $X^1$'s and a plurality of $X^2$'s are present, $X^1$'s and $X^2$'s may be the same as or different from each other. Here, among the plurality of $X^1$'s and a plurality of $X^2$'s, at least one represents —S—.

k represents an integer of 2 to 4.

m and n each independently represent an integer of 0 to 3. In a case where a plurality of m's are present, m's may be the same as or different from each other.

$A^1$, $A^2$, $A^3$, and $A^4$ each independently represent a group represented by any one of Formulas (B-1) to (B-7) or a group where two or three groups among the groups represented by Formulas (B-1) to (B-7) are linked. In a case where a plurality of $A^2$'s and a plurality of $A^3$'s are present, $A^2$'s and $A^3$'s may be the same as or different from each other. In a case where a plurality of $A^1$'s and a plurality of $A^4$'s are present, $A^1$'s and $A^4$'s may be the same as or different from each other.

(B-1)

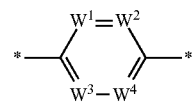

(B-2)

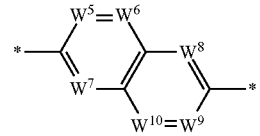

-continued

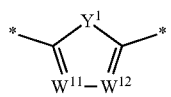
(B-3)

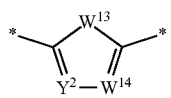
(B-4)

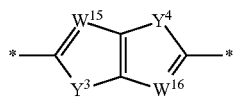
(B-5)

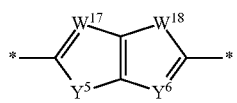
(B-6)

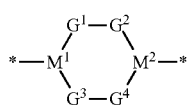
(B-7)

In Formulas (B-1) to (B-7), $W^1$ to $W^{18}$ each independently represent $CR^1$ or N, and $R^1$ represents a hydrogen atom or the following substituent L.

$Y^1$ to $Y^6$ each independently represent $NR^2$, O, or S, and $R^2$ represents a hydrogen atom or the following substituent L.

$G^1$ to $G^4$ each independently represent $CR^3R^4$, $NR^5$, O, or S, and $R^3$ to $R^5$ each independently represent a hydrogen atom or the following substituent L.

$M^1$ and $M^2$ each independently represent $CR^6$ or N, and $R^6$ represents a hydrogen atom or the following substituent L.

* represents a bonding position.

The substituent L represents an alkyl group having 1 to 10 carbon atoms, an alkoxy group having 1 to 10 carbon atoms, an alkylamino group having 1 to 10 carbon atoms, an alkylthio group having 1 to 10 carbon atoms, an alkanoyl group having 1 to 10 carbon atoms, an alkanoyloxy group having 1 to 10 carbon atoms, an alkanoylamino group having 1 to 10 carbon atoms, an alkanoylthio group having 1 to 10 carbon atoms, an alkyloxycarbonyl group having 2 to 10 carbon atoms, an alkylaminocarbonyl group having 2 to 10 carbon atoms, an alkylthiocarbonyl group having 2 to 10 carbon atoms, a hydroxy group, an amino group, a mercapto group, a carboxy group, a sulfo group, an amide group, a cyano group, a nitro group, a halogen atom, or a polymerizable group. Here, in a case where the group described as the substituent L has —$CH_2$—, a group in which at least one —$CH_2$— in the group is substituted with —O—, —CO—, —CH=CH—, or —C≡C— is also included in the substituent L. Here, in a case where the group described as the substituent L has a hydrogen atom, a group in which at least one hydrogen atom in the group is substituted with at least one selected from the group consisting of a fluorine atom and a polymerizable group is also included in the substituent L.

In order to maintain a high diffraction efficiency in a case where the incidence angle changes, the refractive index anisotropy $\Delta n_{550}$ of the liquid crystal compound is preferably 0.15 or more, more preferably 0.2 or more, still more preferably 0.25 or more, and most preferably 0.3 or more.

In addition, in the liquid crystal diffraction element according to the embodiment of the present invention, the refractive index anisotropy $\Delta n$ or the average refractive index of the optically-anisotropic layer may change in a plane. By changing the refractive index anisotropy $\Delta n$ or the average refractive index of the optically-anisotropic layer in a plane, the diffraction efficiency can be appropriately adjusted with respect to light components incident from different incidence positions.

—Chiral Agent—

The chiral agent has a function of inducing a helical structure that twists and aligns the liquid crystal compound in the thickness direction. The chiral agent may be selected depending on the purposes because a helical twisted direction and/or the degree of twist (helical pitch) derived from the compound varies.

The chiral agent is not particularly limited, and a well-known compound (for example, Liquid Crystal Device Handbook (No. 142 Committee of Japan Society for the Promotion of Science, 1989), Chapter 3, Article 4-3, chiral agent for twisted nematic (TN) or super twisted nematic (STN), p. 199), isosorbide (chiral agent having an isosorbide structure), or an isomannide derivative can be used.

In addition, the chiral agent in which back isomerization, dimerization, isomerization, dimerization or the like occurs due to light irradiation such that the helical twisting power (HTP) decreases can also be suitably used.

In general, the chiral agent includes an asymmetric carbon atom. However, an axially asymmetric compound or a planar asymmetric compound not having an asymmetric carbon atom can also be used as the chiral agent. Examples of the axially asymmetric compound or the planar asymmetric compound include binaphthyl, helicene, paracyclophane, and derivatives thereof. The chiral agent may include a polymerizable group. In a case where both the chiral agent and the liquid crystal compound have a polymerizable group, a polymer which includes a repeating unit derived from the polymerizable liquid crystal compound and a repeating unit derived from the chiral agent can be formed due to a polymerization reaction of a polymerizable chiral agent and the polymerizable liquid crystal compound. In this aspect, it is preferable that the polymerizable group in the polymerizable chiral agent is the same as the polymerizable group in the polymerizable liquid crystal compound. Accordingly, the polymerizable group of the chiral agent is preferably an unsaturated polymerizable group, an epoxy group, or an aziridinyl group, more preferably an unsaturated polymerizable group, and still more preferably an ethylenically unsaturated polymerizable group.

In addition, the chiral agent may be a liquid crystal compound.

In a case where the chiral agent includes a photoisomerization group, a pattern having a desired reflection wavelength corresponding to a luminescence wavelength can be formed by irradiation of an actinic ray or the like through a photomask after coating and alignment, which is preferable. As the photoisomerization group, an isomerization portion of a photochromic compound, an azo group, an azoxy group, or a cinnamoyl group is preferable. Specific examples of the compound include compounds described in JP2002-080478A, JP2002-080851A, JP2002-179668A, JP2002-179669A, JP2002-179670A, JP2002-179681A, JP2002-179682A, JP2002-338575A, JP2002-338668A, JP2003-313189A, and JP2003-313292A.

The content of the chiral agent in the liquid crystal composition may be appropriately set depending on the desired amount of helical twist in the thickness direction, the kind of the chiral agent, and the like.

<Action of Liquid Crystal Diffraction Element>

As described above, the optically-anisotropic layer that is formed using the composition including the liquid crystal compound and has the liquid crystal alignment pattern in which the direction of the optical axis 40A rotates in the arrangement axis D direction refracts circularly polarized light.

Here, in the liquid crystal diffraction element according to the embodiment of the present invention, the dark portion 44 observed in the cross-sectional SEM image has two or more inflection points of angle and has the regions where the tilt directions are different in the thickness direction. Therefore, in the liquid crystal diffraction element according to the embodiment of the present invention, the wavelength dependence of the diffraction efficiency can be reduced, and light can be diffracted with the same diffraction efficiency irrespective of wavelengths. That is, for example, red light, green light, or blue light can be diffracted with the same diffraction efficiency. Further, light can be diffracted with high diffraction efficiency irrespective of wavelengths, and as the diffraction efficiency increases, the wavelength dependence of the diffraction efficiency can be reduced.

In addition, in the liquid crystal diffraction element according to the embodiment of the present invention, in the liquid crystal alignment pattern, the single period Λ over which the optical axis derived from the liquid crystal compound rotates by 180° is uniform. Therefore, light having the same wavelength is diffracted (refracted) at the same angle irrespective of light incidence positions in a plane. That is, for example, red light can be diffracted at the same angle irrespective incidence positions to the liquid crystal diffraction element.

In addition, in the example shown in FIG. 13 or the like, the optically-anisotropic layer has the concentric circular liquid crystal alignment pattern having a concentric circular shape where the one in-plane direction in which the direction of the optical axis derived the liquid crystal compound changes while continuously rotating moves from an inner side toward an outer side. However, the present invention is not limited to this configuration.

For example, the arrangement axis D of the liquid crystal alignment pattern of the optically-anisotropic layer has one in-plane direction, and the single period Λ gradually changes in the one in-plane direction.

In addition, the liquid crystal alignment pattern may be a symmetrical concentric circular shape or an asymmetrical liquid crystal alignment pattern from an inner side toward an outer side. In this case, the center of the liquid crystal alignment pattern may be different from the center of the liquid crystal diffraction element. The liquid crystal alignment pattern is not limited to the above-described configuration and may be appropriately set depending on the function required for the liquid crystal diffraction element.

The liquid crystal diffraction element according to the embodiment of the present invention can be preferably used in combination with a circularly polarizing plate.

A part of circularly polarized light incident into the liquid crystal diffraction element according to the embodiment of the present invention may transmit through the liquid crystal diffraction element (zero-order light) without being diffracted. The circularly polarized light that is not diffracted by the liquid crystal diffraction element may decrease the performance depending on applications. On the other hand, by using the liquid crystal diffraction element and the circularly polarizing plate in combination, the light (zero-order light) transmitted through the liquid crystal diffraction element without being diffracted can be reduced.

Hereinafter, the optical element according to the embodiment of the present invention including the liquid crystal diffraction element according to the embodiment of the present invention and the circularly polarizing plate will be described. For example, the circularly polarizing plate includes a retardation plate and a linearly polarizing plate. In the optical element according to the embodiment of the present invention, the liquid crystal diffraction element, the retardation plate, and the linearly polarizing plate are disposed in this order.

In a case where right circularly polarized light is incident into the liquid crystal diffraction element according to the embodiment of the present invention, the incident right circularly polarized light is diffracted and emitted from the liquid crystal diffraction element. In addition, during the diffraction, the right circularly polarized light is converted into left circularly polarized light. The left circularly polarized light (that is, first-order light) that is diffracted by the liquid crystal diffraction element is converted into linearly polarized light by the retardation plate (¼ wave plate) of the circularly polarizing plate. The linearly polarized light converted by the retardation plate transmits through the linearly polarizing plate and is emitted.

Here, in a case where a part of light is not diffracted by the liquid crystal diffraction element, a part of right circularly polarized light incident into the liquid crystal diffraction element transmits through the liquid crystal diffraction element without being diffracted. In a case where the circularly polarizing plate is not provided, the right circularly polarized light that is not diffracted by the liquid crystal diffraction element linearly travels as it is. The right circularly polarized light that linearly travels is unnecessary depending on applications, which decreases the performance.

On the other hand, in the optical element according to the embodiment of the present invention including the liquid crystal diffraction element according to the embodiment of the present invention and the circularly polarizing plate, the right circularly polarized light (that is, zero-order light) that is not diffracted by the liquid crystal diffraction element is converted into linearly polarized light having a direction perpendicular to the left circularly polarized light (first-order light) that is incident into and diffracted by the retardation plate of the circularly polarizing plate, and is incident into the linearly polarizing plate and absorbed. That is, the right circularly polarized light that is not diffracted by the liquid crystal diffraction element is absorbed by the circularly polarizing plate. Accordingly, transmission of the desired first-order light of left circularly polarized light is allowed, and the right circularly polarized light that is not diffracted can be reduced. Therefore, a decrease in performance by unnecessary light (zero-order light) can be suppressed.

In the optical element according to the embodiment of the present invention where the liquid crystal diffraction element according to the embodiment of the present invention and the circularly polarizing plate are used in combination, another optical element that is provided downstream of the circularly polarizing plate may also be used in combination.

For example, a retardation plate may be disposed downstream of the circularly polarizing plate. As described above, in the circularly polarizing plate, the retardation plate and the linearly polarizing plate are disposed in this order. Specifically, a configuration where linearly polarized light transmitted through the circularly polarizing plate is converted into circularly polarized light, elliptically polarized light, and linearly polarized light having a different polarization direction by the retardation plate that is disposed downstream of the circularly polarizing plate can also be preferably used.

In addition, instead of the retardation plate, a depolarization layer that depolarizes the polarization state of light in at least a part of a wavelength range may be used. Examples of the depolarization layer include a high retardation film and a light scattering layer. By controlling the polarization state of the light emitted from the circularly polarizing plate, the polarization state can be adjusted depending on applications. The high retardation film is, for example, a film having an in-plane retardation of 3000 nm or more.

In another example, an optical element that is provided downstream of the circularly polarizing plate to deflect light may be used. For example, by disposing the optical element such as a lens that deflects light downstream of the circularly polarizing plate, the traveling direction of light emitted from the circularly polarizing plate can be changed. By controlling the deflection direction of the light emitted from the circularly polarizing plate, the emission direction of light can be adjusted depending on applications.

<Polarizing Plate>

The linearly polarizing plate used in the present invention is not particularly limited as long as they are linearly polarizing plates having a function of allowing transmission of linearly polarized light in one polarization direction and absorbing linearly polarized light in another polarization direction. For example, a well-known linearly polarizing plate in the related art can be used. The linearly polarizing plate may be an absorptive linearly polarizing plate or a reflective linearly polarizing plate.

As the absorptive linearly polarizing plate, for example, an iodine-based polarizer, a dye-based polarizer using a dichroic dye, or a polyene polarizer that is an absorptive polarizer can be used. As the iodine-based polarizer and the dye-based polarizer, any one of a coating type polarizer or a stretching type polarizer can be used. In particular, a polarizer prepared by absorbing iodine or a dichroic dye on polyvinyl alcohol and performing stretching is preferable.

In addition, examples of a method of obtaining a polarizer by performing stretching and dyeing on a laminated film in which a polyvinyl alcohol layer is formed on the substrate include methods described in JP5048120B, JP5143918B, JP4691205B, JP4751481B, and JP4751486B. Further, well-known techniques relating to the polarizers can be used.

As the absorptive polarizer, for example, a polarizer obtained by aligning a dichroic coloring agent using the aligning properties of liquid crystal without performing stretching is more preferable. The polarizer has many advantages in that, for example, the thickness can be significantly reduced to about 0.1 µm to 5 µm, cracks are not likely to initiate or thermal deformation is small during folding as described in JP2019-194685A, and even a polarizing plate having a high transmittance of higher than 50% has excellent durability as described in JP6483486B, and thermoformability is excellent.

By utilizing these advantages, the polarizer obtained by aligning a dichroic coloring agent is applicable to an application that requires high brightness or small size and light weight, an application of a fine optical system, or an application of forming into a portion having a curved surface, or an application of a flexible portion. In addition, a polarizer that is transferred after peeling a support can also be used.

In applications including an on-board display optical system such as a head-up display, an optical system such as AR glasses or VR glasses, and an optical sensor such as LiDAR, a face recognition system, or polarization imaging, it is also preferable that an absorptive polarizer is incorporated in order to prevent stray light.

As the reflective linearly polarizing plate, for example, a film obtained by stretching a layer including two polymers or a wire grid polarizer described in JP2011-053705A can be used. From the viewpoint of brightness, the film obtained by stretching the layer including polymers is preferable.

As the reflective linearly polarizing plate, a commercially available product can also be used. As the commercially available product of the reflective linearly polarizing plate, for example, a reflective polarizer (trade name: APF) manufactured by 3M or a wire grid polarizer (trade name: WGF) manufactured by Asahi Kasei Corporation can be suitably used. Alternatively, a reflective linearly polarizing plate including a combination of a cholesteric liquid crystal film and a λ/4 plate may be used.

It is preferable that the polarizing plate used in the present invention has a smooth surface. In particular, in a case where the polarizing plate is applied to a lens or the like, due to the image enlargement effect of the lens, small surface unevenness may lead to distortion of the image. Therefore, it is desirable that the surface does not have unevenness.

Specifically, an arithmetic average roughness Ra of the surface of the polarizing plate is preferably 50 nm or less, more preferably 30 nm or less, still more preferably 10 nm or less, and still more preferably 5 nm or less. In addition, on the surface of the polarizing plate, a difference in height of the surface unevenness in a range of 1 square millimeter is preferably 100 nm or less, more preferably 50 nm or less, and still more preferably 20 nm or less.

The surface unevenness and the arithmetic average roughness can be measured using a roughness meter or an interferometer. For example, the surface unevenness and the arithmetic average roughness can be measured using an interferometer "Vertscan" (manufactured by Mitsubishi Chemical Systems Inc.).

<Retardation Plate>

The retardation plate used in the present invention is a retardation plate that converts the phase of incident polarized light. The retardation plate is disposed such that a direction of a slow axis is adjusted depending on whether to convert incident polarized light into light similar to linearly polarized light or circularly polarized light. Specifically, the retardation plate may be disposed such that an angle of a slow axis with respect to an absorption axis of a linearly polarizing plate disposed adjacent thereto is +45° or −45°.

The retardation plate used in the present invention may be a monolayer type including one optically-anisotropic layer or a multilayer type including two or more optically-anisotropic layers having different slow axes. Examples of the multilayer type retardation plate include those described in WO2013/137464A, WO2016/158300A, JP2014-209219A, JP2014-209220A, WO2014/157079A, JP2019-215416A, and WO2019/160044A. However, the present invention is not limited to this example.

From the viewpoint of converting linearly polarized light into circularly polarized light or converting circularly polarized light into linearly polarized light, it is preferable that the retardation plate is a λ/4 plate.

The λ/4 plate is not particularly limited, and various well-known plates having a λ/4 function can be used. Specific examples of the λ/4 plate include those described in US2015/0277006A.

Specific examples of an aspect where the λ/4 plate has a monolayer structure include a stretched polymer film and a retardation film where an optically-anisotropic layer having a λ/4 function is provided on a support. Examples of an aspect in which the λ/4 plate has a multi-layer structure include a broadband λ/4 plate in which a λ/4 plate and a λ/2 wave plate are laminated.

The thickness of the λ/4 plate is not particularly limited and is preferably 1 to 500 μm, more preferably 1 to 50 μm, and still more preferably 1 to 5 μm.

It is preferable that the retardation plate used in the present invention has reverse wavelength dispersibility. By having reverse wavelength dispersibility, a phase change in the retardation plate is ideal, and conversion between linearly polarized light and circularly polarized light is ideal.

In the configuration where the liquid crystal diffraction element according to the embodiment of the present invention and the circularly polarizing plate are used in combination, another optical element that is provided downstream of the circularly polarizing plate may also be used in combination.

For example, a retardation plate may be disposed downstream of the circularly polarizing plate. Specifically, a configuration where linearly polarized light transmitted through the circularly polarizing plate (where the retardation plate and the linearly polarizing plate are disposed in this order) is converted into circularly polarized light, elliptically polarized light, and linearly polarized light having a different polarization direction by the retardation plate that is disposed downstream of the circularly polarizing plate can also be preferably used. In addition, instead of the retardation plate, a depolarization layer that depolarizes the polarization state of light in at least a part of a wavelength range may be used. As the depolarization layer, for example, a high retardation film (having an in-plane retardation of 3000 nm or more) or a light scattering layer can be used. By controlling the polarization state of the light emitted from the circularly polarizing plate, the polarization state can be adjusted depending on applications.

In another example, an optical element that is provided downstream of the circularly polarizing plate to deflect light may be used. For example, by disposing the optical element such as a lens that deflects light downstream of the circularly polarizing plate, the traveling direction of light emitted from the circularly polarizing plate can be changed. By controlling the deflection direction of the light emitted from the circularly polarizing plate, the emission direction of light can be adjusted depending on applications.

<Adhesive Layer (Pressure Sensitive Adhesive Layer), Adhesive>

The optical film may include an adhesive layer for adhesion of the respective layers. In the present specification, "adhesive" is used as a concept including "pressure-sensitive adhesive".

Examples of the adhesive include a water-soluble adhesive, an ultraviolet curable adhesive, an emulsion type adhesive, a latex type adhesive, a mastic adhesive, a multilayered adhesive, a paste-like adhesive, a foaming adhesive, a supported film adhesive, a thermoplastic adhesive, a hot-melt adhesive, a thermally solidified adhesive, a thermally activated adhesive, a heat-seal adhesive, a thermosetting adhesive, a contact type adhesive, a pressure-sensitive adhesive, a polymerizable adhesive, a solvent type adhesive, a solvent-activated adhesive, and a ceramic adhesive. Specifically, for example, a boron compound aqueous solution, a curable adhesive of an epoxy compound not having an aromatic ring in a molecule as disclosed in JP2004-245925A, an active energy ray-curable adhesive having a molar absorption coefficient of 400 or higher at a wavelength of 360 to 450 nm and including a photopolymerization initiator and an ultraviolet curable compound as essential components as described in JP2008-174667A, or an active energy ray-curable adhesive including (a) a (meth)acrylic compound having two or more (meth)acryloyl groups in a molecule, (b) a (meth)acrylic compound having a hydroxyl group and only one polymerizable double bond in a molecule, and (c) a phenol ethylene oxide modified acrylate or a nonyl phenol ethylene oxide modified acrylate with respect to 100 parts by mass of the total amount of the (meth)acrylic compounds as described in JP2008-174667A can be used. Optionally, various adhesives can be used alone or as a mixture of two or more kinds.

In the laminated optical film, from the viewpoint of reducing unnecessary reflection, it is preferable that a difference in refractive index between the adhesive layer and a layer adjacent thereto is small. Specifically, the difference in refractive index from the adjacent layer is preferably 0.05 or less and more preferably 0.01 or less. A method of adjusting the refractive index of the adhesive layer is not particularly limited. For example, an existing method such as a method of adding of fine particles of zirconia, silica, acryl, acrylic-styrene, melamine, or the like, a method of adjusting the refractive index of a resin, or a method described in JP1999-223712A (JP-H11-223712A) can be used.

In addition, in a case where the adjacent layer has refractive index anisotropy in a plane, it is preferable that the difference in refractive index from the adjacent layer in all of the in-plane directions is 0.05 or less. Therefore, the adhesive layer may have refractive index anisotropy in a plane.

In a case where a difference in refractive index between adhesion interfaces is large, the interface reflectivity can be reduced by generating a refractive index distribution in the thickness direction of the adhesive layer. Examples of a method of generating a refractive index distribution in the thickness direction include a method of providing a plurality of adhesive layers, a method of mixing interfaces between a plurality adhesive layers that are provided, and a method of controlling an uneven distribution state of a material in the adhesive layer to generate a refractive index distribution.

In addition, the adhesive layer can be provided on one member or both members to be bonded using any method such as application, vapor deposition, or transfer. From the viewpoint of increasing the adhesion strength, a post-treatment such as a heating treatment or ultraviolet irradiation can be performed according to the kind of the adhesive. The thickness of the adhesive layer can be freely adjusted and is preferably 20 μm or less and more preferably 0.1 μm or less. Examples of a method of forming the adhesive layer having a thickness of 0.1 μm or less include a method of vapor-depositing a ceramic adhesive such as silicon oxide (SiOx layer) on a bonding surface. For the bonding surface of the bonding member, before the bonding, for example, a surface reforming treatment such as a plasma treatment, a corona treatment, or a saponification treatment can be performed, and a primer layer can be applied. In addition, in a case where a plurality of bonding surfaces are present, the kind, thickness, and the like of the adhesive layer can be adjusted for each of the bonding surfaces.

<Cutting of Laminate>

The prepared laminate can be cut into a predetermined size. A method of cutting the laminate is not particularly limited. For example, various well-known methods such as a method of physically cutting the laminate using a blade such as a Thomson blade or a method of cutting the laminate by laser irradiation can be used. In a case where laser light is used, it is preferable to select a pulse duration (nanosecond, picosecond, or femtosecond) and a wavelength in consideration of damage to cutting properties and a material. In addition, after processing the laminate in a predetermined shape, for example, edge surface polishing may be performed.

From the viewpoint of, for example, improving the workability during the cutting or suppressing dust emission, the cutting can also be performed in a state where a peelable protective film is attached. In addition, by performing the cutting while observing the liquid crystal alignment pattern, for example, using a method described in JP2004-141889A, a cutting position can be freely determined. In this case, in order to easily see the liquid crystal alignment pattern, the liquid crystal alignment pattern can also be observed through a polarizing plate, a retardation film, or the like. In addition, in a case where a plurality of optical elements are provided on one substrate, it is preferable that the plurality of optical elements are cut at the same time.

<Other Treatments>

For example, on order to accurately provide the laminate in a device or to improve the accuracy of an axis or a cutting position during the cutting, a mark having a given shape can be optionally formed. The kind of the mark can be freely selected, and a method of physically forming the mark using a laser, an ink jet method, or the like, a method of partially changing the liquid crystal alignment state, or a method of forming a region that is partially decolored or colored can be selected.

In addition, in order to protect the liquid crystal layer, optionally, a protective layer (for example, a gas barrier layer, a layer for blocking moisture or the like, an ultraviolet absorbing layer, or a scratch resistance layer) can be provided. The protective layer can be formed on the liquid crystal layer directly or through a pressure sensitive adhesive layer or another optical film. In order to reduce the reflectivity of the surface, an antireflection layer (for example, an LR layer, an AR layer, or a moth eye layer) may be provided. Various protective layers can be appropriately selected from well-known protective layers. In a case where the gas barrier layer is provided polyvinyl alcohol is preferable. The polyvinyl alcohol can also have a function as a polarizer. In addition, the ultraviolet absorbing layer is a layer including an ultraviolet absorber. As the ultraviolet absorber, from the viewpoints of excellent capability to absorb ultraviolet light having a wavelength of 370 nm or less and excellent display properties, an ultraviolet absorber having small absorption of visible light having a wavelength of 400 nm or more is preferably used. As the ultraviolet absorber, one kind may be used alone, or two or more kinds may be used in combination. Examples of the ultraviolet absorber include ultraviolet absorbers described in JP2001-72782A and JP2002-543265A. Specific examples of the ultraviolet absorber include an oxybenzophenone compound, a benzotriazole compound, a salicylic acid ester compound, a benzophenone compound, a cyanoacrylate compound, and a nickel complex salt compound.

<Combination of Plurality of Liquid Crystal Diffraction Elements>

The liquid crystal diffraction element according to the embodiment of the present invention can be used as a combination of a plurality of liquid crystal diffraction elements.

For example, by combining a plurality of liquid crystal diffraction elements and changing the polarization states incident into liquid crystal diffraction elements as disclosed in Optics Express, Vol. 28, No 16/3 Aug. 2020, the collecting properties/diverging properties of emitted light can be switched between a plurality of combinations.

By combining the plurality of liquid crystal diffraction elements, display (foveated display) corresponding to fovea centralis can be performed in an HMD such as AR glasses or VR glasses.

<Combination with Phase Modulation Element>

A configuration where the liquid crystal diffraction element according to the embodiment of the present invention is used in combination with a phase modulation element can also be preferably used.

For example, by using a switchable λ/2 plate (half waveplate) that can modulate a retardation with a voltage as disclosed in U.S. Ser. No. 10/379,419B and the liquid crystal diffraction element according to the embodiment of the present invention (used as a passive element) in combination, a focus tunable lens having a high diffraction efficiency irrespective of light incidence positions in a plane of the element can be realized. In addition, by using plural sets of the phase modulation elements and the liquid crystal diffraction elements in combination, a plurality of adjustable focal lengths can increase.

By using this focus tunable lens for AR glasses or VR glasses, the focal position of a display image of an HMD can be freely changed.

<Combination with Lens>

A configuration where the liquid crystal diffraction element according to the embodiment of the present invention is used in combination with another lens element can also be preferably used.

For example, by using the liquid crystal diffraction element according to the embodiment of the present invention in combination with a Fresnel lens disclosed in SID 2020 DIGEST, 40-4, pp. 579-582, chromatic aberration of the lens can be improved with a high diffraction efficiency irrespective of light incidence positions in a plane of the element. The lens to be used in combination is not particularly limited, and a combination with a refractive index lens or a pancake lens disclosed in U.S. Pat. No. 3,443,858, Optics Express, Vol. 29, No 4/15 Feb. 2021, or the like can also be suitably used.

By using an optical system including the lens and the liquid crystal diffraction element in combination for AR glasses or VR glasses, color shift (chromatic aberration of the lens) of a display image of the HMD can be improved.

<Combination with Light Guide Plate>

A configuration where the liquid crystal diffraction element according to the embodiment of the present invention is used in combination with a light guide plate can also be preferably used.

For example, in a combination of a light guide plate and a lens disclosed in Proc. of SPIE Vol. 11062, Digital Optical Technologies 2019, 110620J (16 Jul. 2019), by using the liquid crystal diffraction element according to the embodiment of the present invention as the lens, the focal position of a display image emitted from the light guide plate can be changed.

This way, by using the liquid crystal diffraction element in combination with the light guide plate, the focal position of a display image of an HMD such as AR glasses or VR glasses can be adjusted. For use in AR glasses, by using the liquid crystal diffraction element according to the embodiment of the present invention as positive and negative lenses between which a light guide plate is interposed as disclosed in Proc. of SPIE Vol. 11062, Digital Optical Technologies 2019, 110620J (16 Jul. 2019), both of an actual scene and a display image output from the light guide plate can be observed without distortion.

<Combination with Image Display Apparatus>

A combination of the liquid crystal diffraction element according to the embodiment of the present invention with an image display apparatus can also be preferably used.

For example, by using the liquid crystal diffraction element (used as a diffractive deflection film) and an image display apparatus disclosed in Crystals 2021, 11, 107 in combination, a brightness distribution of emitted light from the image display apparatus can be adjusted.

By using the image display unit combined with the image display apparatus, a brightness distribution of an HMD such as AR glasses or VR glasses can be suitably adjusted.

<Combination with Beam Steering>

A combination of the liquid crystal diffraction element according to the embodiment of the present invention with a light deflection element (beam steering) can also be preferably used.

For example, by using the liquid crystal diffraction element according to the embodiment of the present invention as a diffraction element of a light deflection element disclosed in WO2019/189675A, the deflection angle of emitted light can be increased with a high diffraction efficiency.

By using the liquid crystal diffraction element in combination with the light deflection element (beam steering), a light irradiation angle of a distance-measuring sensor such as light detection and ranging (LIDAR) can be suitably widened.

Hereinabove, the liquid crystal diffraction element, the optical element, the image display unit, the head-mounted display, the beam steering, and the sensor according to the embodiment of the present invention have been described in detail. However, the present invention is not limited to the above-described examples, and various improvements and modifications can be made within a range not departing from the scope of the present invention.

EXAMPLES

Hereinafter, the characteristics of the present invention will be described in detail using examples. Materials, chemicals, used amounts, material amounts, ratios, treatment details, treatment procedures, and the like shown in the following examples can be appropriately changed within a range not departing from the scope of the present invention. Accordingly, the scope of the present invention is not limited to the following specific examples.

Comparative Example 1

<Preparation of Liquid Crystal Diffraction Element>

(Support)

A glass substrate was used as the support.

(Formation of Alignment Film)

The following coating liquid for forming an alignment film was applied to the support by spin coating. The support on which the coating film of the coating liquid for forming an alignment film was formed was dried using a hot plate at 60° C. for 60 seconds. As a result, an alignment film was formed.

| Coating Liquid for Forming Alignment Film | |
|---|---|
| Material A for photo-alignment | 1.00 part by mass |
| Water | 16.00 parts by mass |
| Butoxyethanol | 42.00 parts by mass |
| Propylene glycol monomethyl ether | 42.00 parts by mass |

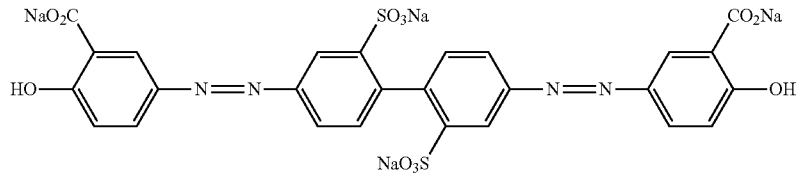

-Material A for Photo-Alignment- (Exposure of Alignment Film)

The alignment film was exposed using the exposure device shown in FIG. 10 to form an alignment film P-1 having an alignment pattern.

In the exposure device, a laser that emits laser light having a wavelength (325 nm) was used as the laser. The exposure amount of the interference light was 1000 mJ/cm$^2$.

(Formation of Optically-Anisotropic Layer)

As a liquid crystal composition forming a first optically-anisotropic layer, the following composition A-1 was prepared.

| Composition A-1 | |
|---|---|
| Liquid crystal compound L-1 | 100.00 parts by mass |
| Chiral agent M-1 | 0.18 parts by mass |
| Polymerization initiator (IRGACURE-OXE01, manufactured by BASF SE) | 1.00 part by mass |
| Leveling agent T-1 | 0.08 parts by mass |
| Methyl ethyl ketone | 1050.00 parts by mass |

Liquid Crystal Compound L-1

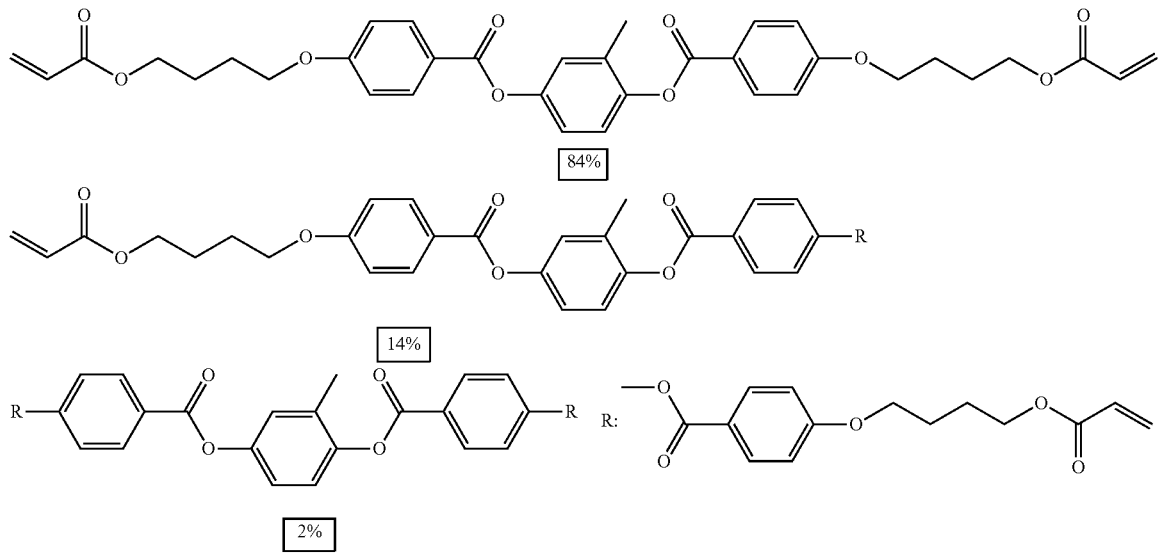

Chiral Agent M-1

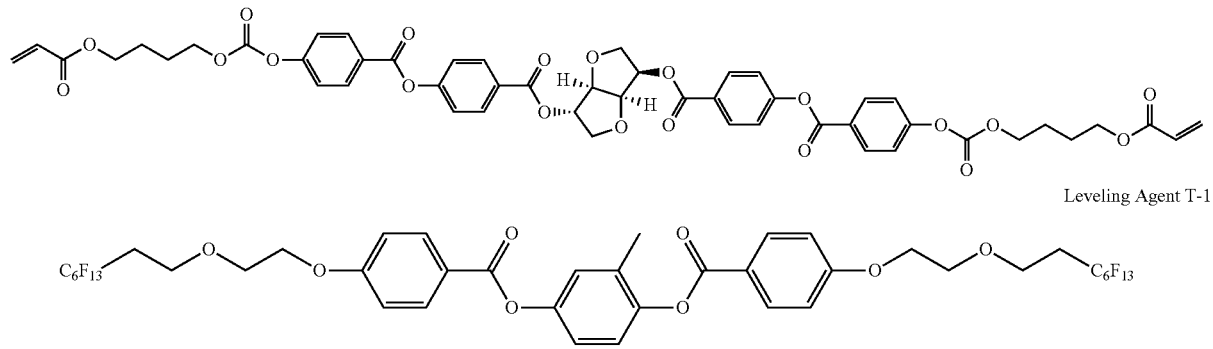

Leveling Agent T-1

The optically-anisotropic layer was formed by applying multiple layers of the composition A-1 to the alignment film P-1. The application of the multiple layers refers to repetition of the following processes including: preparing a first liquid crystal immobilized layer by applying the composition A-1 for forming the first layer to the alignment film, heating the composition A-1, and irradiating the composition A-1 with ultraviolet light for curing; and preparing a second or subsequent liquid crystal immobilized layer by applying the composition A-1 for forming the second or subsequent layer to the formed liquid crystal immobilized layer, heating the composition A-1, and irradiating the composition A-1 with ultraviolet light for curing as described above. Even in a case where the liquid crystal layer was formed by the application of the multiple layers such that the total thickness of the optically-anisotropic layer was large, the alignment direction of the alignment film was reflected from a lower surface of the optically-anisotropic layer to an upper surface thereof.

Regarding the first liquid crystal layer, the following composition A-1 was applied to the alignment film P-1 to form a coating film, the coating film was heated to 80° C. using a hot plate, the coating film was irradiated with ultraviolet light having a wavelength of 365 nm at an irradiation dose of 300 mJ/cm$^2$ using a high-pressure mercury lamp in a nitrogen atmosphere. As a result, the alignment of the liquid crystal compound was immobilized.

Regarding the second or subsequent liquid crystal immobilized layer, the composition was applied to the first liquid crystal layer, and the applied composition was heated and irradiated with ultraviolet light for curing under the same conditions as described above. As a result, a liquid crystal immobilized layer was prepared. This way, by repeating the application multiple times until the total thickness reached a desired film thickness, an optically-anisotropic layer was obtained, and a liquid crystal diffraction element was prepared.

A complex refractive index of the cured layer of a liquid crystal composition A-1 was obtained by applying the liquid crystal composition A-1 a support with an alignment film for retardation measurement that was prepared separately, aligning the director of the liquid crystal compound to be parallel to the substrate, irradiating the liquid crystal compound with ultraviolet irradiation for immobilization to obtain a liquid crystal immobilized layer (cured layer), and measuring the retardation value and the film thickness of the liquid crystal immobilized layer. An can be calculated by dividing the retardation value by the film thickness. The retardation value was measured by measuring a desired wavelength using Axoscan (manufactured by Axometrix inc.) and measuring the film thickness using an SEM.

Finally, in the optically-anisotropic layer, $\Delta n_{550} \times$ thickness (Re(550)) of the liquid crystals was 275 nm, and it was verified using a polarization microscope that periodic alignment occurred on the surface. In the liquid crystal alignment pattern of the optically-anisotropic layer, the single period over which the optical axis of the liquid crystal compound rotated by 180° was 10 μm. In addition, in the optically-anisotropic layer, the twisted angle of the liquid crystal compound in the thickness direction was 70°. Hereinafter, unless specified otherwise, "$\Delta n_{550} \times d$" and the like were measured as described above.

As a liquid crystal composition forming a second optically-anisotropic layer, the following composition A-2 was prepared.

| Composition A-2 | |
| --- | --- |
| Liquid crystal compound L-1 | 100.00 parts by mass |
| Chiral agent H-1 | 0.32 parts by mass |
| Polymerization initiator (IRGACURE-OXE01, manufactured by BASF SE) | 1.00 part by mass |
| Leveling agent T-1 | 0.08 parts by mass |
| Methyl ethyl ketone | 1050.00 parts by mass |

Chiral Agent H-1

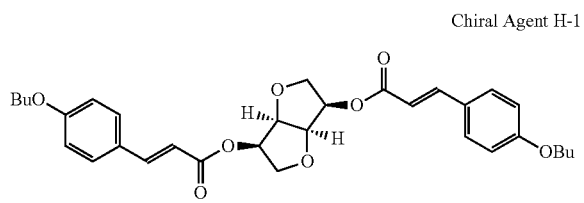

The film thickness of the optically-anisotropic layer was adjusted using the composition A-2. A second optically-anisotropic layer was formed using the same method as that of the first optically-anisotropic layer, except that Finally, in the optically-anisotropic layer, $\Delta n_{550} \times$ thickness (Re(550)) of the liquid crystals was 275 nm, and it was verified using a polarization microscope that periodic alignment occurred on the surface. In the liquid crystal alignment pattern of the optically-anisotropic layer, the single period over which the optical axis of the liquid crystal compound rotated by 180° was 10 μm. In addition, in the optically-anisotropic layer, the twisted angle of the liquid crystal compound in the thickness direction was −70°.

Example 1

<Preparation of Liquid Crystal Diffraction Element>
(Formation of Alignment Film)

Using the same method as that of Comparative Example 1, an alignment film was formed on the glass substrate, and the alignment film was exposed to form an alignment film P-1 having an alignment pattern.
(Formation of Optically-Anisotropic Layer)

As a liquid crystal composition forming a first optically-anisotropic layer, the following composition B-1 was prepared.

| Composition B-1 | |
| --- | --- |
| Liquid crystal compound L-1 | 100.00 parts by mass |
| Chiral agent M-1 | 0.36 parts by mass |
| Polymerization initiator (IRGACURE-OXE01, manufactured by BASF SE) | 1.00 part by mass |

-continued

| Composition B-1 | |
| --- | --- |
| Leveling agent T-1 | 0.08 parts by mass |
| Methyl ethyl ketone | 1050.00 parts by mass |

A first optically-anisotropic layer was formed using the same method as that of Comparative Example 1, except that the film thickness of the optically-anisotropic layer was adjusted using the composition B-1.

Finally, in the optically-anisotropic layer, $\Delta n_{550} \times$ thickness (Re(550)) of the liquid crystals was 160 nm, and it was verified using a polarization microscope that periodic alignment occurred on the surface. In the liquid crystal alignment pattern of the optically-anisotropic layer, the single period over which the optical axis of the liquid crystal compound rotated by 180° was 10 μm. In addition, in the optically-anisotropic layer, the twisted angle of the liquid crystal compound in the thickness direction was 80°.

As a liquid crystal composition forming a second optically-anisotropic layer, the following composition B-2 was prepared.

| Composition B-2 | |
| --- | --- |
| Liquid crystal compound L-1 | 100.00 parts by mass |
| Polymerization initiator (IRGACURE-OXE01, manufactured by BASF SE) | 1.00 part by mass |
| Leveling agent T-1 | 0.08 parts by mass |
| Methyl ethyl ketone | 1050.00 parts by mass |

A second optically-anisotropic layer was formed using the same method as that of the first optically-anisotropic layer, except that the film thickness of the optically-anisotropic layer was adjusted using the composition B-2.

Finally, in the optically-anisotropic layer, $\Delta n_{550} \times$ thickness (Re(550)) of the liquid crystals was 330 nm, and it was verified using a polarization microscope that periodic alignment occurred on the surface. In the liquid crystal alignment pattern of the optically-anisotropic layer, the single period over which the optical axis of the liquid crystal compound rotated by 180° was 10 μm. In addition, in the optically-anisotropic layer, the twisted angle of the liquid crystal compound in the thickness direction was 0°.

As a liquid crystal composition forming a third optically-anisotropic layer, the following composition B-3 was prepared.

| Composition B-3 | |
| --- | --- |
| Liquid crystal compound L-1 | 100.00 parts by mass |
| Chiral agent H-1 | 0.63 parts by mass |
| Polymerization initiator (IRGACURE-OXE01, manufactured by BASF SE) | 1.00 part by mass |
| Leveling agent T-1 | 0.08 parts by mass |
| Methyl ethyl ketone | 1050.00 parts by mass |

A third optically-anisotropic layer was formed using the same method as that of the first optically-anisotropic layer, except that the film thickness of the optically-anisotropic layer was adjusted using the composition B-3.

Finally, in the optically-anisotropic layer, $\Delta n_{550} \times$ thickness (Re(550)) of the liquid crystals was 160 nm, and it was verified using a polarization microscope that periodic alignment occurred on the surface. In the liquid crystal alignment pattern of the optically-anisotropic layer, the single period over which the optical axis of the liquid crystal compound rotated by 180° was 10 μm. In addition, in the optically-anisotropic layer, the twisted angle of the liquid crystal compound in the thickness direction was −80°.

Example 2

<Preparation of Liquid Crystal Diffraction Element>
(Formation of Alignment Film)
Using the same method as that of Comparative Example 1, an alignment film was formed on the glass substrate, and the alignment film was exposed to form an alignment film P-1 having an alignment pattern.
(Formation of Optically-Anisotropic Layer)
A first optically-anisotropic layer was formed using the same method as that of the first optically-anisotropic layer according to Example 1, except that a composition C-1 was prepared as a liquid crystal composition for forming the first optically-anisotropic layer by changing the amount of the chiral agent M-1 in the composition B-1 according to Example 1 to 0.34 parts by mass and the film thickness of the optically-anisotropic layer was adjusted.

Finally, in the optically-anisotropic layer, $\Delta n_{550} \times$thickness (Re(550)) of the liquid crystals was 190 nm, and it was verified using a polarization microscope that periodic alignment occurred on the surface. In the liquid crystal alignment pattern of the optically-anisotropic layer, the single period over which the optical axis of the liquid crystal compound rotated by 180° was 10 μm. In addition, in the optically-anisotropic layer, the twisted angle of the liquid crystal compound in the thickness direction was 87°.

A second optically-anisotropic layer was formed using the same method as that of the third optically-anisotropic layer according to Example 1, except that a composition C-2 was prepared as a liquid crystal composition for forming the second optically-anisotropic layer by changing the amount of the chiral agent H-1 in the composition B-3 according to Example 1 to 0.12 parts by mass and the film thickness of the optically-anisotropic layer was adjusted.

Finally, in the optically-anisotropic layer, $\Delta n_{550} \times$thickness (Re(550)) of the liquid crystals was 150 nm, and it was verified using a polarization microscope that periodic alignment occurred on the surface. In the liquid crystal alignment pattern of the optically-anisotropic layer, the single period over which the optical axis of the liquid crystal compound rotated by 180° was 10 μm. In addition, in the optically-anisotropic layer, the twisted angle of the liquid crystal compound in the thickness direction was −14°.

A third optically-anisotropic layer was formed using the same method as that of the first optically-anisotropic layer according to Example 1, except that a composition C-3 was prepared as a liquid crystal composition for forming the third optically-anisotropic layer by changing the amount of the chiral agent M-1 in the composition B-1 according to Example 1 to 0.07 parts by mass and the film thickness of the optically-anisotropic layer was adjusted.

Finally, in the optically-anisotropic layer, $\Delta n_{550} \times$thickness (Re(550)) of the liquid crystals was 150 nm, and it was verified using a polarization microscope that periodic alignment occurred on the surface. In the liquid crystal alignment pattern of the optically-anisotropic layer, the single period over which the optical axis of the liquid crystal compound rotated by 180° was 10 μm. In addition, in the optically-anisotropic layer, the twisted angle of the liquid crystal compound in the thickness direction was 14°.

A fourth optically-anisotropic layer was formed using the same method as that of the third optically-anisotropic layer according to Example 1, except that a composition C-4 was prepared as a liquid crystal composition for forming the fourth optically-anisotropic layer by changing the amount of the chiral agent H-1 in the composition B-3 according to Example 1 to 0.58 parts by mass and the film thickness of the optically-anisotropic layer was adjusted.

Finally, in the optically-anisotropic layer, $\Delta n_{550} \times$thickness (Re(550)) of the liquid crystals was 190 nm, and it was verified using a polarization microscope that periodic alignment occurred on the surface. In the liquid crystal alignment pattern of the optically-anisotropic layer, the single period over which the optical axis of the liquid crystal compound rotated by 180° was 10 μm. In addition, in the optically-anisotropic layer, the twisted angle of the liquid crystal compound in the thickness direction was −87°.

Example 3

<Preparation of Liquid Crystal Diffraction Element>
(Formation of Alignment Film)
Using the same method as that of Comparative Example 1, an alignment film was formed on the glass substrate, and the alignment film was exposed to form an alignment film P-1 having an alignment pattern.
(Formation of Optically-Anisotropic Layer)
A first optically-anisotropic layer was formed using the same method as that of the first optically-anisotropic layer according to Example 1, except that a composition D-1 was prepared as a liquid crystal composition for forming the first optically-anisotropic layer by changing the amount of the chiral agent M-1 in the composition B-1 according to Example 1 to 0.40 parts by mass and the film thickness of the optically-anisotropic layer was adjusted.

Finally, in the optically-anisotropic layer, $\Delta n_{550} \times$thickness (Re(550)) of the liquid crystals was 150 nm, and it was verified using a polarization microscope that periodic alignment occurred on the surface. In the liquid crystal alignment pattern of the optically-anisotropic layer, the single period over which the optical axis of the liquid crystal compound rotated by 180° was 10 μm. In addition, in the optically-anisotropic layer, the twisted angle of the liquid crystal compound in the thickness direction was 83°.

A second optically-anisotropic layer was formed using the same method as that of the first optically-anisotropic layer according to Example 1, except that a composition D-2 was prepared as a liquid crystal composition for forming the second optically-anisotropic layer by changing the amount of the chiral agent M-1 in the composition B-1 according to Example 1 to 0.02 parts by mass and the film thickness of the optically-anisotropic layer was adjusted.

Finally, in the optically-anisotropic layer, $\Delta n_{550} \times$thickness (Re(550)) of the liquid crystals was 335 nm, and it was verified using a polarization microscope that periodic alignment occurred on the surface. In the liquid crystal alignment pattern of the optically-anisotropic layer, the single period over which the optical axis of the liquid crystal compound rotated by 180° was 10 μm. In addition, in the optically-anisotropic layer, the twisted angle of the liquid crystal compound in the thickness direction was 8°.

A third optically-anisotropic layer was formed using the same method as that of the third optically-anisotropic layer according to Example 1, except that a composition D-3 was prepared as a liquid crystal composition for forming the third optically-anisotropic layer by changing the amount of the chiral agent H-1 in the composition B-3 according to Example 1 to 0.57 parts by mass and the film thickness of the optically-anisotropic layer was adjusted.

Finally, in the optically-anisotropic layer, $\Delta n_{550} \times$thickness (Re(550)) of the liquid crystals was 170 nm, and it was verified using a polarization microscope that periodic alignment occurred on the surface. In the liquid crystal alignment pattern of the optically-anisotropic layer, the single period over which the optical axis of the liquid crystal compound rotated by 180° was 1 µm. In addition, in the optically-anisotropic layer, the twisted angle of the liquid crystal compound in the thickness direction was −78°.

Comparative Example 2

<Preparation of Liquid Crystal Diffraction Element>
A first optically-anisotropic layer was formed using the same method as that of Comparative Example 1.
Finally, in the optically-anisotropic layer, $\Delta n_{550} \times$thickness (Re(550)) of the liquid crystals was 275 nm, and it was verified using a polarization microscope that periodic alignment occurred on the surface. In the liquid crystal alignment pattern of the optically-anisotropic layer, the single period over which the optical axis of the liquid crystal compound rotated by 180° was 10 µm. In addition, in the optically-anisotropic layer, the twisted angle of the liquid crystal compound in the thickness direction was 70°.

Comparative Example 3

<Preparation of Liquid Crystal Diffraction Element>
An alignment film P-2 was prepared using the same method as that of the exposure of the alignment film according to Comparative Example 1, except that the period of the alignment pattern was adjusted by changing the intersecting angle α between the two beams MA and MB in the exposure device shown in FIG. 10.
(Formation of Optically-Anisotropic Layer)
First and second optically-anisotropic layers were formed on the alignment film P-2 using the same method as that of Comparative Example 1.
Finally, in the first and second optically-anisotropic layers, $\Delta n_{550} \times$thickness (Re(550)) of the liquid crystals was 275 nm, and it was verified using a polarization microscope that periodic alignment occurred on the surface. In the liquid crystal alignment pattern of the optically-anisotropic layer, the single period over which the optical axis of the liquid crystal compound rotated by 180° was 1 µm. In addition, in the first optically-anisotropic layer, the twisted angle of the liquid crystal compound in the thickness direction was 70° in a plane. In the second optically-anisotropic layer, the twisted angle of the liquid crystal compound in the thickness direction was −70°.

Example 4

<Preparation of Liquid Crystal Diffraction Element>
An alignment film P-2 was prepared using the same method as that of Comparative Example 3.
(Formation of Optically-Anisotropic Layer)
A first optically-anisotropic layer was formed using the same method as that of the first optically-anisotropic layer according to Example 1, except that a composition E-1 was prepared as a liquid crystal composition for forming the first optically-anisotropic layer by changing the amount of the chiral agent M-1 in the composition B-1 according to Example 1 to 0.52 parts by mass and the film thickness of the optically-anisotropic layer was adjusted.
Finally, in the optically-anisotropic layer, $\Delta n_{550} \times$thickness (Re(550)) of the liquid crystals was 160 nm, and it was verified using a polarization microscope that periodic alignment occurred on the surface. In the liquid crystal alignment pattern of the optically-anisotropic layer, the single period over which the optical axis of the liquid crystal compound rotated by 180° was 1 µm. In addition, in the optically-anisotropic layer, the twisted angle of the liquid crystal compound in the thickness direction was 115°.

A second optically-anisotropic layer was formed using the same method as that of the first optically-anisotropic layer according to Example 1, except that a composition E-2 was prepared as a liquid crystal composition for forming the second optically-anisotropic layer by changing the amount of the chiral agent M-1 in the composition B-1 according to Example 1 to 0.16 parts by mass and the film thickness of the optically-anisotropic layer was adjusted.
Finally, in the optically-anisotropic layer, $\Delta n_{550} \times$thickness (Re(550)) of the liquid crystals was 335 nm, and it was verified using a polarization microscope that periodic alignment occurred on the surface. In the liquid crystal alignment pattern of the optically-anisotropic layer, the single period over which the optical axis of the liquid crystal compound rotated by 180° was 1 µm. In addition, in the optically-anisotropic layer, the twisted angle of the liquid crystal compound in the thickness direction was 76°.

A third optically-anisotropic layer was formed using the same method as that of the third optically-anisotropic layer according to Example 1, except that a composition E-3 was prepared as a liquid crystal composition for forming the third optically-anisotropic layer by changing the amount of the chiral agent H-1 in the composition B-3 according to Example 1 to 0.38 parts by mass and the film thickness of the optically-anisotropic layer was adjusted.
Finally, in the optically-anisotropic layer, $\Delta n_{550} \times$thickness (Re(550)) of the liquid crystals was 160 nm, and it was verified using a polarization microscope that periodic alignment occurred on the surface. In the liquid crystal alignment pattern of the optically-anisotropic layer, the single period over which the optical axis of the liquid crystal compound rotated by 180° was 1 µm. In addition, in the optically-anisotropic layer, the twisted angle of the liquid crystal compound in the thickness direction was −48°.

Example 5

<Preparation of Liquid Crystal Diffraction Element>
An alignment film P-2 was prepared using the same method as that of Comparative Example 3.
(Formation of Optically-Anisotropic Layer)
A first optically-anisotropic layer was formed using the same method as that of the first optically-anisotropic layer according to Example 2, except that a composition F-1 was prepared as a liquid crystal composition for forming the first optically-anisotropic layer by changing the amount of the chiral agent M-1 in the composition C-1 according to Example 2 to 0.44 parts by mass and the film thickness of the optically-anisotropic layer was adjusted.
Finally, in the optically-anisotropic layer, $\Delta n_{550} \times$thickness (Re(550)) of the liquid crystals was 190 nm, and it was verified using a polarization microscope that periodic alignment occurred on the surface. In the liquid crystal alignment pattern of the optically-anisotropic layer, the single period over which the optical axis of the liquid crystal compound rotated by 180° was 1 µm. In addition, in the optically-anisotropic layer, the twisted angle of the liquid crystal compound in the thickness direction was 115°.

A second optically-anisotropic layer was formed using the same method as that of the first optically-anisotropic layer according to Example 2, except that a composition F-2 was prepared as a liquid crystal composition for forming the second optically-anisotropic layer by changing the amount of the chiral agent M-1 in the composition C-1 according to Example 2 to 0.09 parts by mass and the film thickness of the optically-anisotropic layer was adjusted.

Finally, in the optically-anisotropic layer, $\Delta n_{550}\times$thickness (Re(550)) of the liquid crystals was 150 nm, and it was verified using a polarization microscope that periodic alignment occurred on the surface. In the liquid crystal alignment pattern of the optically-anisotropic layer, the single period over which the optical axis of the liquid crystal compound rotated by 180° was 1 μm. In addition, in the optically-anisotropic layer, the twisted angle of the liquid crystal compound in the thickness direction was 18°.

A third optically-anisotropic layer was formed using the same method as that of the third optically-anisotropic layer according to Example 2, except that a composition F-3 was prepared as a liquid crystal composition for forming the third optically-anisotropic layer by changing the amount of the chiral agent M-1 in the composition C-3 according to Example 2 to 0.04 parts by mass and the film thickness of the optically-anisotropic layer was adjusted.

Finally, in the optically-anisotropic layer, $\Delta n_{550}\times$thickness (Re(550)) of the liquid crystals was 150 nm, and it was verified using a polarization microscope that periodic alignment occurred on the surface. In the liquid crystal alignment pattern of the optically-anisotropic layer, the single period over which the optical axis of the liquid crystal compound rotated by 180° was 1 μm. In addition, in the optically-anisotropic layer, the twisted angle of the liquid crystal compound in the thickness direction was 8°.

A fourth optically-anisotropic layer was formed using the same method as that of the fourth optically-anisotropic layer according to Example 2, except that a composition F-4 was prepared as a liquid crystal composition for forming the fourth optically-anisotropic layer by changing the amount of the chiral agent H-1 in the composition C-4 according to Example 2 to 1.99 parts by mass and the film thickness of the optically-anisotropic layer was adjusted.

Finally, in the optically-anisotropic layer, $\Delta n_{550}\times$thickness (Re(550)) of the liquid crystals was 190 nm, and it was verified using a polarization microscope that periodic alignment occurred on the surface. In the liquid crystal alignment pattern of the optically-anisotropic layer, the single period over which the optical axis of the liquid crystal compound rotated by 180° was 1 μm. In addition, in the optically-anisotropic layer, the twisted angle of the liquid crystal compound in the thickness direction was −237°.

Example 6

<Preparation of Liquid Crystal Diffraction Element>

An alignment film P-2 was prepared using the same method as that of Comparative Example 3.
(Formation of Optically-Anisotropic Layer)

A first optically-anisotropic layer was formed using the same method as that of the first optically-anisotropic layer according to Example 1, except that a composition F-1 was prepared as a liquid crystal composition for forming the first optically-anisotropic layer by changing the amount of the chiral agent M-1 in the composition B-1 according to Example 1 to 0.55 parts by mass and the film thickness of the optically-anisotropic layer was adjusted.

Finally, in the optically-anisotropic layer, $\Delta n_{550}\times$thickness (Re(550)) of the liquid crystals was 150 nm, and it was verified using a polarization microscope that periodic alignment occurred on the surface. In the liquid crystal alignment pattern of the optically-anisotropic layer, the single period over which the optical axis of the liquid crystal compound rotated by 180° was 1 μm. In addition, in the optically-anisotropic layer, the twisted angle of the liquid crystal compound in the thickness direction was 114°.

A second optically-anisotropic layer was formed using the same method as that of the first optically-anisotropic layer according to Example 1, except that a composition F-2 was prepared as a liquid crystal composition for forming the second optically-anisotropic layer by changing the amount of the chiral agent M-1 in the composition B-1 according to Example 1 to 0.18 parts by mass and the film thickness of the optically-anisotropic layer was adjusted.

Finally, in the optically-anisotropic layer, $\Delta n_{550}\times$thickness (Re(550)) of the liquid crystals was 335 nm, and it was verified using a polarization microscope that periodic alignment occurred on the surface. In the liquid crystal alignment pattern of the optically-anisotropic layer, the single period over which the optical axis of the liquid crystal compound rotated by 180° was 1 μm. In addition, in the optically-anisotropic layer, the twisted angle of the liquid crystal compound in the thickness direction was 85°.

A third optically-anisotropic layer was formed using the same method as that of the third optically-anisotropic layer according to Example 1, except that a composition F-3 was prepared as a liquid crystal composition for forming the third optically-anisotropic layer by changing the amount of the chiral agent H-1 in the composition B-3 according to Example 1 to 0.30 parts by mass and the film thickness of the optically-anisotropic layer was adjusted.

Finally, in the optically-anisotropic layer, $\Delta n_{550}\times$thickness (Re(550)) of the liquid crystals was 170 nm, and it was verified using a polarization microscope that periodic alignment occurred on the surface. In the liquid crystal alignment pattern of the optically-anisotropic layer, the single period over which the optical axis of the liquid crystal compound rotated by 180° was 1 μm. In addition, in the optically-anisotropic layer, the twisted angle of the liquid crystal compound in the thickness direction was −41°.

[Evaluation]
<Evaluation of Inflection Points of Angle in Thickness Direction and Inflection Point where Tilt Direction was Folded>

In a case where a cross-section of the prepared optically-anisotropic layer was observed with an SEM, a pattern of bright portions and dark portions was observed. In a cross-sectional image obtained by the observation with the SEM, the number of inflection points of angle of the dark portion and the number of inflection points where the tilt direction of the dark portion was folded were evaluated.

The results are shown in Table 1.
<Evaluation of Diffraction Efficiency>

In a case where light was incident into the prepared liquid crystal diffraction element from the front (direction with an angle of 0° with respect to the normal line), the diffraction efficiency of emitted light was evaluated.

Specifically, laser light components having output central wavelengths of 405 nm, 450 nm, 532 nm, and 650 nm were irradiated to be vertically incident into the prepared liquid crystal diffraction element from a light source. In the emitted light from the liquid crystal diffraction element, the intensities of diffracted light (first-order light) diffracted in a desired direction and zero-order light and negative first-order light emitted in the other directions were measured using a photodetector, and the diffraction efficiency at each of the wavelengths was calculated from the following expression. The zero-order light refers to light emitted in the same direction as that of incidence light. In addition, the negative first-order light refers to light diffracted in a $-\theta$ direction in a case where the diffraction angle of first-order light with respect to zero-order light was represented by $\theta$.

Diffraction Efficiency=First-Order Light/(First-Order Light+Zero-Order Light+(Negative First-Order Light))

The average value of the diffraction efficiencies was obtained from the measured values at the wavelengths of 405 nm, 450 nm, 532 nm, and 650 nm, and the wavelength dependence of the diffraction efficiency was evaluated based on the following standards.

Laser light was caused to be vertically incident into the circularly polarizing plate corresponding to the wavelength of the laser light to be converted into circularly polarized light, the circularly polarized light was incident into the prepared liquid crystal diffraction element, and the evaluation was performed.

A: the average value of the diffraction efficiencies was 95% or more.
B: the average value of the diffraction efficiencies was 90% or more and less than 95%.
C: the average value of the diffraction efficiencies was less than 90%.

The results are shown in Table 1.

TABLE 1

| | | Comparative Example 1 | Example 1 | Example 2 | Example 3 | Comparative Example 2 | Comparative Example 3 | Example 4 | Example 5 | Example 6 |
|---|---|---|---|---|---|---|---|---|---|---|
| Liquid crystal alignment pattern | Single period [μm] | 10 | 10 | 10 | 10 | 10 | 1 | 1 | 1 | 1 |
| First optically-anisotropic layer | Ro(350)[nm] | 275 | 160 | 190 | 150 | 275 | 275 | 160 | 190 | 150 |
| | Twisted angle [°] | 70 | 80 | 87 | 63 | 70 | 70 | 113 | 115 | 114 |
| Second optically-anisotropic layer | Ro(350)[nm] | 273 | 330 | 130 | 135 | — | 275 | 335 | 150 | 335 |
| | Twisted angle [°] | −70 | 0 | −14 | 8 | — | −70 | 76 | 18 | 85 |
| Third optically-anisotropic layer | Ro(350)[nm] | — | 160 | 150 | 170 | — | — | 160 | 150 | 170 |
| | Twisted angle [°] | — | −80 | 18 | −78 | — | — | −48 | 8 | −41 |
| Fourth optically-anisotropic layer | Ro(350)[nm] | — | — | 190 | — | — | — | — | 190 | — |
| | Twisted angle [°] | — | — | −87 | — | — | — | — | −237 | — |
| Evaluation | Number of inflection points of angle | 1 | 2 | 3 | 2 | 0 | 1 | 2 | 3 | 2 |
| | Number of inflection points where tilt direction is labled | 1 | 1 | 3 | 1 | 0 | 1 | 1 | 1 | 1 |
| | Diffraction angle (312) (°) | 3 | 3 | 3 | 3 | 3 | 32 | 32 | 32 | 32 |
| | Wavelength dependence of diffraction efficiency | C | A | A | A | C | C | A | A | A |

Example 7

<Preparation of Liquid Crystal Diffraction Element>
An alignment film P-2 was prepared using the same method as that of Comparative Example 3.
(Formation of Optically-Anisotropic Layer)
First to third optically-anisotropic layers were formed using the same method as that of Example 6, except that the liquid crystal compound L-1 was changed to the following liquid crystal compound L-2, the addition amounts of the chiral agent M-1, the chiral agent H-1, and the leveling agent T-1 were appropriately changed, and the film thicknesses of the optically-anisotropic layers were adjusted.

Liquid Crystal Compound L-2

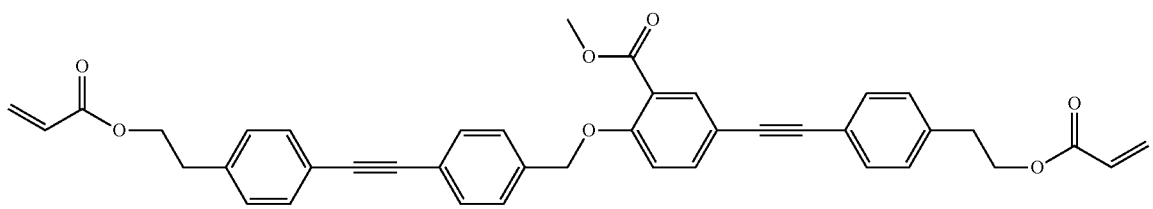

Finally, in the first optically-anisotropic layer, $\Delta n_{550} \times$ thickness (Re(550)) of the liquid crystals was 150 nm, and it was verified using a polarization microscope that periodic alignment occurred on the surface. In the liquid crystal alignment pattern of the optically-anisotropic layer, the single period over which the optical axis of the liquid crystal compound rotated by 180° was 1 μm. In addition, in the optically-anisotropic layer, the twisted angle of the liquid crystal compound in the thickness direction was 114°.

Finally, in the second optically-anisotropic layer, $\Delta n_{550} \times$ thickness (Re(550)) of the liquid crystals was 335 nm, and it was verified using a polarization microscope that periodic alignment occurred on the surface. In the liquid crystal alignment pattern of the optically-anisotropic layer, the single period over which the optical axis of the liquid crystal compound rotated by 180° was 1 μm. In addition, in the optically-anisotropic layer, the twisted angle of the liquid crystal compound in the thickness direction was 85°.

Finally, in the third optically-anisotropic layer, $\Delta n_{550} \times$ thickness (Re(550)) of the liquid crystals was 170 nm, and it was verified using a polarization microscope that periodic alignment occurred on the surface. In the liquid crystal alignment pattern of the optically-anisotropic layer, the single period over which the optical axis of the liquid crystal compound rotated by 180° was 1 μm. In addition, in the optically-anisotropic layer, the twisted angle of the liquid crystal compound in the thickness direction was −41°.

In a case where a cross-section of the prepared optically-anisotropic layer was observed with an SEM, a pattern of bright portions and dark portions was observed. In a cross-sectional image obtained by the observation with the SEM, the number of inflection points of angle of the dark portion was 2, and the number of inflection points where the tilt direction of the dark portion was folded was 1.

Example 8

<Preparation of Liquid Crystal Diffraction Element>

An alignment film P-2 was prepared using the same method as that of Comparative Example 3.

(Formation of Optically-Anisotropic Layer)

First to third optically-anisotropic layers were formed using the same method as that of Example 6, except that the liquid crystal compound L-1 was changed to the following liquid crystal compound L-3, the addition amounts of the chiral agent M-1, the chiral agent H-1, and the leveling agent T-1 were appropriately changed, the heating temperature of the coating film during the formation of the optically-anisotropic layer was changed to 55° C., and the film thicknesses of the optically-anisotropic layers were adjusted.

$\Delta n_{550}$ of the liquid crystal layers (liquid crystal compounds) in Example 6 was 0.15, $\Delta n_{550}$ of the liquid crystal layers in Example 7 was 0.25, and $\Delta n_{550}$ of the liquid crystal layers in Example 8 was 0.32.

<Evaluation of Diffraction Efficiency>

In a case where light was incident into the prepared liquid crystal diffraction element while changing an incidence angle in a range of ±40° (at an interval of 10°) from the front (direction with an angle of 0° with respect to the normal line), the diffraction efficiency of emitted light was evaluated.

Specifically, laser light components having output central wavelengths of 405 nm, 450 nm, 532 nm, and 650 nm were irradiated to be vertically incident into the prepared liquid crystal diffraction element from a light source. In the emitted light from the liquid crystal diffraction element, the intensities of diffracted light (first-order light) diffracted in a desired direction and zero-order light and negative first-order light emitted in the other directions were measured Liquid Crystal Compound L-3

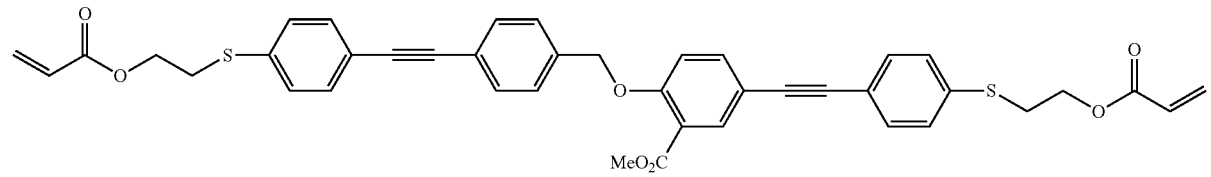

using a photodetector, and the diffraction efficiency at each of the wavelengths was calculated from the following expression. The zero-order light refers to light emitted in the same direction as that of incidence light. In addition, the negative first-order light refers to light diffracted in a −θ direction in a case where the diffraction angle of first-order light with respect to zero-order light was represented by θ.

Diffraction Efficiency=First-Order Light/(First-Order Light+Zero-Order Light+(Negative First-Order Light))

The average value of the diffraction efficiencies was obtained from the measured values at the wavelengths of 405 nm, 450 nm, 532 nm, and 650 nm that were measured at different incidence angles, and the wavelength dependence of the diffraction efficiency was evaluated.

Laser light was caused to be vertically incident into the circularly polarizing plate corresponding to the wavelength of the laser light to be converted into circularly polarized light, the circularly polarized light was incident into the prepared liquid crystal diffraction element, and the evaluation was performed.

As a result of the evaluation, as compared to Example 6, the average value of the diffraction efficiencies in Example 7 was improved, and the average value of the diffraction efficiencies in Example 8 was further improved.

It can be seen from the above results that, as the difference $\Delta n_{550}$ in refractive index of the liquid crystal layer of the liquid crystal diffraction element increases, the light utilization efficiency with respect to the different incidence angles is improved.

<Preparation of Circularly Polarizing Plate>
(Preparation of Retardation Plate)

A film including a cellulose acylate film, an alignment film, and an optically-anisotropic layer C was obtained using the same method as a positive A plate described in paragraphs "0102" to "0126" of JP2019-215416A.

The optically-anisotropic layer C was the positive A plate (retardation plate), and the thickness of the positive A plate was controlled such that Re(550) was 138 nm.

The prepared retardation plate was bonded to a linearly polarizing plate (polyvinyl alcohol layer type) through a pressure sensitive adhesive to prepare a circularly polarizing plate. The retardation plate and the linearly polarizing plate were disposed such that a relative angle between a slow axis of the retardation plate and an absorption axis of the linearly polarizing plate was 45°.

<Preparation of Optical Element>

The prepared circularly polarizing plate was bonded to the liquid crystal diffraction element prepared in each of Examples 1 to 8 to prepare an optical element. The optical element was prepared by disposing the liquid crystal diffraction element, the retardation plate, and the linearly polarizing plate in this order.

[Evaluation]

In a case where light was incident into the prepared optical element from the front (direction with an angle of 0° with respect to the normal line), the intensity of emitted light was evaluated.

Specifically, laser light components having output central wavelengths of 405 nm, 450 nm, 532 nm, and 650 nm were irradiated to be vertically incident into the prepared optical element from a light source. In the emitted light from the liquid crystal diffraction element, the intensities of diffracted light (first-order light) diffracted in a desired direction and zero-order light emitted in the other directions were measured using a photodetector. Laser light was caused to be vertically incident into the circularly polarizing plate corresponding to the wavelength of the laser light to be converted into circularly polarized light, the circularly polarized light was incident from the liquid crystal diffraction element side of the prepared optical element, and the evaluation was performed.

It was verified that, in the optical element where the circularly polarizing plate is bonded to each of the liquid crystal diffraction elements prepared in Examples 1 to 6, before bonding the circularly polarizing plate, the intensity of zero-order light at any wavelength can be significantly reduced, and the contrast ratio (intensity ratio first-order light/zero-order light) can be improved.

[Evaluation]
<Evaluation of Diffraction Efficiency>

In a case where light was incident into the optical element including the liquid crystal diffraction element prepared in Examples 6 to 8 while changing an incidence angle in a range of ±40° (at an interval of 10°) from the front (direction with an angle of 0° with respect to the normal line), the intensity of emitted light was evaluated.

Specifically, each of laser light components having output central wavelengths of 405 nm, 450 nm, 532 nm, and 650 nm was irradiated to be incident into the prepared liquid crystal diffraction element from a light source. In the emitted light from the liquid crystal diffraction element, the intensities of diffracted light (first-order light) diffracted in a desired direction and zero-order light (emitted in the same direction as incidence light) emitted in the other directions were measured using a photodetector.

The average value of the diffraction efficiencies with respect to the incidence angles was obtained from each of the measured values at the wavelengths of 405 nm, 450 nm, 532 nm, and 650 nm that were measured at different incidence angles.

Laser light was caused to be vertically incident into the circularly polarizing plate corresponding to the wavelength of the laser light to be converted into circularly polarized light, the circularly polarized light was incident from the liquid crystal diffraction element side of the prepared optical element, and the evaluation was performed.

It was verified that, in the optical element where the circularly polarizing plate is bonded to each of the liquid crystal diffraction elements prepared in Examples 6 to 8, before bonding the circularly polarizing plate, the intensity of zero-order light at any wavelength can be significantly reduced, and the contrast ratio (intensity ratio first-order light/zero-order light) can be improved.

In addition, as a result of the evaluation, as compared to Example 6, the average value of the contrast ratios with respect to the incidence angles in the optical element according to Example 7 was improved, and the average value of the contrast ratios with respect to the incidence angles in the optical element according to Example 8 was further improved.

It can be seen from the above results that, even in the optical element where the circularly polarizing plate is bonded to the liquid crystal diffraction element, as the difference $\Delta n_{550}$ in refractive index of the liquid crystal layer increases, the contrast ratio with respect to the different incidence angles is improved.

<Preparation of Circularly Polarizing Plate>

A circularly polarizing plate was prepared using the same method as that of preparing the above-described circularly polarizing plate, except that the linearly polarizing plate (polyvinyl alcohol layer type) was changed to an absorptive polarizing plate prepared as described above.

<Preparation of Optical Element>

A circularly polarizing plate prepared using the absorptive polarizing plate prepared as described below was bonded to the liquid crystal diffraction element prepared in each of Examples 1 to 6 to prepare an optical element. The optical element was prepared by disposing the liquid crystal diffraction element, the retardation plate, and the absorptive polarizing plate in this order.

[Preparation of Absorptive Polarizing Plate (Linearly Polarizing Plate)]

<Preparation of Transparent Support 1>

A coating liquid PA1 for forming an alignment layer described below was continuously applied to a cellulose acylate film (TAC substrate having a thickness of 40 μm; TG 40, manufactured by Fujifilm Corporation) using a wire bar. The support on which the coating film was formed was dried with hot air at 140° C. for 120 seconds. Next, the coating film was irradiated with polarized ultraviolet light (10 mJ/cm², using an ultra-high pressure mercury lamp) to form a photoalignment layer PA1. As a result, a TAC film with the photoalignment layer was obtained.

The film thickness of the photoalignment layer was 0.3 μm.

| Coating Liquid PA1 for Forming Alignment Layer | |
|---|---|
| The following polymer PA-1 | 100.00 parts by mass |
| The following acid generator PAG-1 | 5.00 parts by mass |
| The following acid generator CPI-110TF | 0.005 parts by mass |
| Xylene | 1220.00 parts by mass |
| Methyl isobutyl ketone | 122.00 parts by mass |

Polymer PA-1

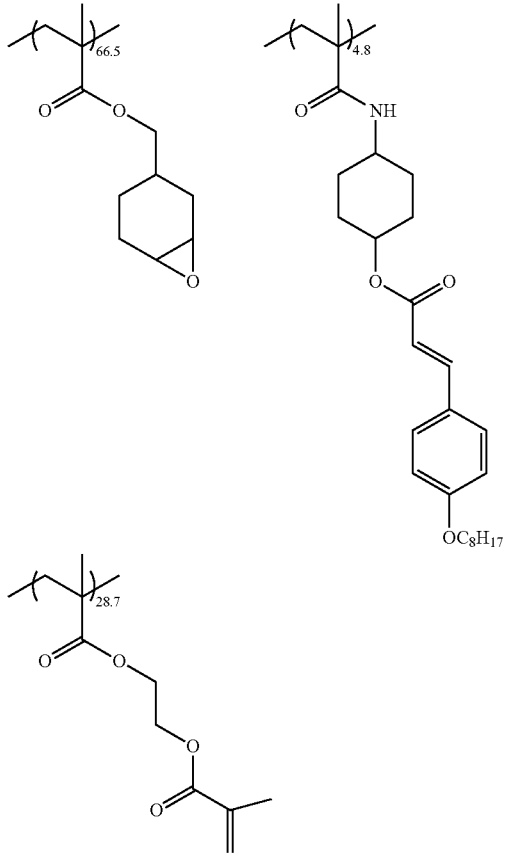

Acid Generator PAG-1

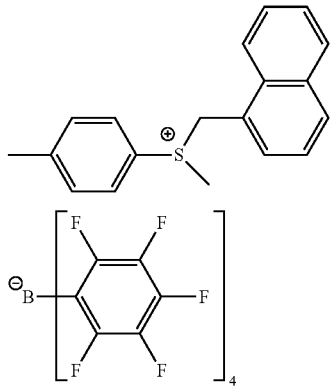

Acid Generator CPI-110F

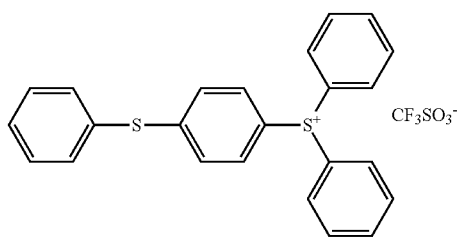

<Formation of Light-Absorption Anisotropic Layer P1>

A composition P1 for forming a light-absorption anisotropic layer described below was continuously applied to the obtained alignment layer PA1 using a wire bar to form a coating layer P1.

Next, the coating layer P1 was heated at 140° C. for 30 seconds and was cooled to room temperature (23° C.).

Next, the coating layer P1 was heated at 90° C. for 60 seconds and was cooled to room temperature.

Next, the coating layer P1 was irradiated with ultraviolet light using a LED light (central wavelength: 365 nm) for 2 seconds under irradiation conditions of an illuminance of 200 mW/cm² to form the light-absorption anisotropic layer P1 on the alignment layer PA1.

The film thickness of the light-absorption anisotropic layer was 1.6 μm.

As a result, a laminate 1B was obtained.

| Composition P1 for forming Light-Absorption Anisotropic Layer | |
|---|---|
| The following dichroic substance D-1 | 0.25 parts by mass |
| The following dichroic substance D-2 | 0.36 parts by mass |
| The following dichroic substance D-3 | 0.59 parts by mass |
| The following polymer liquid crystal compound P-1 | 2.21 parts by mass |
| The following low-molecular-weight liquid crystalline compound M-1 | 1.36 parts by mass |
| Polymerization initiator (IRGACURE OXE-02, manufactured by BASF SE) | 0.200 parts by mass |
| The following surfactant F-1 | 0.026 parts by mass |
| Cyclopentanone | 46.00 parts by mass |
| Tetrahydrofuran | 46.00 parts by mass |
| Benzyl alcohol | 3.00 parts by mass |

D-1
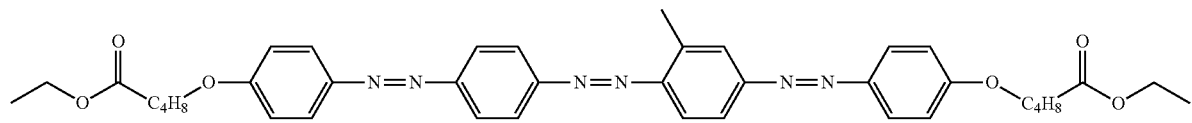
D-2
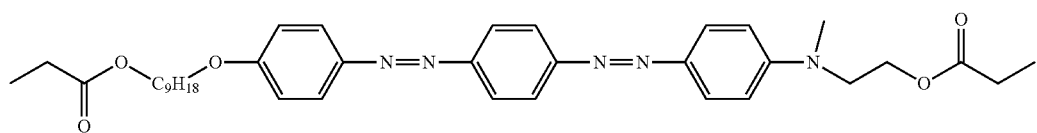
D-3
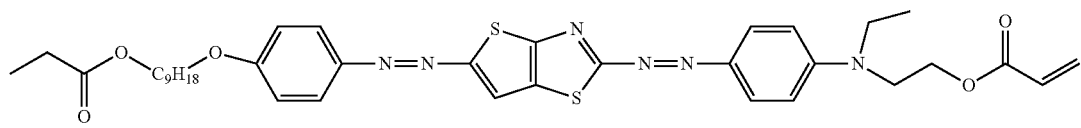
Polymer Liquid Crystal Compound P-1
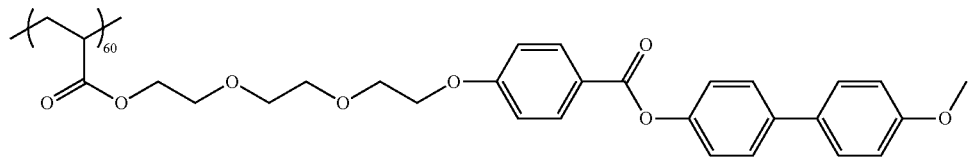
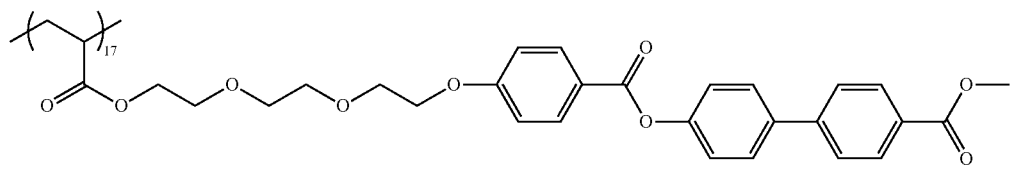
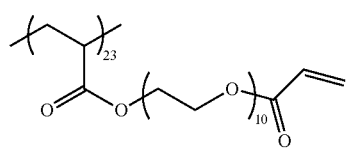
Low-Molecular-Weight Liquid Crystalline Compound M-1
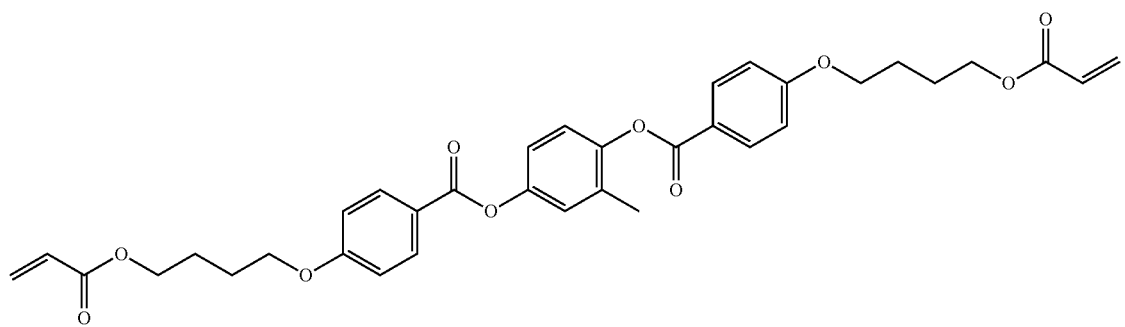
Surfactant F-1
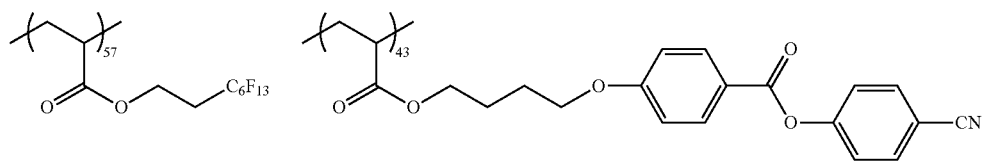

<Preparation of UV Adhesive>

The following UV adhesive composition was prepared.

| UV Adhesive Composition | |
|---|---|
| CEL2021P (manufactured by Daicel Corporation) | 70 parts by mass |
| 1,4-butanediol diglycidyl ether | 20 parts by mass |
| 2-ethylhexyl glycidyl ether | 10 parts by mass |
| CPI-100P | 2.25 parts by mass |

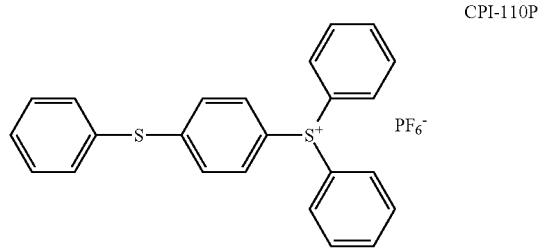

CPI-110P

<Preparation of Absorptive Polarizing Plate>

TECHNOLLOY S001G (methacrylic resin, thickness: 50 μm, tan δ peak temperature: 128° C., manufactured by Sumika Acryl Co., Ltd.) as a resin substrate S1 was bonded to the surface of the light-absorption anisotropic layer of the laminate 1B using the prepared UV adhesive. Next, only the cellulose acylate film was peeled off, and an absorptive polarizing plate in which the resin substrate, the adhesive layer, the light-absorption anisotropic layer, and the alignment layer were disposed in this order was prepared. The thickness of the UV adhesive layer was 2 μm.

The arithmetic average roughness Ra of the obtained absorptive polarizing plate was 10 nm or less. On the other hand, the arithmetic average roughness Ra of the linearly polarizing plate (polyvinyl alcohol layer type) was 20 nm or more.

As a result, in the prepared absorptive polarizing plate, the deflection (refraction or scattering) of light from the surface unevenness of the polarizing film can be reduced. In addition, in a case where the image display apparatus is used, the distortion of an image to be displayed can be suppressed.

The arithmetic average roughness Ra was measured using an interferometer "Vertscan" (manufactured by Mitsubishi Chemical Systems Inc.).

[Evaluation]

In a case where light was incident into the prepared optical element from the front (direction with an angle of 0° with respect to the normal line), the intensity of emitted light was evaluated.

Specifically, laser light components having output central wavelengths of 405 nm, 450 nm, 532 nm, and 650 nm were irradiated to be vertically incident into the prepared optical element from a light source. In the emitted light from the liquid crystal diffraction element, the intensities of diffracted light (first-order light) diffracted in a desired direction and zero-order light emitted in the other directions were measured using a photodetector. Laser light was caused to be vertically incident into the circularly polarizing plate corresponding to the wavelength of the laser light to be converted into circularly polarized light, the circularly polarized light was incident from the liquid crystal diffraction element side of the prepared optical element, and the evaluation was performed.

It was verified that, in the optical element where the circularly polarizing plate is bonded to each of the liquid crystal diffraction elements prepared in Examples 1 to 6, before bonding the circularly polarizing plate, the intensity of zero-order light at any wavelength can be significantly reduced, and the contrast ratio (intensity ratio first-order light/zero-order light) can be improved.

[Evaluation]

<Evaluation of Diffraction Efficiency>

In a case where light was incident into the optical element including the liquid crystal diffraction element prepared in Examples 6 to 8 while changing an incidence angle in a range of ±40° (at an interval of 10°) from the front (direction with an angle of 0° with respect to the normal line), the intensity of emitted light was evaluated.

Specifically, each of laser light components having output central wavelengths of 405 nm, 450 nm, 532 nm, and 650 nm was irradiated to be incident into the prepared liquid crystal diffraction element from a light source. In the emitted light from the liquid crystal diffraction element, the intensities of diffracted light (first-order light) diffracted in a desired direction and zero-order light (emitted in the same direction as incidence light) emitted in the other directions were measured using a photodetector.

The average value of the diffraction efficiencies with respect to the incidence angles was obtained from each of the measured values at the wavelengths of 405 nm, 450 nm, 532 nm, and 650 nm that were measured at different incidence angles.

Laser light was caused to be vertically incident into the circularly polarizing plate corresponding to the wavelength of the laser light to be converted into circularly polarized light, the circularly polarized light was incident from the liquid crystal diffraction element side of the prepared optical element, and the evaluation was performed.

It was verified that, in the optical element where the circularly polarizing plate is bonded to each of the liquid crystal diffraction elements prepared in Examples 6 to 8, before bonding the circularly polarizing plate, the intensity of zero-order light at any wavelength can be significantly reduced, and the contrast ratio (intensity ratio first-order light/zero-order light) can be improved.

In addition, as a result of the evaluation, as compared to Example 6, the average value of the contrast ratios with respect to the incidence angles in the optical element according to Example 7 was improved, and the average value of the contrast ratios with respect to the incidence angles in the optical element according to Example 8 was further improved.

It can be seen from the above results that, even in the optical element where the circularly polarizing plate is bonded to the liquid crystal diffraction element, as the difference $\Delta n_{550}$ in refractive index of the liquid crystal layer increases, the contrast ratio with respect to the different incidence angles is improved.

Comparative Example 11

<Preparation of Liquid Crystal Diffraction Element>
(Exposure of Alignment Film)

The concentric circular alignment film was exposed using the exposure device shown in FIG. 14 to form an alignment film PL-1 having an alignment pattern.

In the exposure device, a laser that emits laser light having a wavelength (325 nm) was used as the laser. The exposure amount of the interference light was 1000 mJ/cm². By using the exposure device shown in FIG. 14, the single period of the alignment pattern gradually decreased from the center toward the outer direction.
(Formation of Optically-Anisotropic Layer)

An optically-anisotropic layer was formed using the same method as that of Comparative Example 1, except that the alignment film PL-1 prepared as described above was used.

Finally, in the first optically-anisotropic layer, $\Delta n_{550} \times$ thickness (Re(550)) of the liquid crystals was 275 nm, and it was verified using a polarization microscope that concentric circular (radial) periodic alignment occurred on the surface as shown in FIG. 13. In the liquid crystal alignment pattern of the optically-anisotropic layer, regarding the single period over which the optical axis of the liquid crystal compound rotated by 180°, the single period of a portion at a distance of about 2 mm from the center was 10 µm, the single period of a portion at a distance of 25 mm from the center was 1 µm, and the single period of a portion at a distance of 30 mm from the center was 0.6 µm. This way, the single period decreased toward the outer direction. In addition, the twisted angle of the optically-anisotropic layer in the thickness direction was 70°.

Finally, in the second optically-anisotropic layer, $\Delta n_{550} \times$ thickness (Re(550)) of the liquid crystals was 275 nm, and it was verified using a polarization microscope that concentric circular (radial) periodic alignment occurred on the surface as shown in FIG. 13. In the liquid crystal alignment pattern of the optically-anisotropic layer, regarding the single period over which the optical axis of the liquid crystal compound rotated by 180°, the single period of a portion at a distance of about 2 mm from the center was 10 µm, the single period of a portion at a distance of 25 mm from the center was 1 µm, and the single period of a portion at a distance of 30 mm from the center was 0.6 µm. This way, the single period decreased toward the outer direction. In addition, the twisted angle of the optically-anisotropic layer in the thickness direction was −70°.

In a case where a cross-section of the prepared optically-anisotropic layer was observed with an SEM, a pattern of bright portions and dark portions was observed. In a cross-sectional image obtained by the observation with the SEM, the number of inflection points of angle of the dark portion was 1, and the number of inflection points where the tilt direction of the dark portion was folded was 1.

Example 11

<Preparation of Liquid Crystal Diffraction Element>
(Exposure of Alignment Film)

An alignment film PL-1 having the concentric circular alignment pattern was formed using the same method as that of Comparative Example 11.
(Formation of Optically-Anisotropic Layer)

An optically-anisotropic layer was formed using the same method as that of Example 1, except that the alignment film PL-1 prepared as described above was used.

Finally, in the first optically-anisotropic layer, $\Delta n_{550} \times$ thickness (Re(550)) of the liquid crystals was 160 nm, and it was verified using a polarization microscope that concentric circular (radial) periodic alignment occurred on the surface as shown in FIG. 13. In the liquid crystal alignment pattern of the optically-anisotropic layer, regarding the single period over which the optical axis of the liquid crystal compound rotated by 180°, the single period of a portion at a distance of about 2 mm from the center was 10 µm, the single period of a portion at a distance of 25 mm from the center was 1 µm, and the single period of a portion at a distance of 30 mm from the center was 0.6 µm. This way, the single period decreased toward the outer direction. In addition, the twisted angle of the optically-anisotropic layer in the thickness direction was 80°.

Finally, in the second optically-anisotropic layer, $\Delta n_{550} \times$ thickness (Re(550)) of the liquid crystals was 330 nm, and it was verified using a polarization microscope that concentric circular (radial) periodic alignment occurred on the surface as shown in FIG. 13. In the liquid crystal alignment pattern of the optically-anisotropic layer, regarding the single period over which the optical axis of the liquid crystal compound rotated by 180°, the single period of a portion at a distance of about 2 mm from the center was 10 µm, the single period of a portion at a distance of 25 mm from the center was 1 µm, and the single period of a portion at a distance of 30 mm from the center was 0.6 µm. This way, the single period decreased toward the outer direction. In addition, the twisted angle of the optically-anisotropic layer in the thickness direction was 0°.

Finally, in the third optically-anisotropic layer, $\Delta n_{550} \times$ thickness (Re(550)) of the liquid crystals was 160 nm, and it was verified using a polarization microscope that concentric circular (radial) periodic alignment occurred on the surface as shown in FIG. 13. In the liquid crystal alignment pattern of the optically-anisotropic layer, regarding the single period over which the optical axis of the liquid crystal compound rotated by 180°, the single period of a portion at a distance of about 2 mm from the center was 10 µm, the single period of a portion at a distance of 25 mm from the center was 1 µm, and the single period of a portion at a distance of 30 mm from the center was 0.6 µm. This way, the single period decreased toward the outer direction. In addition, the twisted angle of the optically-anisotropic layer in the thickness direction was −80°.

In a case where a cross-section of the prepared optically-anisotropic layer was observed with an SEM, a pattern of bright portions and dark portions was observed. In a cross-sectional image obtained by the observation with the SEM, the number of inflection points of angle of the dark portion was 2, and the number of inflection points where the tilt direction of the dark portion was folded was 1.

Example 12

<Preparation of Liquid Crystal Diffraction Element>
(Formation of Optically-Anisotropic Layer)

First to third optically-anisotropic layers were formed using the same method as that of Example 11, except that the liquid crystal compound L-1 was changed to the liquid crystal compound L-2, the addition amounts of the chiral agent M-1, the chiral agent H-1, and the leveling agent T-1 were appropriately changed, and the film thicknesses of the optically-anisotropic layers were adjusted.

Finally, in the first optically-anisotropic layer, $\Delta n_{550} \times$ thickness (Re(550)) of the liquid crystals was 160 nm, and it was verified using a polarization microscope that concentric circular (radial) periodic alignment occurred on the surface as shown in FIG. 13. In the liquid crystal alignment pattern of the optically-anisotropic layer, regarding the single period over which the optical axis of the liquid crystal compound rotated by 180°, the single period of a portion at a distance of about 2 mm from the center was 10 µm, the single period of a portion at a distance of 25 mm from the center was 1 µm, and the single period of a portion at a distance of 30 mm from the center was 0.6 µm. This way, the single period decreased toward the outer direction. In addition, the twisted angle of the optically-anisotropic layer in the thickness direction was 80°.

Finally, in the second optically-anisotropic layer, $\Delta n_{550} \times$ thickness (Re(550)) of the liquid crystals was 330 nm, and it was verified using a polarization microscope that concentric circular (radial) periodic alignment occurred on the surface as shown in FIG. 13. In the liquid crystal alignment pattern of the optically-anisotropic layer, regarding the single period over which the optical axis of the liquid crystal compound rotated by 180°, the single period of a portion at a distance of about 2 mm from the center was 10 µm, the single period of a portion at a distance of 25 mm from the center was 1 µm, and the single period of a portion at a distance of 30 mm from the center was 0.6 µm. This way, the single period decreased toward the outer direction. In addition, the twisted angle of the optically-anisotropic layer in the thickness direction was 0°.

Finally, in the third optically-anisotropic layer, $\Delta n_{550} \times$ thickness (Re(550)) of the liquid crystals was 160 nm, and it was verified using a polarization microscope that concentric circular (radial) periodic alignment occurred on the surface as shown in FIG. 13. In the liquid crystal alignment pattern of the optically-anisotropic layer, regarding the single period over which the optical axis of the liquid crystal compound rotated by 180°, the single period of a portion at a distance of about 2 mm from the center was 10 µm, the single period of a portion at a distance of 25 mm from the center was 1 µm, and the single period of a portion at a distance of 30 mm from the center was 0.6 µm. This way, the single period decreased toward the outer direction. In addition, the twisted angle of the optically-anisotropic layer in the thickness direction was −80°.

In a case where a cross-section of the prepared optically-anisotropic layer was observed with an SEM, a pattern of bright portions and dark portions was observed. In a cross-sectional image obtained by the observation with the SEM, the number of inflection points of angle of the dark portion was 2, and the number of inflection points where the tilt direction of the dark portion was folded was 1.

Example 13

<Preparation of Liquid Crystal Diffraction Element>
(Formation of Optically-Anisotropic Layer)

First to third optically-anisotropic layers were formed using the same method as that of Example 11, except that the liquid crystal compound L-1 was changed to the liquid crystal compound L-3, the addition amounts of the chiral agent M-1, the chiral agent H-1, and the leveling agent T-1 were appropriately changed, the heating temperature of the coating film during the formation of the optically-anisotropic layer was changed to 55° C., and the film thicknesses of the optically-anisotropic layers were adjusted.

Finally, in the first optically-anisotropic layer, $\Delta n_{550} \times$ thickness (Re(550)) of the liquid crystals was 160 nm, and it was verified using a polarization microscope that concentric circular (radial) periodic alignment occurred on the surface as shown in FIG. 13. In the liquid crystal alignment pattern of the optically-anisotropic layer, regarding the single period over which the optical axis of the liquid crystal compound rotated by 180°, the single period of a portion at a distance of about 2 mm from the center was 10 µm, the single period of a portion at a distance of 25 mm from the center was 1 µm, and the single period of a portion at a distance of 30 mm from the center was 0.6 µm. This way, the single period decreased toward the outer direction. In addition, the twisted angle of the optically-anisotropic layer in the thickness direction was 80°.

Finally, in the second optically-anisotropic layer, $\Delta n_{550} \times$ thickness (Re(550)) of the liquid crystals was 330 nm, and it was verified using a polarization microscope that concentric circular (radial) periodic alignment occurred on the surface as shown in FIG. 13. In the liquid crystal alignment pattern of the optically-anisotropic layer, regarding the single period over which the optical axis of the liquid crystal compound rotated by 180°, the single period of a portion at a distance of about 2 mm from the center was 10 µm, the single period of a portion at a distance of 25 mm from the center was 1 µm, and the single period of a portion at a distance of 30 mm from the center was 0.6 µm. This way, the single period decreased toward the outer direction. In addition, the twisted angle of the optically-anisotropic layer in the thickness direction was 0°.

Finally, in the third optically-anisotropic layer, $\Delta n_{550} \times$ thickness (Re(550)) of the liquid crystals was 160 nm, and it was verified using a polarization microscope that concentric circular (radial) periodic alignment occurred on the surface as shown in FIG. 13. In the liquid crystal alignment pattern of the optically-anisotropic layer, regarding the single period over which the optical axis of the liquid crystal compound rotated by 180°, the single period of a portion at a distance of about 2 mm from the center was 10 µm, the single period of a portion at a distance of 25 mm from the center was 1 µm, and the single period of a portion at a distance of 30 mm from the center was 0.6 µm. This way, the single period decreased toward the outer direction. In addition, the twisted angle of the optically-anisotropic layer in the thickness direction was −80°.

In a case where a cross-section of the prepared optically-anisotropic layer was observed with an SEM, a pattern of bright portions and dark portions was observed. In a cross-sectional image obtained by the observation with the SEM, the number of inflection points of angle of the dark portion was 2, and the number of inflection points where the tilt direction of the dark portion was folded was 1.

$\Delta n_{550}$ of the liquid crystal layers (liquid crystal compounds) in Example 11 was 0.15, $\Delta n_{550}$ of the liquid crystal layers in Example 12 was 0.25, and $\Delta n_{550}$ of the liquid crystal layers in Example 13 was 0.32.

Example 14

<Preparation of Liquid Crystal Diffraction Element>
(Exposure of Alignment Film)

An alignment film PL-1 having the concentric circular alignment pattern was formed using the same method as that of Comparative Example 11.
(Formation of Optically-Anisotropic Layer)

An optically-anisotropic layer was formed using the same method as that of Example 3, except that the alignment film PL-1 prepared as described above was used.

Finally, in the first optically-anisotropic layer, $\Delta n_{550} \times$ thickness (Re(550)) of the liquid crystals was 150 nm, and it was verified using a polarization microscope that concentric circular (radial) periodic alignment occurred on the surface as shown in FIG. 13. In the liquid crystal alignment pattern of the optically-anisotropic layer, regarding the single period over which the optical axis of the liquid crystal compound rotated by 180°, the single period of a portion at a distance of about 2 mm from the center was 10 µm, the single period of a portion at a distance of 25 mm from the center was 1 µm, and the single period of a portion at a distance of 30 mm from the center was 0.6 µm. This way, the single period decreased toward the outer direction. In addition, the twisted angle of the optically-anisotropic layer in the thickness direction was 83°.

Finally, in the second optically-anisotropic layer, $\Delta n_{550} \times$ thickness (Re(550)) of the liquid crystals was 335 nm, and it was verified using a polarization microscope that concentric circular (radial) periodic alignment occurred on the surface as shown in FIG. 13. In the liquid crystal alignment pattern of the optically-anisotropic layer, regarding the single period over which the optical axis of the liquid crystal compound rotated by 180°, the single period of a portion at a distance of about 2 mm from the center was 10 μm, the single period of a portion at a distance of 25 mm from the center was 1 μm, and the single period of a portion at a distance of 30 mm from the center was 0.6 μm. This way, the single period decreased toward the outer direction. In addition, the twisted angle of the optically-anisotropic layer in the thickness direction was 8°.

Finally, in the third optically-anisotropic layer, $\Delta n_{550} \times$ thickness (Re(550)) of the liquid crystals was 170 nm, and it was verified using a polarization microscope that concentric circular (radial) periodic alignment occurred on the surface as shown in FIG. 13. In the liquid crystal alignment pattern of the optically-anisotropic layer, regarding the single period over which the optical axis of the liquid crystal compound rotated by 180°, the single period of a portion at a distance of about 2 mm from the center was 10 μm, the single period of a portion at a distance of 25 mm from the center was 1 μm, and the single period of a portion at a distance of 30 mm from the center was 0.6 μm. This way, the single period decreased toward the outer direction. In addition, the twisted angle of the optically-anisotropic layer in the thickness direction was −78°.

In a case where a cross-section of the prepared optically-anisotropic layer was observed with an SEM, a pattern of bright portions and dark portions was observed. In a cross-sectional image obtained by the observation with the SEM, the number of inflection points of angle of the dark portion was 2, and the number of inflection points where the tilt direction of the dark portion was folded was 1.

Example 15

<Preparation of Liquid Crystal Diffraction Element>
(Formation of Optically-ΔNisotropic Layer)

First to third optically-anisotropic layers were formed using the same method as that of Example 14, except that the liquid crystal compound L-1 was changed to the liquid crystal compound L-2, the addition amounts of the chiral agent M-1, the chiral agent H-1, and the leveling agent T-1 were appropriately changed, and the film thicknesses of the optically-anisotropic layers were adjusted.

Finally, in the first optically-anisotropic layer, $\Delta n_{550} \times$ thickness (Re(550)) of the liquid crystals was 150 nm, and it was verified using a polarization microscope that concentric circular (radial) periodic alignment occurred on the surface as shown in FIG. 13. In the liquid crystal alignment pattern of the optically-anisotropic layer, regarding the single period over which the optical axis of the liquid crystal compound rotated by 180°, the single period of a portion at a distance of about 2 mm from the center was 10 μm, the single period of a portion at a distance of 25 mm from the center was 1 μm, and the single period of a portion at a distance of 30 mm from the center was 0.6 μm. This way, the single period decreased toward the outer direction. In addition, the twisted angle of the optically-anisotropic layer in the thickness direction was 83°.

Finally, in the second optically-anisotropic layer, $\Delta n_{550} \times$ thickness (Re(550)) of the liquid crystals was 335 nm, and it was verified using a polarization microscope that concentric circular (radial) periodic alignment occurred on the surface as shown in FIG. 13. In the liquid crystal alignment pattern of the optically-anisotropic layer, regarding the single period over which the optical axis of the liquid crystal compound rotated by 180°, the single period of a portion at a distance of about 2 mm from the center was 10 μm, the single period of a portion at a distance of 25 mm from the center was 1 μm, and the single period of a portion at a distance of 30 mm from the center was 0.6 μm. This way, the single period decreased toward the outer direction. In addition, the twisted angle of the optically-anisotropic layer in the thickness direction was 8°.

Finally, in the third optically-anisotropic layer, $\Delta n_{550} \times$ thickness (Re(550)) of the liquid crystals was 170 nm, and it was verified using a polarization microscope that concentric circular (radial) periodic alignment occurred on the surface as shown in FIG. 13. In the liquid crystal alignment pattern of the optically-anisotropic layer, regarding the single period over which the optical axis of the liquid crystal compound rotated by 180°, the single period of a portion at a distance of about 2 mm from the center was 10 μm, the single period of a portion at a distance of 25 mm from the center was 1 and the single period of a portion at a distance of 30 mm from the center was 0.6 This way, the single period decreased toward the outer direction. In addition, the twisted angle of the optically-anisotropic layer in the thickness direction was −78°.

In a case where a cross-section of the prepared optically-anisotropic layer was observed with an SEM, a pattern of bright portions and dark portions was observed. In a cross-sectional image obtained by the observation with the SEM, the number of inflection points of angle of the dark portion was 2, and the number of inflection points where the tilt direction of the dark portion was folded was 1.

Example 16

<Preparation of Liquid Crystal Diffraction Element>
(Formation of Optically-Anisotropic Layer)

First to third optically-anisotropic layers were formed using the same method as that of Example 14, except that the liquid crystal compound L-1 was changed to the liquid crystal compound L-3, the addition amounts of the chiral agent M-1, the chiral agent H-1, and the leveling agent T-1 were appropriately changed, and the film thicknesses of the optically-anisotropic layers were adjusted.

Finally, in the first optically-anisotropic layer, $\Delta n_{550} \times$ thickness (Re(550)) of the liquid crystals was 150 nm, and it was verified using a polarization microscope that concentric circular (radial) periodic alignment occurred on the surface as shown in FIG. 13. In the liquid crystal alignment pattern of the optically-anisotropic layer, regarding the single period over which the optical axis of the liquid crystal compound rotated by 180°, the single period of a portion at a distance of about 2 mm from the center was 10 μm, the single period of a portion at a distance of 25 mm from the center was 1 μm, and the single period of a portion at a distance of 30 mm from the center was 0.6 μm. This way, the single period decreased toward the outer direction. In addition, the twisted angle of the optically-anisotropic layer in the thickness direction was 83°.

Finally, in the second optically-anisotropic layer, $\Delta n_{550} \times$ thickness (Re(550)) of the liquid crystals was 335 nm, and it was verified using a polarization microscope that concentric circular (radial) periodic alignment occurred on the surface as shown in FIG. 13. In the liquid crystal alignment pattern of the optically-anisotropic layer, regarding the single period over which the optical axis of the liquid crystal compound rotated by 180°, the single period of a portion at a distance of about 2 mm from the center was 10 µm, the single period of a portion at a distance of 25 mm from the center was 1 µm, and the single period of a portion at a distance of 30 mm from the center was 0.6 µm. This way, the single period decreased toward the outer direction. In addition, the twisted angle of the optically-anisotropic layer in the thickness direction was 8°.

Finally, in the third optically-anisotropic layer, $\Delta n_{550} \times$ thickness (Re(550)) of the liquid crystals was 170 nm, and it was verified using a polarization microscope that concentric circular (radial) periodic alignment occurred on the surface as shown in FIG. 13. In the liquid crystal alignment pattern of the optically-anisotropic layer, regarding the single period over which the optical axis of the liquid crystal compound rotated by 180°, the single period of a portion at a distance of about 2 mm from the center was 10 µm, the single period of a portion at a distance of 25 mm from the center was 1 µm, and the single period of a portion at a distance of 30 mm from the center was 0.6 µm. This way, the single period decreased toward the outer direction. In addition, the twisted angle of the optically-anisotropic layer in the thickness direction was −78°.

In a case where a cross-section of the prepared optically-anisotropic layer was observed with an SEM, a pattern of bright portions and dark portions was observed. In a cross-sectional image obtained by the observation with the SEM, the number of inflection points of angle of the dark portion was 2, and the number of inflection points where the tilt direction of the dark portion was folded was 1.

$\Delta n_{550}$ of the liquid crystal layers (liquid crystal compounds) in Example 14 was 0.15, $\Delta n_{550}$ of the liquid crystal layers in Example 15 was 0.25, and $\Delta n_{550}$ of the liquid crystal layers in Example 16 was 0.32.

[Evaluation]

<Evaluation of Diffraction Efficiency>

In a case where light was incident into the liquid crystal diffraction element prepared in each of Comparative Example 11 and Examples 11 to 16 from the front (direction with an angle of 0° with respect to the normal line), the diffraction efficiency of emitted light was evaluated.

Specifically, each of laser light components having output central wavelengths of 405 nm, 450 nm, 532 nm, and 650 nm was irradiated to be vertically incident into the prepared liquid crystal diffraction element from a light source. In the emitted light from the liquid crystal diffraction element, the intensities of diffracted light (first-order light) diffracted in a desired direction, zero-order light (emitted in the same direction as incidence light) emitted in the other directions, and negative first-order light (light diffracted in a −θ direction in a case where the diffraction angle of first-order light with respect to zero-order light was represented by θ) were measured using a photodetector, and the diffraction efficiency at each of the wavelengths was calculated from the following expression.

Diffraction Efficiency=First-Order Light/(First-Order Light+Zero-Order Light+(Negative First-Order Light))

The average value of the diffraction efficiencies was obtained from the measured values at the wavelengths of 405 nm, 450 nm, 532 nm, and 650 nm, and the wavelength dependence of the diffraction efficiency was evaluated.

Laser light was caused to be vertically incident into the circularly polarizing plate corresponding to the wavelength of the laser light to be converted into circularly polarized light, the circularly polarized light was incident into the prepared liquid crystal diffraction element, and the evaluation was performed.

In addition, in the liquid crystal alignment pattern of the prepared liquid crystal diffraction element, the evaluation was performed at three positions including the center portion of the concentric circle and the vicinity of the concentric circle (the single period was 10 µm), the vicinity of an end part (the single period was 1 µm), and the end part (the single period was 0.6 µm).

As compared to Comparative Example 11, in Examples 11 to 16, higher diffraction efficiency was obtained regarding the wavelength dependence of the diffraction efficiency.

[Evaluation]

<Evaluation of Diffraction Efficiency>

In a case where light was incident into the prepared liquid crystal diffraction element prepared in Comparative Example 11, Examples 11 to 13, and Examples 14 to 16 while changing an incidence angle in a range of ±40° (at an interval of 10°) from the front (direction with an angle of 0° with respect to the normal line), the diffraction efficiency of emitted light was evaluated.

Specifically, each of laser light components having output central wavelengths of 405 nm, 450 nm, 532 nm, and 650 nm was irradiated to be incident into the prepared liquid crystal diffraction element from a light source. In the emitted light from the liquid crystal diffraction element, the intensities of diffracted light (first-order light) diffracted in a desired direction, zero-order light (emitted in the same direction as incidence light) emitted in the other directions, and negative first-order light (light diffracted in a −θ direction in a case where the diffraction angle of first-order light with respect to zero-order light was represented by θ) were measured using a photodetector, and the diffraction efficiency at each of the wavelengths was calculated from the following expression.

Diffraction Efficiency=First-Order Light/(First-Order Light+Zero-Order Light+(Negative First-Order Light))

The average value of the diffraction efficiencies was obtained from the measured values at the wavelengths of 405 nm, 450 nm, 532 nm, and 650 nm that were measured at different incidence angles, and the wavelength dependence of the diffraction efficiency was evaluated.

Laser light was caused to be vertically incident into the circularly polarizing plate corresponding to the wavelength of the laser light to be converted into circularly polarized light, the circularly polarized light was incident into the prepared liquid crystal diffraction element, and the evaluation was performed.

In addition, in the liquid crystal alignment pattern of the prepared liquid crystal diffraction element, the evaluation was performed at three positions including the center portion of the concentric circle and the vicinity of the concentric circle (the single period was 10 µm), the vicinity of an end part (the single period was 1 µm), and the end part (the single period was 0.6 µm).

As a result of the evaluation, as compared to Comparative Example 11, in Examples 11 to 16, a higher average value of the diffraction efficiencies was obtained.

In addition, as a result of the evaluation, as compared to Example 11, the average value of the diffraction efficiencies in Example 12 was improved, and the average value of the diffraction efficiencies in Example 13 was further improved.

In addition, as a result of the evaluation, as compared to Example 14, the average value of the diffraction efficiencies in Example 15 was improved, and the average value of the diffraction efficiencies in Example 16 was further improved.

It can be seen from the above results that, as the difference $\Delta n_{550}$ in refractive index of the liquid crystal layer of the liquid crystal diffraction element increases, the light utilization efficiency with respect to the different incidence angles is improved.

<Preparation of Circularly Polarizing Plate>
[Preparation of Absorptive Polarizing Plate (Linearly Polarizing Plate)]

An absorptive polarizing plate (linearly polarizing plate) and a retardation plate were prepared using the above-described method, and a circularly polarizing plate was prepared.

<Preparation of Optical Element>

A circularly polarizing plate prepared using the absorptive polarizing plate prepared as described above was bonded to the liquid crystal diffraction element prepared in each of Comparative Example 11 and Examples 11 to 16 to prepare an optical element. The optical element was prepared by disposing the liquid crystal diffraction element, the retardation plate, and the absorptive polarizing plate in this order.

[Evaluation]

In a case where light was incident into the optical element prepared in each of Comparative Example 11 and Examples 11 to 16 from the front (direction with an angle of 0° with respect to the normal line), the intensity of emitted light was evaluated.

Specifically, laser light components having output central wavelengths of 405 nm, 450 nm, 532 nm, and 650 nm were irradiated to be vertically incident into the prepared optical element from a light source. In the emitted light from the liquid crystal diffraction element, the intensities of diffracted light (first-order light) diffracted in a desired direction and zero-order light (emitted in the same direction as incidence light) emitted in the other directions were measured using a photodetector. Laser light was caused to be vertically incident into the circularly polarizing plate corresponding to the wavelength of the laser light to be converted into circularly polarized light, the circularly polarized light was incident from the liquid crystal diffraction element side of the prepared optical element, and the evaluation was performed.

It was verified that, in the optical element where the circularly polarizing plate is bonded to each of the liquid crystal diffraction elements prepared in Examples 1 to 7, before bonding the circularly polarizing plate, the intensity of zero-order light at any wavelength can be significantly reduced, and the contrast ratio (intensity ratio first-order light/zero-order light) can be improved.

[Evaluation]
<Evaluation of Incidence Angle Dependence>

In a case where light was incident into the optical element including the liquid crystal diffraction element prepared in Comparative Example 11 and Examples 11 to 16 while changing an incidence angle in a range of ±40° (at an interval of 10°) from the front (direction with an angle of 0° with respect to the normal line), the intensity of emitted light was evaluated.

Specifically, each of laser light components having output central wavelengths of 405 nm, 450 nm, 532 nm, and 650 nm was irradiated to be incident into the prepared liquid crystal diffraction element from a light source. In the emitted light from the liquid crystal diffraction element, the intensities of diffracted light (first-order light) diffracted in a desired direction and zero-order light (emitted in the same direction as incidence light) emitted in the other directions were measured using a photodetector.

The average value of the diffraction efficiencies with respect to the incidence angles was obtained from each of the measured values at the wavelengths of 405 nm, 450 nm, 532 nm, and 650 nm that were measured at different incidence angles.

In addition, in the liquid crystal alignment pattern of the prepared liquid crystal diffraction element, the evaluation was performed at three positions including the center portion of the concentric circle and the vicinity of the concentric circle (the single period was 10 μm), the vicinity of an end part (the single period was 1 μm), and the end part (the single period was 0.6 μm).

Laser light was caused to be vertically incident into the circularly polarizing plate corresponding to the wavelength of the laser light to be converted into circularly polarized light, the circularly polarized light was incident from the liquid crystal diffraction element side of the prepared optical element, and the evaluation was performed.

It was verified that, in the optical element where the circularly polarizing plate is bonded to each of the liquid crystal diffraction elements prepared in Examples 11 to 16, before bonding the circularly polarizing plate, the intensity of zero-order light at any wavelength can be significantly reduced, and the contrast ratio (intensity ratio first-order light/zero-order light) can be improved.

In addition, as compared to the optical element prepared in Comparative Example 11, in the optical elements prepared in Examples 11 to 16, a higher contrast ratio was obtained.

In addition, as a result of the evaluation, as compared to Example 11, the average value of the contrast ratios with respect to the incidence angles in Example 12 was improved, and the average value of the contrast ratios with respect to the incidence angles in Example 13 was further improved.

In addition, as a result of the evaluation, as compared to Example 14, the average value of the contrast ratios with respect to the incidence angles in Example 15 was improved, and the average value of the contrast ratios with respect to the incidence angles in Example 16 was further improved.

It can be seen from the above results that, even in the optical element where the circularly polarizing plate is bonded to the liquid crystal diffraction element, as the difference $\Delta n_{550}$ in refractive index of the liquid crystal layer increases, the contrast ratio with respect to the different incidence angles is improved.

<Change of Support>

Using a method described below, the support of the liquid crystal diffraction element can be appropriately changed depending on purposes. In addition, in the method described below, the thickness between the liquid crystal diffraction element and the changed support can be reduced, and the in-plane thickness of the liquid crystal diffraction element after changing the support can be made uniform with respect to, for example, a pressure sensitive adhesive (thickness: several micrometers to several tens of micrometers). This way, even in a case where the support of the liquid crystal diffraction element was changed, by making the in-plane thickness uniform, a direction of light emitted from the liquid crystal diffraction element can be accurately controlled in a plane.

The liquid crystal diffraction element and the new support may be laminated, for example, in the following procedure.

(1) A temporary support is bonded to the liquid crystal layer side of the support, the alignment film, and the liquid crystal diffraction element to be laminated. In this example, as the temporary support, MASTACK AS3-304 manufactured by Fujimori Kogyo Co., Ltd. was used.

(2) Next, the support and the alignment film present from the step of preparing the liquid crystal diffraction element are peeled off to expose the interface of the liquid crystal diffraction element on the alignment film side.

(3) A silicon oxide layer ($SiO_X$ layer) is formed on both of the interface of the liquid crystal diffraction element on the alignment film side and the interface of the newly prepared support. A method of forming the silicon oxide layer is not limited and, for example, vacuum deposition is preferably used. In this example, the formation of the silicon oxide layer was performed using a vapor deposition device (model number: ULEYES) manufactured by ULVAC, Inc. As a vapor deposition source, $SiO_2$ powder was used. The thickness of the silicon oxide layer is not limited and is preferably 50 nm or less. In this example, the thickness of the silicon oxide film was 50 nm or less.

(4) Next, plasma treatment is performed on both of the formed silicon oxide films, the formed silicon oxide layers are bonded to each other at 120° C., and the temporary support is peeled off.

Through the steps (1) to (4), a diffraction element where the liquid crystal diffraction element and the newly prepared support are laminated can be prepared. In addition, by changing the support to another liquid crystal diffraction element and repeating the steps (1) to (4), a diffraction element where two or three or more liquid crystal diffraction elements are laminated can be prepared.

Through the steps (1) to (4) the support of the liquid crystal diffraction element prepared in Example 1 was changed to a glass substrate having a thickness of 0.3 mm. As a comparison, using a pressure sensitive adhesive having a thickness of 25 μm, the support of the liquid crystal diffraction element prepared in Example 1 was changed to a glass substrate having a thickness of 0.3 mm (the liquid crystal diffraction element was bonded to the glass substrate through the pressure sensitive adhesive). In the liquid crystal diffraction element prepared through the steps (1) to (4), the in-plane thickness of the liquid crystal diffraction element was able to be made more uniform than that of the liquid crystal diffraction element prepared through the pressure sensitive adhesive.

<Preparation of Laminate>

Likewise, a laminate including the liquid crystal diffraction element and another optical member or the like can be prepared.

For example, a laminate including a liquid crystal diffraction element, a retardation plate, and a polarizing plate was prepared using the following method.

A silicon oxide layer ($SiO_x$ layer) was formed on a liquid crystal layer side of a liquid crystal diffraction element including a support, an alignment film, and a liquid crystal layer to be laminated and on a bonding surface side of a retardation plate to be bonded to the liquid crystal diffraction element. A method of forming the silicon oxide layer is not limited and, for example, vacuum deposition is preferably used. In this example, the formation of the silicon oxide layer was performed using a vapor deposition device (model number: ULEYES) manufactured by ULVAC, Inc. As a vapor deposition source, $SiO_2$ powder was used. The thickness of the silicon oxide layer is not limited and is preferably 50 nm or less. In this example, the thickness of the silicon oxide film was 50 nm or less. Plasma treatment was performed on both of the formed silicon oxide films, and the formed silicon oxide layers were bonded to each other at 120° C. As a result, the laminate including the liquid crystal diffraction element and the retardation plate was formed. Likewise, by bonding a polarizing plate to the retardation plate and peeling off the support and the alignment film, a laminate consisting of the liquid crystal layer (liquid crystal diffraction element), the retardation plate, and the polarizing plate was prepared.

As the liquid crystal diffraction element, the liquid crystal diffraction element prepared in each of Examples 1 to 16 was used. As the retardation plate, the retardation plate used for preparing the above-described circularly polarizing plate was used. As the polarizing plate, a laminate including each of the above-described linearly polarizing plate (polyvinyl alcohol layer type) and the absorptive polarizing plate was prepared.

It was verified that, in the optical element as the laminate including the liquid crystal diffraction element, the retardation plate, and the polarizing plate, before bonding the circularly polarizing plate (the laminate of the retardation plate and the polarizing plate), the intensity of zero-order light at any wavelength can be significantly reduced, and the contrast ratio (intensity ratio first-order light/zero-order light) can be improved.

As can be seen from the above results, the effects of the present invention are obvious.

EXPLANATION OF REFERENCES

30: support
32: alignment film
36a, 36b: optically-anisotropic layer
37a to 37g: region
40: liquid crystal compound
40A: optical axis
42: bright portion
44: dark portion
60: exposure device
62: laser
64: light source
65: $\lambda/2$ plate
68: beam splitter
70A, 70B, 90A, 90B: mirror
72A, 72B, 96: $\lambda/4$ plate
86, 94: polarization beam splitter
92: lens
$\Lambda$: single period
D: arrangement axis
R: region
M: laser light
MA, MB: beam
MP: P polarized light
MS: S polarized light
$P_0$: linearly polarized light
$P_R$: right circularly polarized light
$P_L$: left circularly polarized light
α: intersecting angle
$L_1, L_4$: incidence light
$L_2, L_5$: transmitted light

What is claimed is:

1. A transmission type liquid crystal diffraction element comprising:
    an optically-anisotropic layer that is formed of a liquid crystal composition including a liquid crystal compound,
    wherein the optically-anisotropic layer has a liquid crystal alignment pattern in which a direction of an optical axis derived from the liquid crystal compound changes while continuously rotating in at least one in-plane direction,
    the optically-anisotropic layer has three or more regions in the thickness direction,
    in any two or more regions of the three or more regions, the liquid crystal compound is twisted and aligned in the thickness direction,
    adjacent regions of the three or more regions have different twist and alignment states of the liquid crystal compound in the thickness direction from each other, and
    wherein a difference $\Delta n_{550}$ in refractive index generated by refractive index anisotropy of the optically-anisotropic layer is 0.2 or more, and
    the optically-anisotropic layer has regions having opposite directions of helically twisted alignment of the liquid crystal compound in the thickness direction.

2. The transmission type liquid crystal diffraction element according to claim 1,
    wherein a length of a single period of the liquid crystal alignment pattern is uniform,
    the single period being a length over which a direction of the optical axis derived from the liquid crystal compound rotates by 180° in the liquid crystal alignment pattern.

3. The transmission type liquid crystal diffraction element according to claim 1,
    wherein a length of a single period of the liquid crystal alignment pattern gradually changes in the one in-plane direction,
    the single period being a length over which a direction of the optical axis derived from the liquid crystal compound rotates by 180° in the liquid crystal alignment pattern.

4. The transmission type liquid crystal diffraction element according to claim 1,
    wherein the one in-plane direction of the liquid crystal alignment pattern in which the direction of the optical axis derived from the liquid crystal compound changes while continuously rotating moves is radially provided in the optically-anisotropic layer.

5. The liquid crystal diffraction element according to claim 1,
    wherein the inflection point at which the tilt direction of the dark portion is folded is provided at an odd number of positions.

6. The liquid crystal diffraction element according to claim 5,
    wherein the inflection point at which the tilt direction of the dark portion is folded is provided at one position.

7. The liquid crystal diffraction element according to claim 5,
    wherein the inflection point at which the tilt direction of the dark portion is folded is provided at three positions.

8. The transmission type liquid crystal diffraction element according to claim 1,
    wherein the regions having opposite directions of helically twisted alignment of the liquid crystal compound in the thickness direction are symmetrical with respect to a center line of the optically-anisotropic layer in the thickness direction.

9. The liquid crystal diffraction element according to claim 1,
    wherein in a cross-sectional image obtained by observing a cross-section of the optically-anisotropic layer taken in a thickness direction parallel to the one in-plane direction with a scanning electron microscope, a shape of the dark portion is asymmetrical with respect to a center line of the optically-anisotropic layer in the thickness direction.

10. The transmission type liquid crystal diffraction element according to claim 1,
    wherein a region where a length of a single period of the liquid crystal alignment pattern is 1.0 μm or less is provided in a plan,
    the single period being a length over which a direction of the optical axis derived from the liquid crystal compound rotates by 180° in the liquid crystal alignment pattern.

11. An optical element comprising:
    the transmission type liquid crystal diffraction element according to claim 1; and
    a circularly polarizing plate.

12. The optical element according to claim 11,
    wherein the circularly polarizing plate consists of a retardation plate and a polarizer, and
    the transmission type liquid crystal diffraction element, the retardation plate, and the polarizer are disposed in this order.

13. An optical element comprising, in the following order:
    the transmission type liquid crystal diffraction element according to claim 1;
    a silicon oxide layer; and
    a support.

14. An optical element comprising:
    at least one transmission type liquid crystal diffraction element according to claim 1; and
    at least one phase modulation element.

15. An image display unit comprising:
    the transmission type liquid crystal diffraction element according to claim 1.

16. A head-mounted display comprising:
    the image display unit according to claim 15.

17. A beam steering comprising:
    the transmission type liquid crystal diffraction element according to claim 1.

18. A sensor comprising:
    the transmission type liquid crystal diffraction element according to claim 1.

19. An optical element comprising:
    at least one optical element according to claim 11; and
    at least one phase modulation element.

20. A transmission type liquid crystal diffraction element comprising:
    an optically-anisotropic layer that is formed of a liquid crystal composition including a liquid crystal compound,
    wherein the optically-anisotropic layer has a liquid crystal alignment pattern in which a direction of an optical axis derived from the liquid crystal compound changes while continuously rotating in at least one in-plane direction,
    the optically-anisotropic layer has three or more regions in the thickness direction, in any two or more regions of the three or more regions, the liquid crystal compound is twisted and aligned in the thickness direction, adjacent regions of the three or more regions have different twist and alignment states of the liquid crystal compound in the thickness direction from each other, and wherein a difference $\Delta n_{550}$ in refractive index generated by refractive index anisotropy of the optically-anisotropic layer is 0.2 or more, and a size of a twisted angle of the liquid crystal compound in the thickness direction is 237 or less.

* * * * *